March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets-Sheet 1

INVENTORS
CARL T. JOHNSON
GAROLD A. KANE
MILTON C. NEUMAN
KENNETH A. RIACH

BY Walter G. Finch
ATTORNEY

March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets—Sheet 8

March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets-Sheet 10

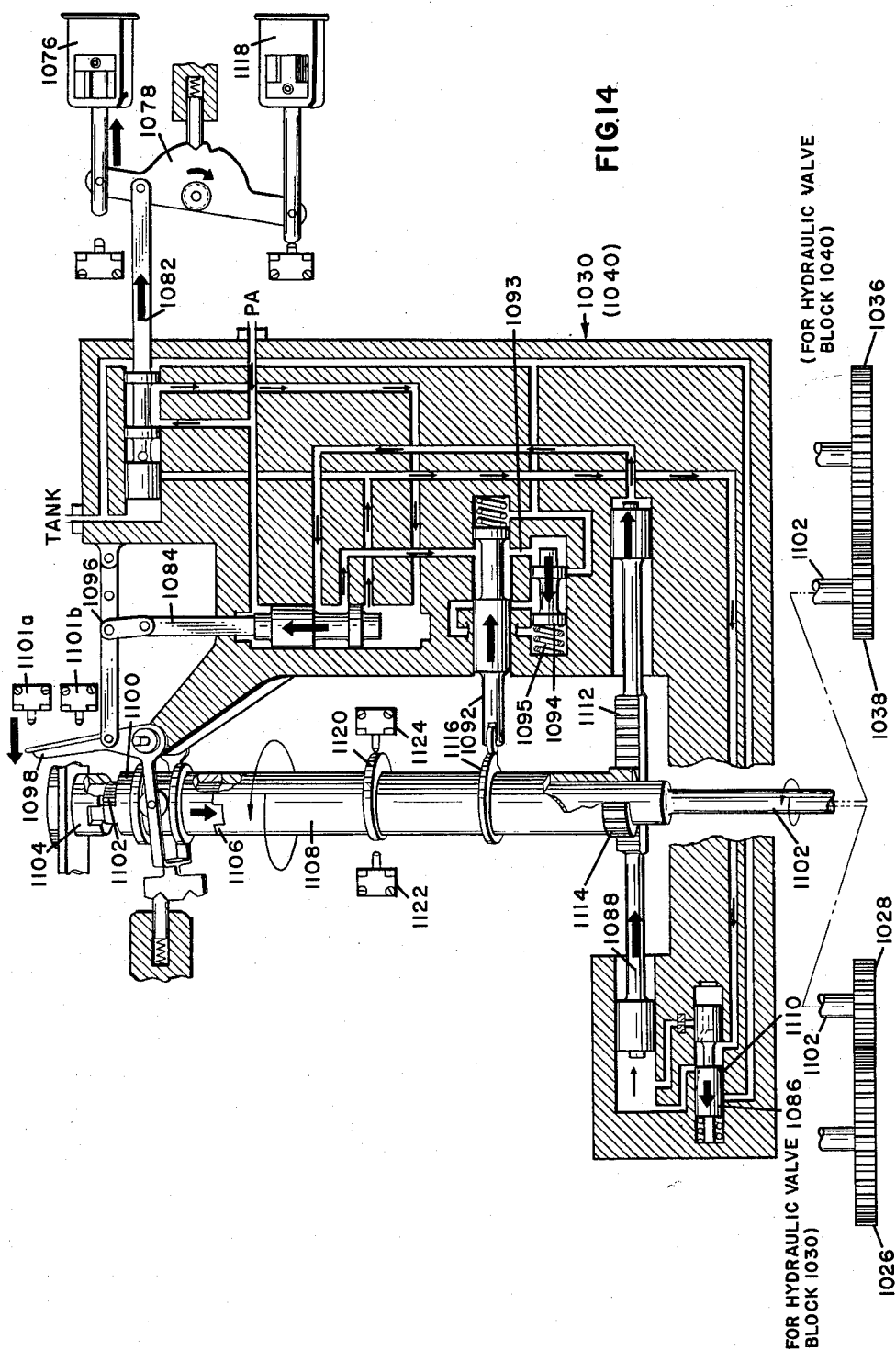

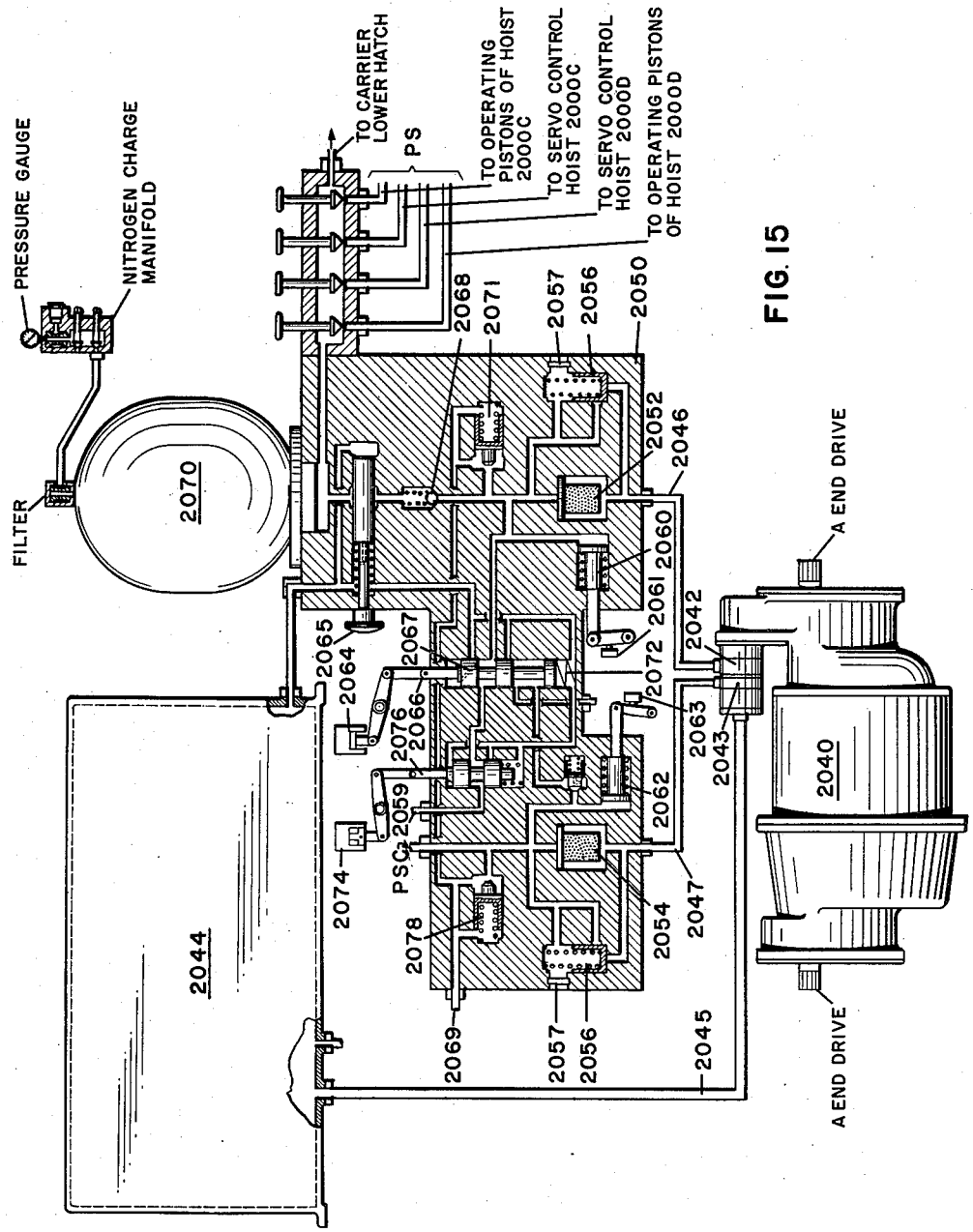

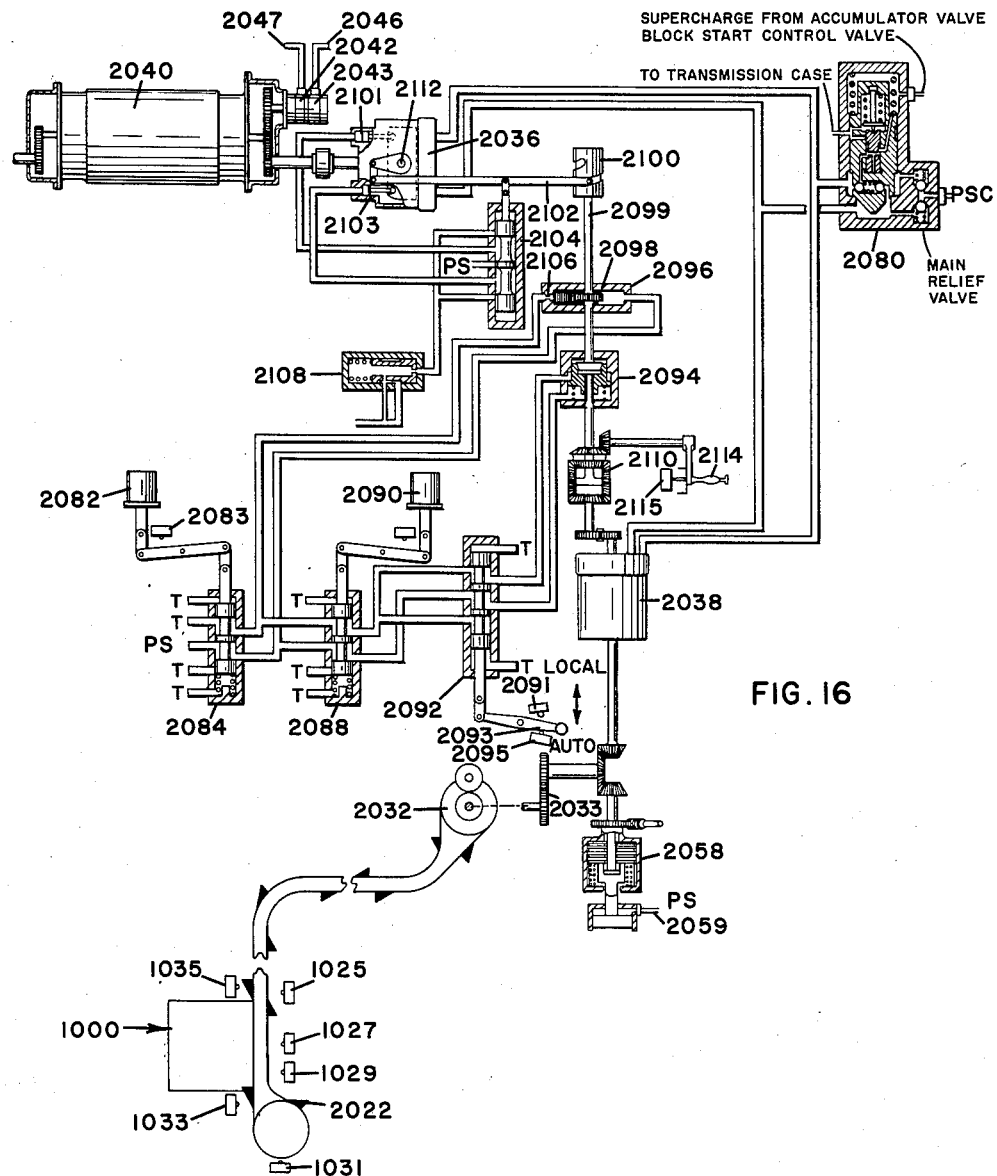

March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets-Sheet 18

March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets-Sheet 23

March 3, 1964　　C. T. JOHNSON ETAL　　3,122,967
AMMUNITION HANDLING AND LOADING SYSTEM FOR MAJOR CALIBER GUNS
Filed Nov. 28, 1958　　69 Sheets-Sheet 33
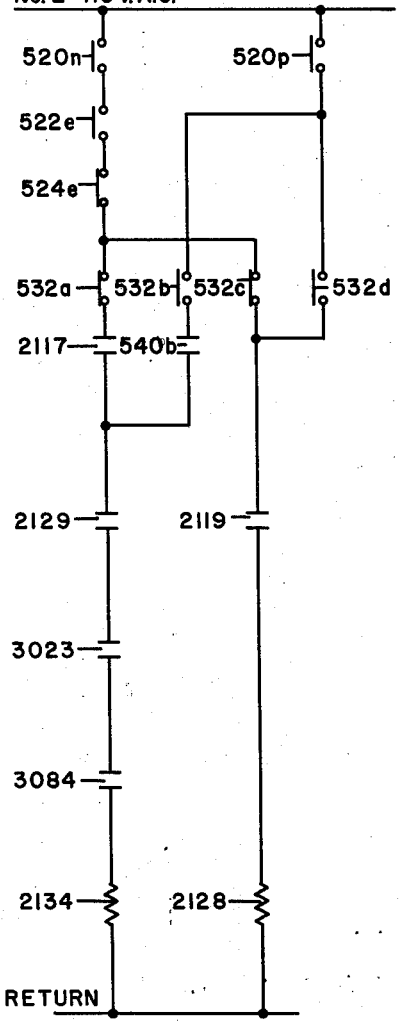
FIG. 37
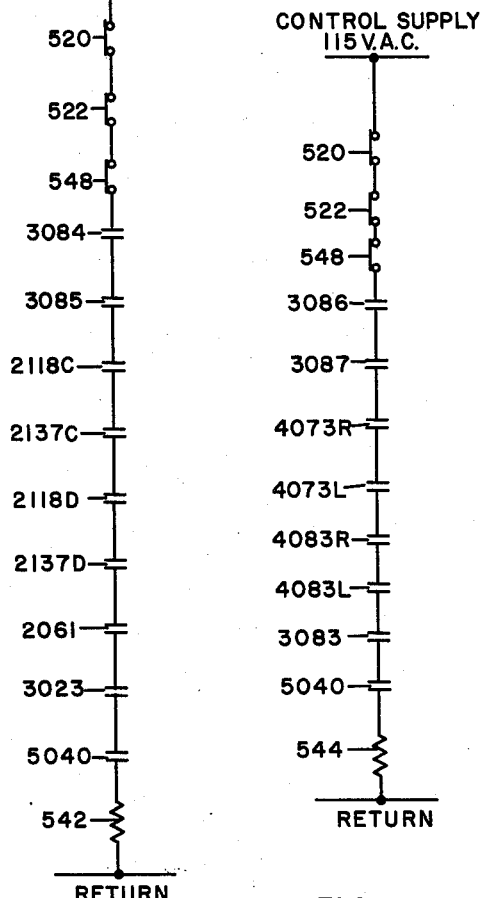
FIG. 38
FIG. 40

March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets-Sheet 43

March 3, 1964  C. T. JOHNSON ETAL  3,122,967
AMMUNITION HANDLING AND LOADING SYSTEM FOR MAJOR CALIBER GUNS
Filed Nov. 28, 1958  69 Sheets-Sheet 44
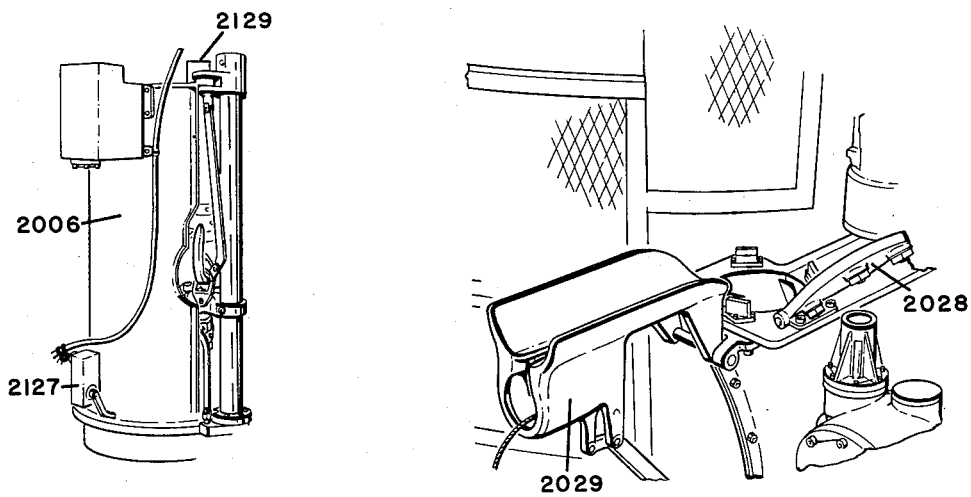
FIG. 52
FIG. 53
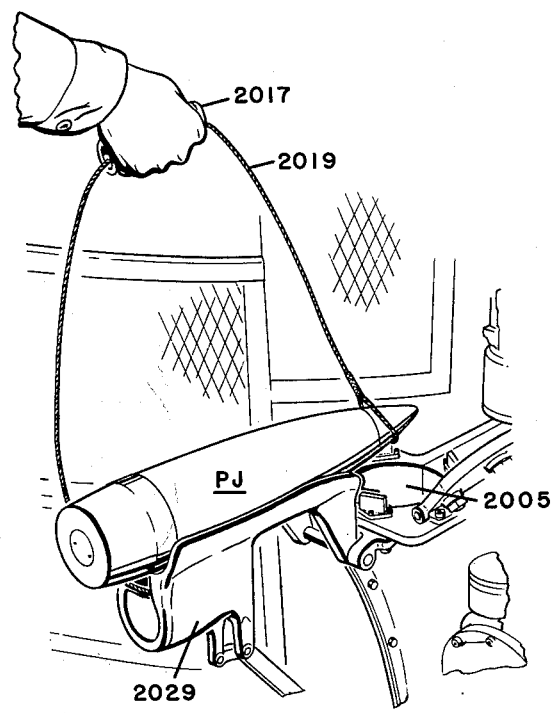
FIG. 54

March 3, 1964     C. T. JOHNSON ETAL     3,122,967
AMMUNITION HANDLING AND LOADING SYSTEM FOR MAJOR CALIBER GUNS
Filed Nov. 28, 1958     69 Sheets-Sheet 54
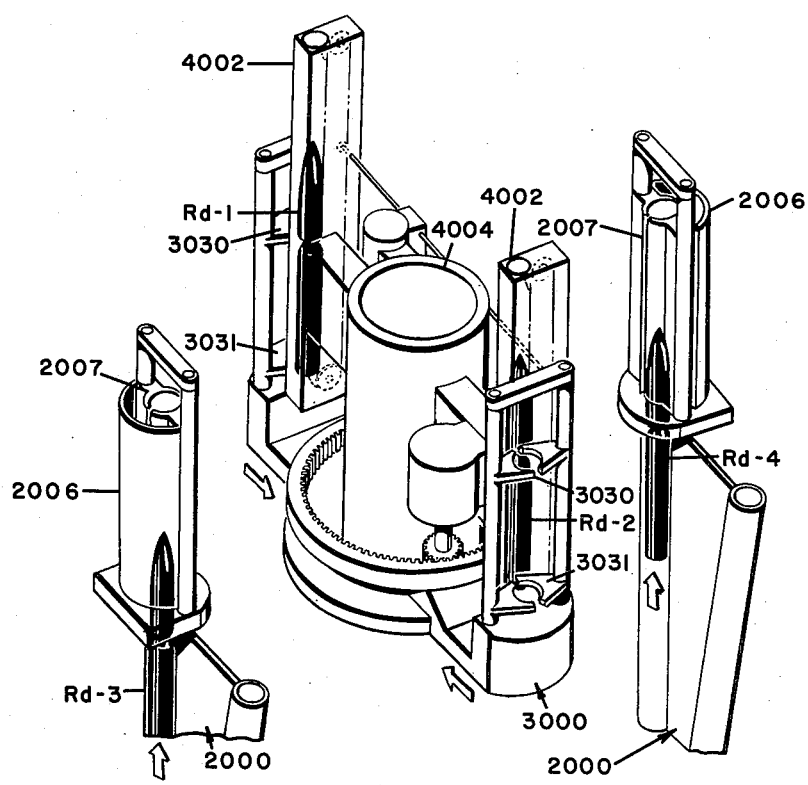
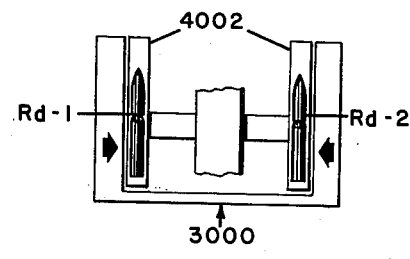
FIG.64

March 3, 1964 C. T. JOHNSON ETAL 3,122,967
AMMUNITION HANDLING AND LOADING SYSTEM FOR MAJOR CALIBER GUNS
Filed Nov. 28, 1958 69 Sheets-Sheet 62

United States Patent Office 3,122,967
Patented Mar. 3, 1964

3,122,967
AMMUNITION HANDLING AND LOADING
SYSTEM FOR MAJOR CALIBER GUNS
Carl T. Johnson and Garold A. Kane, Minneapolis, Milton
C. Neuman, Champlin, and Kenneth A. Riach, Minneapolis, Minn., assignors, by mesne assignments, to the United States of America as represented by the Secretary of the Navy
Filed Nov. 28, 1958, Ser. No. 777,161
8 Claims. (Cl. 89—46)

The present invention relates to ordnance gun weapons of major caliber of the order of magnitude of five inches or greater employing separate or semi-fixed ammunition and intended to be effective for both anti-aircraft and surface fire and for the protection of fixed or moving installations. More particularly, this invention pertains to automatic ammunition handling and loading apparatus for supplying rounds of ammunition expeditiously to large caliber guns for automatic firing therefrom.

In the employment of weapons of major caliber, it is necessary to rely upon elevating and conveying equipment to raise and deliver the heavy rounds of ammunition from the magazines to the guns. In addition, it is highly advantageous to have the movement of the ammunition synchronized with the high firing rate desired of modern armament. Moreover, from a practical standpoint the rounds of ammunition must be transferred from a relatively stationary site and loaded into a gun at substantially all positions of train and elevation and without interference with the mechanism for accomplishing various and rapidly changing attitudes of train and elevation of the gun.

In one prior art type of ammunition handling and loading system for a gun using major caliber ammunition, separate increments of the semi-fixed ammunition are handled by dual systems disposed on opposite sides of the gun for movement into an aligned position for ramming of the rounds of ammunition into the breech of the gun and subsequent firing therefrom. Such an ammunition handling and loading system is disclosed in an application of Philias H, Girouard et al., Serial Number 153,262, filed March 31, 1950, now Patent No. 2,855,828, entitled "Rapid Fire Gun Turret Apparatus."

The attainment of the substantially increased firing rate of the major caliber gun is accomplished by utilizing a dual gun ammunition handling and loading system, that is, a system in which each unit in the gun ammunition handling and loading system has a corresponding unit that functions similarly, and in which each round of ammunition is fed to the gun slide alternately from the right and left sides thereof to be loaded into the gun.

In the conventional type of apparatus mentioned previously, in the event one side of the gun ammunition handling and loading system becomes inoperative, the system is a complete casualty, whereas in the dual system of ammunition handling and loading of the gun if one of the duplicate ammunition handling and loading units of the gun loading system becomes inoperative and is deactivated, the other ammunition handling and loading unit of the gun loading system is placed in "one-side" automatic power operation with rounds of ammunition being supplied to one side of the slide only and firing of the gun can continue at a sacrifice only of firing rate thereof.

For simplicity of understanding, the ammunition handling and loading system for the gun may be considered as divided into three main subsystems, namely, a lower ammunition handling and loading subsystem; a selective, rotatable ammunition carrier or intermediate ammunition handling and loading subsystem for transferring rounds of ammunition from the lower ammunition handling and loading system; and an upper ammunition handling and loading subsystem for receiving the trasferred rounds of ammunition from the selective, rotatable carrier or intermediate ammunition handling and loading subsystem for loading into the gun and subsequent firing therefrom.

The present invention is primarily concerned with improvements in the lower gun ammunition handling and loading subsystem, and the rotatable ammunition carrier structure for a dual ammunition handling and loading system for a gun, and with the upper gun ammunition handling and loading subsystem only insofar as to cooperate therewith.

This invention is well adapted for use as modification of the dual ammunition and loading system for a gun disclosed in a copending application entitled "Gun Mount With Ammunition Supplying Means," U.S. patent application, Serial Number 306,612, filed August 27, 1952, by Philias H. Girouard et al., of which the present application is a continuation-in-part by certain of the inventors of the parent application and others, wherein a dual ammunition handling and loading system for the gun having the three main subsystems listed above is provided.

In both the old and present ammunition handling and loading system for the gun, the lower gun ammunition handling and loading subsystem consists of spaced ammunition loaders and fixed lower ammunition hoists therefor, their hydraulic power units, and the various mechanical and electric control equipment necessary for their operation. The stationary loaders, in both lower gun ammunition handling and loading systems are fixed with relation to the structure of the ship in the ammunition handling room; with the lower ammunition hoist tubes extending from the ammunition loaders to the ammunition carrier.

The ammunition carrier or intermediate ammunition handling and loading subsystems, the principal components of which are a carrier spider, a pair of carrier tubes, a carrier control and a B-end hydraulic motor and drive pinion, is part of the carriage. All of the carrier components are mounted around a center column, which is suspended from the underside of the mount base ring, and are located on the first platform below the exposed deck, directly beneath the gun house.

The upper ammunition handling and loading subsystem consists of a hoist assembly including right and left upper ammunition hoists, transfer trays, a rammer, an empty case tray, an empty case ejector, and fuze setters. The upper hoist assembly also consists of two hoist tubes that are attached to a center column and two cradles which pivot on the slide trunnions. The other units in the upper gun ammunition handling and loading subsystem are all mounted on the gun slide. The units in the upper part of the upper gun ammunition handling and loading subsystem are housed in the gun house and are a part of the mount rotating structure and move with the mount in train movement of the gun.

A complete round of separate or semi-fixed ammunition consists of a projectile and a powder case. These are separately loaded by manpower into the ammunition loaders which act as an indexing repository until the two parts of the round of ammunition are brought together in the lower hoist tube. Hoist chain lift pawls in the lower ammunition hoists engage the vertically assembled semi-fixed rounds of ammunition, one at a time, and the hoist chains cycle to hoist the rounds of ammunition in each lower hoist simultaneously.

The predecessor type of dual ammunition handling and loading system mentioned above, differs from the instant system in that the rounds of ammunition are delivered directly into swingable carrier tubes.

One of the objects of the present invention is to provide for the placement of a round of ammunition into a securely fixed transfer station as it is raised by a lower hoist and transferred to an upper hoist for subsequent handling and loading into a gun for firing therefrom.

Another object of this present invention is to provide an improved ammunition carrier including a tube which receives a round of ammunition laterally from the transfer station, then moves around to the nearest upper hoist where another lateral or transverse transfer of the round of ammunition is made this time to the hoist of the upper ammunition handling and loading subsystem for the gun.

Still another object of the present invention is to provide apparatus including a return tube for returing rounds of ammunition to the loaders of the lower ammunition handling and loading subsystem which utilizes a portion of the hoist structure chain and pawl for striking down unused rounds of ammunition.

It is another object of the present invention to provide apparatus which will permit the lower hoist chain to cycle when there is also a void of both an ammunition projectile and powder case at the lower hoist tube, thereby obviating the situation as it existed in the previously mentioned dual gun ammunition handling and loading system of the copending patent application, wherein electrical interlock switches were used which permitted the lower hoist chain to cycle only when the loader hoist tube contained a full semi-fixed round of ammunition and having the round of ammunition already in the hoist tubes so that it is not delayed but can move upwardly until it is fired from the gun.

Another object of this invention is to provide an ammunition handling and loading system for a gun in which the lower hoist powerdrives are improved over conventional separate units, and which comprises apparatus including a double shaft extension electric motor, hydraulic units and gear reductions, all of which cooperate together to drive the lower hoist chain sprockets.

Still another object of this invention is to provide a new arrangement of a servo pressure system which is used in the present ammunition handling and loading system to supply power to drive controls, a transfer device, a power-off-brake, a carrier lower latch and to supply fluid to the return side of the power drives to provide improved performance and more rapid response thereof.

Another object of this invention is to provide an ammunition handling and loading system for a large caliber gun with improved mechanism for moving the round of ammunition vertically from a loader to a transfer tube, thence laterally to a rotatable carrier which, in turn, delivers the round of ammunition laterally or radially to an upper hoist to deliver the round of ammunition to a swinging cradle by which the round of ammunition is moved and delivered to a transfer tray, which tray moves the round of ammunition into axial alignment with the bore of the gun into which it is thereafter rammed.

Still another object of this invention is to provide an ammunition handling and loading system for a gun which includes apparatus for transferring a round of ammunition from a manually supplied loader to and into the gun by successive mechanisms including a lower hoist, a transfer tube into which the round is moved by the lower hoist, a rotatable carrier which receives the round laterally from said transfer tube and moves the round to and transfers it laterally to an upper hoist which, in turn, rotates with the gun mount in the training movement of the gun.

Still another object of this invention is to provide, on a trainable and elevatable mount for a gun, an upper hoist mechanism which is rotatable with the gun in its training movement and which has a lower hoist tube for receiving a round of ammunition, a transfer tube structure terminating at the uper end of the lower hoist tube for passing the round of ammunition laterally in turn to a rotatable carrier having a chamber for receiving the round of ammunition, together with apparatus for rotating the ammunition carrier from a position for laterally receiving a round of ammunition to a position with the chamber in radial alignment with the hoist upper tube so that the round of ammunition can be laterally transferred to the upper tube for subsequent transfer and loading into the gun for firing therefrom.

In correlation with the immediately preceding object, it is a further object of this invention to provide apparatus for selectively determining the direction of rotation of the ammunition carrier so as to bring the chamber in the carrier into radial alignment with the hoist tube for transfer of the round of ammunition in the shortest period of time.

It is also another object of this invention to provide a mount for a gun which includes a rotatable carrier having two spaced chambers for receiving rounds of ammunition and for delivering the same to spaced upper hoists, together with spaced lower hoist each having a hoist tube, with each hoist tube having a transfer tube positioned at the upper end thereof which cooperates in receiving a round of ammunition vertically from below, with the carrier chambers being adapted to index the transfer tubes, together with apparatus for operating the lower hoists to transfer rounds of ammunition from the lower hoist tubes to the transfer tubes and thence laterally to the chambers of the carrier.

Still even another object of this invention is to provide an ordnance article handling and loading system for a weapon which includes a loading mechanism for receiving the articles to be handled, together with apparatus including a rotatable carrier having a chamber for laterally receiving one of the articles and other apparatus for transporting one of the articles between the members and the apparatus with the rotatable carrier for subsequent transfer to the weapon.

Still another object of this invention is to provide an ammunition handling and loading system for a gun of major caliber having mechanism including spaced members for receiving rounds of ammunition, together with apparatus including a bi-directionally rotatable ammunition carrier with a chamber therein for laterally receiving a round of ammunition and other mechanism for transporting a round of ammunition between one of the members and the chamber in the rotatable carrier.

Even still another object of this invention is to provide an ammunition handling and loading system for an ordnance weapon which includes a lower ammunition handling and loading subsystem, an intermediate ammunition handling and loading subsystem having a bi-directionally rotatable carrier, and an upper ammunition handling and loading subsystem for finally transferring the ammunition to the weapon for firing therefrom, with the ammunition carrier being arranged to receive the ammunition laterally from the lower ammunition handling and loading subsystem and to move to and transfer the ammunition laterally to the upper ammunition handling and loading subsystem.

Still another object of this invention is to provide fully automatic hydraulic control and power actuation for an ammunition handling and loading system for major caliber guns in which many disadvantages of prior art gun systems are eliminated and which is adapted to perform all of the essential functions of the systems heretofore or now in general use and in which the possibility of malfunction or failure of the apparatus of the system is minimized.

And still a further object of the invention is to provide for the attainment of new and improved automatic ammunition handling and loading system for a major caliber gun in which the projectile and the powder charge are handled in the system without manual intervention and in a time sequence relationship one with the other.

To provide hydraulic and electric power and control apparatus for handling and supplying ammunition from the stowage magazines of a ship to the gun proper for firing therefrom, is still another object of this invention.

Still another object of this invention is to provide an electric-hydraulic control system for an automatic gun of major caliber which includes various interlocking means whereby sequential operation of the gun system is provided and whereby each part of the system is properly time sequenced so that firing of the ammunition from the gun can be effected.

And yet another object of this invention is to provide a power driven ordnance article handling lower hoist mechanism which can be made to faithfully respond in degree or speed to a manual control element to control the movement of a hoist chain in the hoist mechanism to either lift a round of ammunition to the carrier or lower a round of ammunition to the loader mechanism to withdraw it from the ammunition handling and loading system.

In accordance with the preferred embodiment of the invention, there is provided an automatic, dual ammunition handling and loading system for a rapid fire gun of major caliber, intended to be effective for anti-aircraft or surface fire for use in defense of vessels or other installations.

Each unit in the ammunition handling and loading system for the gun has a corresponding unit that functions similarly, with rounds of ammunition being fed to a gun slide alternately from the right and left sides thereof.

In the event one side of the ammunition handling and loading system for the gun becomes inoperative and deactivated, the system is placed in one-side automatic power operation, with rounds of ammunition being supplied to only one side of the gun slide. For simplicity, the ammunition handling and loading system for the gun may be divided into three main subsystems, a lower ammunition handling and loading subsystem, a bi-directional, rotatable ammunition carrier or intermediate ammunition handling and loading subsystem, and an upper ammunition handling and loading subsystem for the gun, all mechanically, hydraulically, and electrically coupled together to give a system for efficiently and effectively handling and transporting rounds of ammunition to the gun for loading therein and subsequent firing therefrom.

The lower ammunition handling and loading subsystem consists of a pair of spaced ammunition loaders and a corresponding number of fixed lower ammunition hoists positioned in hoist tubes, with their hydraulic power units and the various mechanical and electric control equipment necessary for their operation.

The stationary loaders are fixed with relationship to the structure of the vessel and are located in the ammunition handling room; while the lower ammunition hoist tubes containing the lower hoists extend from the loaders to the ammunition carrier. These hoist tubes can be straight, or can be curved so that the loaders can be remotely located from the gun mount proper.

The bi-directional, rotatable ammunition carrier, whose principal components are a carrier spider, a pair of spaced carrier tubes, a carrier control and a B-end hydraulic motor and drive pinion, is part of the carriage for the gun.

All of the carrier components are mounted on a center column, which is suspended from the underside of the gun mount base ring and are generally located on the first platform below the exposed deck of the naval vessel directly beneath the gun house.

The upper ammunition handling and gun loading system for the gun consists of an upper hoist assembly having right and left hoists for moving the rounds of ammunition from the carrier and transporting them to the gun slide, transfer tray assemblies for transferring the rounds of ammunition from the upper hoists, a rammer assembly, an empty case tray, an empty case ejector assembly, and a pair of fuze setter assemblies.

The upper hoist assembly also consists of two hoist tubes containing the hoists. This assembly is attached to a center column and to two spaced cradle assemblies which pivot on the slide trunnions.

The other units in the upper ammunition handling and loading system for the gun are all mounted on the gun slide. The units in the upper part of the upper gun ammunition handling and loading system are housed in the gun house and are part of the rotating structure for the gun mount and move in train (azimuth) with the mount.

More specifically, each ammunition loader consists principally of two drums located one above the other in a common enclosure, two independently operated gear drivers therefor, a loading door for each drum located on the loader shell, a steel plate separating the loader drums, and various electrical and hydraulic equipment. Rounds of ammunition consisting of the projectile and the casing therefor are manually loaded into the upper and lower drums of each loader through the loading doors by ammunition handling personnel.

Basically, the lower ammunition hoists are formed by steel tubular members and a hoist track therefor. The lower end of each hoist is mounted in the ammunition loader in the handling room, while the other end of the hoist extends upwardly to the ammunition carrier room. The bottom of each lower hoist tube contains a lower sprocket housing bolted to the underside of each ammunition loader.

An upper sprocket housing is mounted on the top of each lower hoist tube in the carrier room foundation. Each lower hoist drive unit is mounted in the carrier room adjacent to its upper sprocket.

The transfer tube is provided above each upper sprocket. Each transfer tube is equipped with a suitable mechanism to hold the round of ammunition received from the lower hoist tube vertically and eject it laterally to the rotatable ammunition carrier which has a chamber therein for receiving the round of ammunition, when the chamber and transfer tube passage are in radial alignment.

The principal components of the movable ammunition carrier are the carrier spider, the pair of diametrically spaced carrier tubes, the carrier control and a B-end hydraulic motor and drive pinion. All of the ammunition carrier components are mounted around the previously mentioned center column, which, in turn, is suspended from the underside of the base ring of the gun mount.

The upper hoist assembly consists of two symmetrically positioned steel hoist tubes, each containing a hoist chain, vertically mounted 180 degrees apart on the center column. An upper hoist control is located near the left upper hoist tube; while an upper hoist driving mechanism is mounted on the center column. In addition, an upper hoist shutter and carrier ejector mechanism is located on the inboard side of the hoist tubes. Each hoist tube is provided with a hoist chain and retractable lift pawl. This upper hoist assembly also has various valve blocks, solenoids, and hydraulic and electrical control equipment.

Each cradle assembly for the gun mount, for receiving and transferring rounds of ammunition, is similarly mounted on a right or left slide trunnion by a large journal bearing. A cradle is located on each outboard side of the slide and inboard side of each trunnion support. Each operating system for a cradle assembly includes a cradle control cylinder, upper and lower shutters, cradle guide arc, cradle tube, cradle arm, cradle buffing yoke, ejector mechanism, various valve blocks, switches, and other minor cradle control equipment.

A transfer tray assembly is also provided for each cradle assembly for transferring the rounds of ammunition. Each transfer tray assembly consists of a cylindrically shaped transfer tray longitudinally hinged to the top rear portion of the gun slide. A transfer tray control mechanism is located on the bottom of the gun slide below and between the transfer trays, while a shutter and clamp mechanism is located on each transfer tray. Various valve blocks, solenoids, switches, and control equipment are also provided for the operation of the transfer tray assemblies.

Each empty case tray consists of a tubular empty case tray hinged on the right inboard side of the gun slide, below the right transfer tray; together with an empty case tray buffer mounted on the rear of the empty case tray and various valve blocks, solenoids, switches and control equipment located on or in the gun slide.

Each fuze setter assembly consists of a fuze setter and receiver regulator, and a fuze pot retractor, all of which are located on the top forward part of the slide.

The principal components of the rammer assembly consist of a rammer beam located on the top of the gun slide, a driving mechanism, a rammer spade, rammer control mechanism and various electrical and control equipment therefor, all of which are mounted to the rammer beam.

The major components of the empty case ejector assembly are a rack bar subassembly, located near the bottom of the slide; a rack bar crosshead subassembly connected to the rack bar subassembly, located at the rear of the slide; and an empty case ejector tube and port door subassembly located in the bottom front half of the slide and extending through a center gun port shield section below the gun proper. The empty case ejector assembly also consists of a valve block, a solenoid assembly, an operating cylinder, and various switches and control equipment therefor.

It is to be pointed out that although this invention is illustrated in conjunction with a large caliber, rapid fire gun for anti-aircraft and surface fire for defense of vessels or installations, it is not limited thereto, as the system can be readily adapted to handling, transporting, and loading of missiles of various types for launching from a launcher corresponding to the mount of the present gun. In addition, the system of the present invention can be used for the defense of installations located on land as well as aboard ship.

Many other objects and attendant advantages of this invention mentioned above will become more readily appreciated as the same becomes better understood by reference to the following detailed description when considered in connection with the accompanying drawings wherein:

FIG. 14 is a vertical section taken through the drum operating valve block assembly;

FIG. 15 is a hydraulic schematic of the lower hoist accumulator;

FIG. 16 is a hydraulic schematic of the lower hoist drive;

FIG. 16A is a schematic showing relative interlock locations on the lower hoist;

FIG. 37 is a schematic of the electrical circuit for the lower hoist transfer tubes;

FIG. 38 is a schematic of the electrical circuit for energization of a relay;

FIG. 40 is a schematic of another relay energization circuit for the carrier latching mechanism;

FIG. 52 is a perspective view of a transfer station unloading door;

FIG. 53 is a perspective view of a strikedown tray arrangement;

FIG. 54 is a perspective view similar to FIG. 53 showing a projectile in place in a strikedown tray;

FIG. 64 is an operational sequence diagram for the system illustrating Step 9 in the handling of the rounds of ammunition thereof;

Basic Components of Gun System Enumerated

Figure 1:
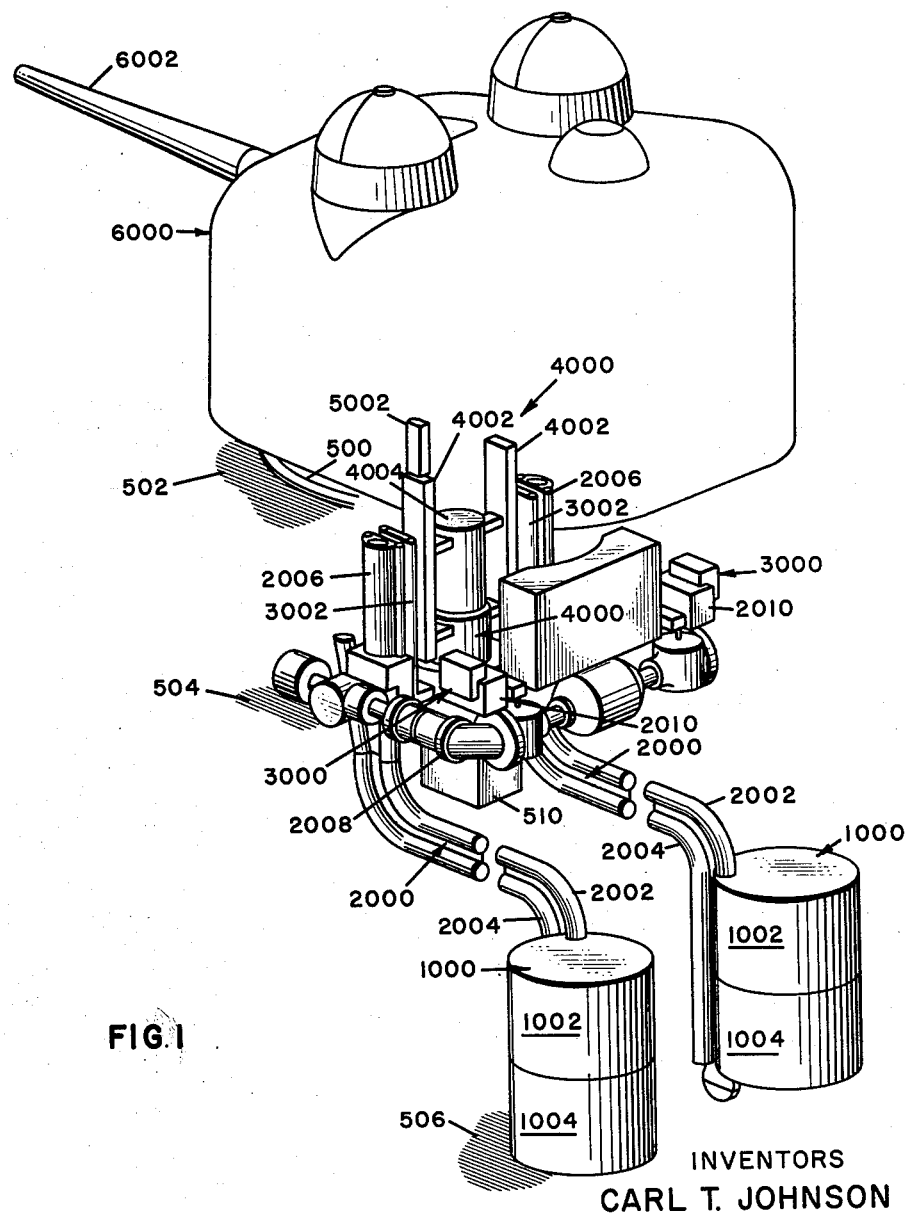
FIG. 1 is a schematic perspective view of a gun mount including the ammunition handling and loading system for the gun incorporating the features of this invention.

Referring now to FIG. 1 of the drawings, the basic components of an ammunition handling and loading system for a large caliber gun 6002, as previously mentioned, are shown in general outline. The gun 6002 is mounted for train and elevation movements upon a shielded rotary gun mount 6000. This gun mount 6000, in turn, is mounted upon a circular mount stand 500, which is fixed to an exposed deck 502 of a naval vessel, such as a cruiser or destroyer. The gun 6002 has a gun loader (not shown) which receives rounds of ammunition from swingable cradles 5002.

The ammunition handling and loading system for the gun 6002, as previously mentioned generally, consists of an upper handling and loading subsystem which includes a pair of spaced upper hoists 4000 located on opposite sides of the gun mount 6000 and which rotate therewith and which extend below the deck 502. Each hoist 4000 is provided with a hoist tube 4002 which is mounted upon a center column 4004. Each hoist tube 4002 has a hoist chain associated therewith for moving a round of ammunition upwardly through the tube from a bi-directionally, rotatably mounted ammunition carrier 3000 positioned below the hoists 4000. For greater detail on the gun 6002, gun mount 6000, and the upper ammunition handling and loading subsystem for loading the gun 6002 with rounds of ammunition, reference should be made to the previously mentioned copending patent application of Philias H. Girouard et al., Serial Number 306,612, filed August 27, 1952, for "Gun Mount With Ammunition Supplying Means."

The previously mentioned ammunition carrier 3000 is a part of an intermediate ammunition handling and loading subsystem for receiving rounds of ammunition from a lower ammunition handling and loading subsystem and for transferring the rounds of ammunition to the upper ammunition handling and loading subsystem for subsequent movement and loading into the breech of the gun 6002 for firing therefrom.

This ammunition carrier 3000, which is arranged coaxially with respect to the center column 4004, is provided with a pair of carrier tubes 3002 corresponding to the upper hoist tubes 4002 of the hoists 4000 and which are spaced outwardly therefrom.

The previously mentioned lower ammunition handling and loading subsystem includes a pair of transfer tubes 2006 which are utilized for transferring rounds of ammunition to the carrier tubes 3002, and each tube 2006 is spaced outwardly from its corresponding carrier tube.

These tubes 2006 are fixed to a carrier room platform 504.

Directly below these tubes 2006, there are located spaced lower ammunition hoists 2000. Each tube 2006 is the upper termination of its corresponding lower ammunition hoist 2000. Each lower ammunition hoist 2000 is provided with a delivery tube 2002 and a return tube 2004. A lower hoist drive 2008, and a pair of lower hoist controls 2010 are provided to operate the hoists 2000.

The delivery and return tubes 2002 and 2004, respectively, of each lower ammunition hoist 2000 extend below platform 504 to an ammunition loader 1000 located on an ammunition handling room platform 506. Each ammunition loader 1000 is provided with a projectile drum casing 1002, and a powder drum casing 1004.

Duplication of Units

Figure 5:
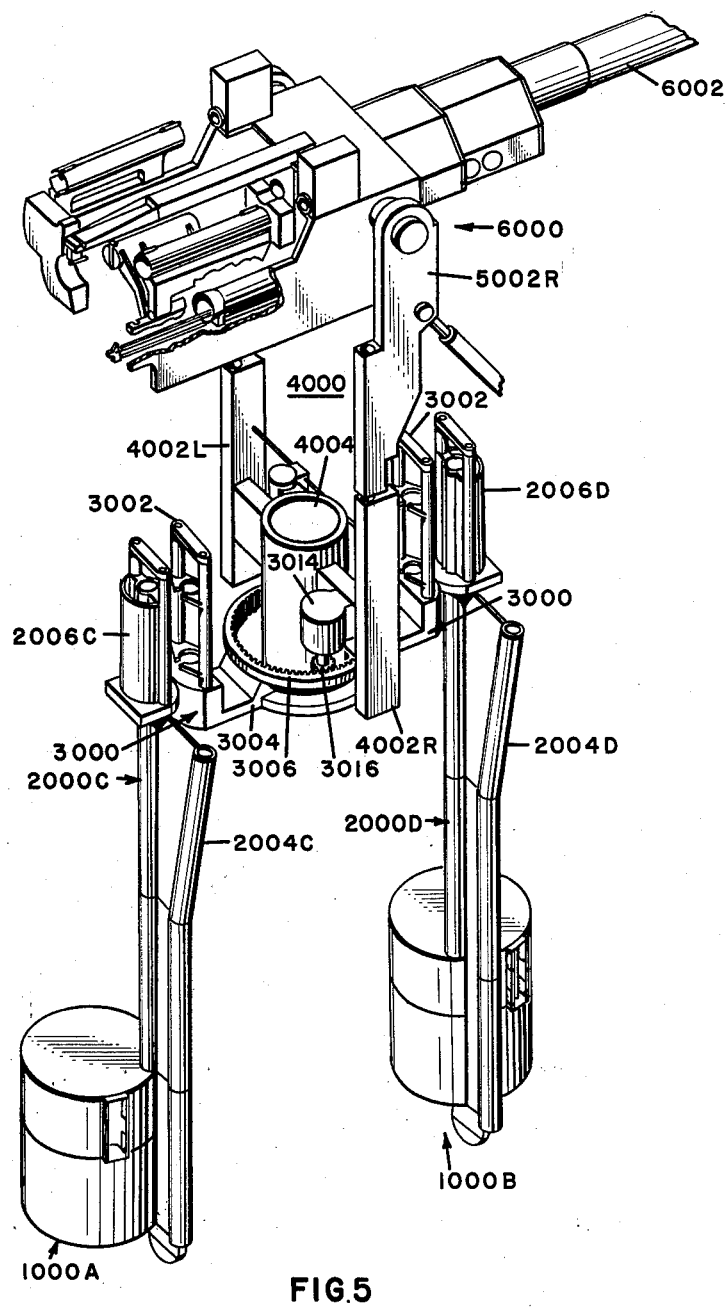
FIG. 5 is a schematic, perspective view of the ammunition handling and loading system for the gun illustrating duplicate units thereof.

Reference is now made to FIG. 5 of the drawings in which the basic duplicate units are distinguished one from the other by suffix letters. It is to be pointed out that the letters for the basic units and their details are used only wherever identification for operational or other reasons is required.

Ammunition Loaders

Figure 7:
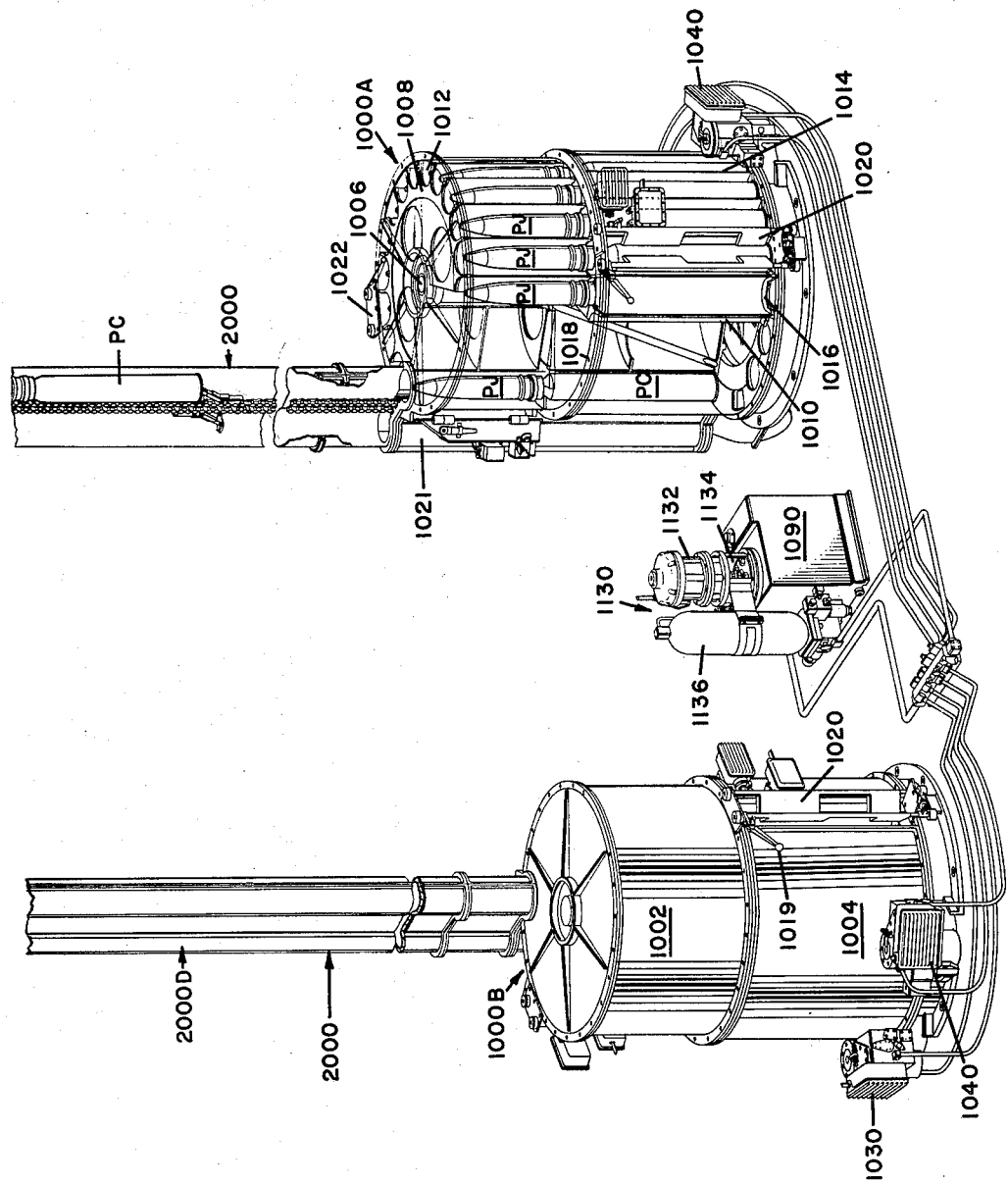
FIG. 7 is a continuation of the perspective view of FIG. 6 showing the lower part of the lower ammunition handling and loading system for the gun including the lower hoists and loaders.

As clearly shown in FIG. 7, each ammunition loader consists of the projectile drum casing 1002 mounted upon the powder drum casing 1004 and respectively arranged to receive a projectile PJ and a powder casing PC.

A center column 1006 is positioned inside the casings 1002 and 1004. The vertical centerline of each center column 1006 is the axis about which a projectile drum 1008 and a powder case drum 1010 rotate one above the other. Drums 1008 and 1010 are each provided with a plurality of generally semi-cylindrical vertical chambers 1012 and 1014, respectively, arranged radially about column 1006 for receiving rounds of ammunition.

Each projectile drum chamber 1012 is open at its top and bottom. Each powder case drum chamber 1014 is open at its top, and is provided with a crescent-shaped shelf 1016 at the bottom thereof. The ammunition powder case PC is supported by the crescent shelf 1016, while projectile PJ is supported by a center plate 1018 which separates the projectile drum casing 1002 from the powder drum casing 1004.

Figure 8:
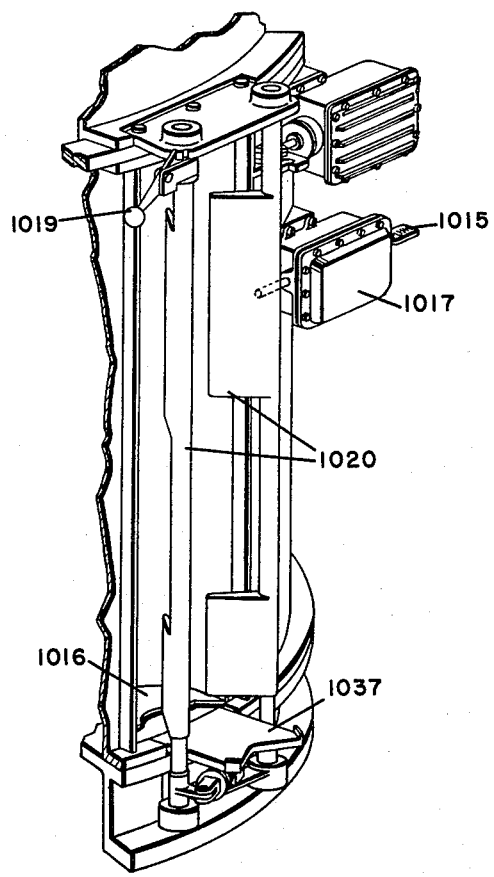
FIG. 8 is a perspective view of a drum showing loading shutters therefor.
Figure 8A:
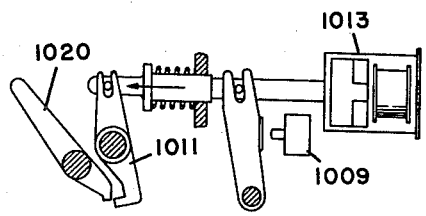
FIG. 8A is a plan view of one loading shutter and the actuating mechanism therefor.
Figure 8B:
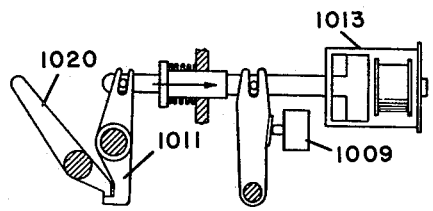
FIG. 8B is a plan view similar to FIG. 8A showing the actuating mechanism in actuated condition.
Figures 10, 10A:
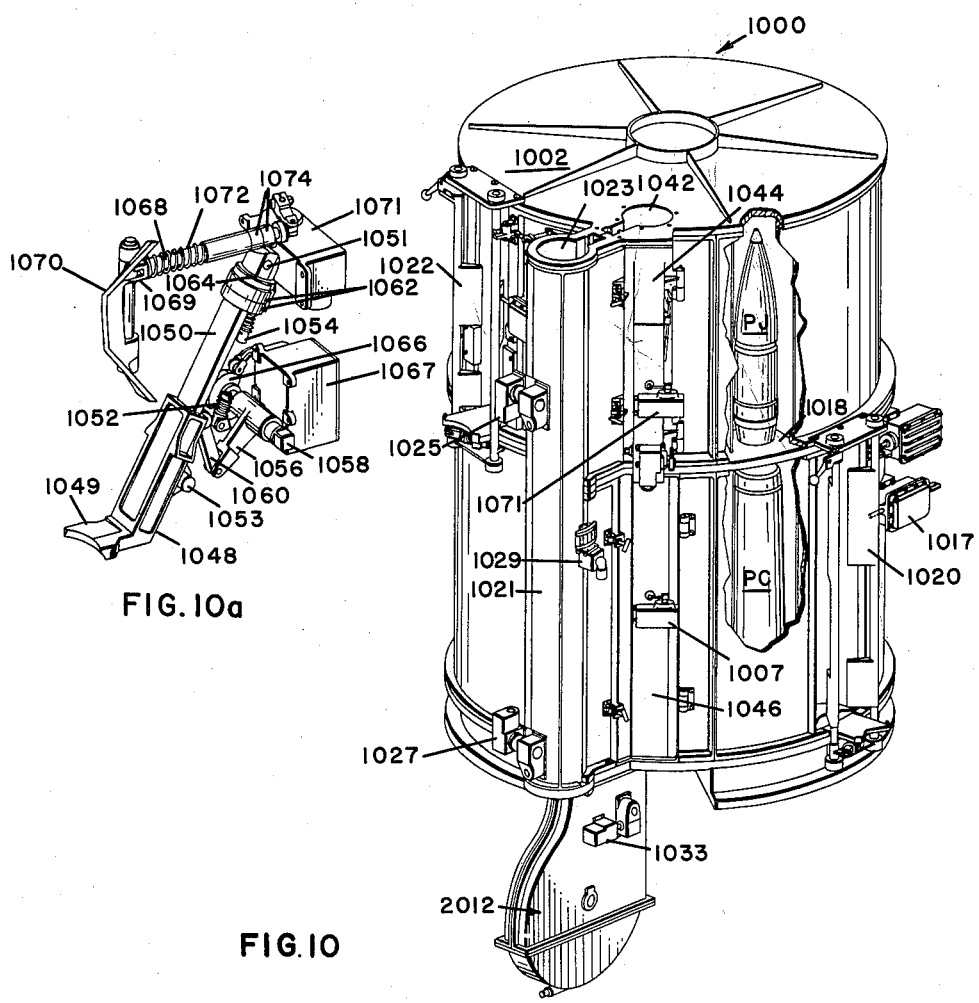
FIG. 10 is a perspective view, with parts removed, of the casing of a loader.
FIG. 10A is a perspective view of an ammunition projectile support within the loader of FIG. 10.

A shutter type powder case loading door 1020 is provided in casing 1004, as best shown in FIGS. 7, 8, and 10. A similar type projectile loading door 1022 is provided in casing 1002 but on the opposite side of the ammunition loader 1000. The uppermost drum 1008 is driven by the axial column 1006, independently of the lower drum 1010.

Figure 9:
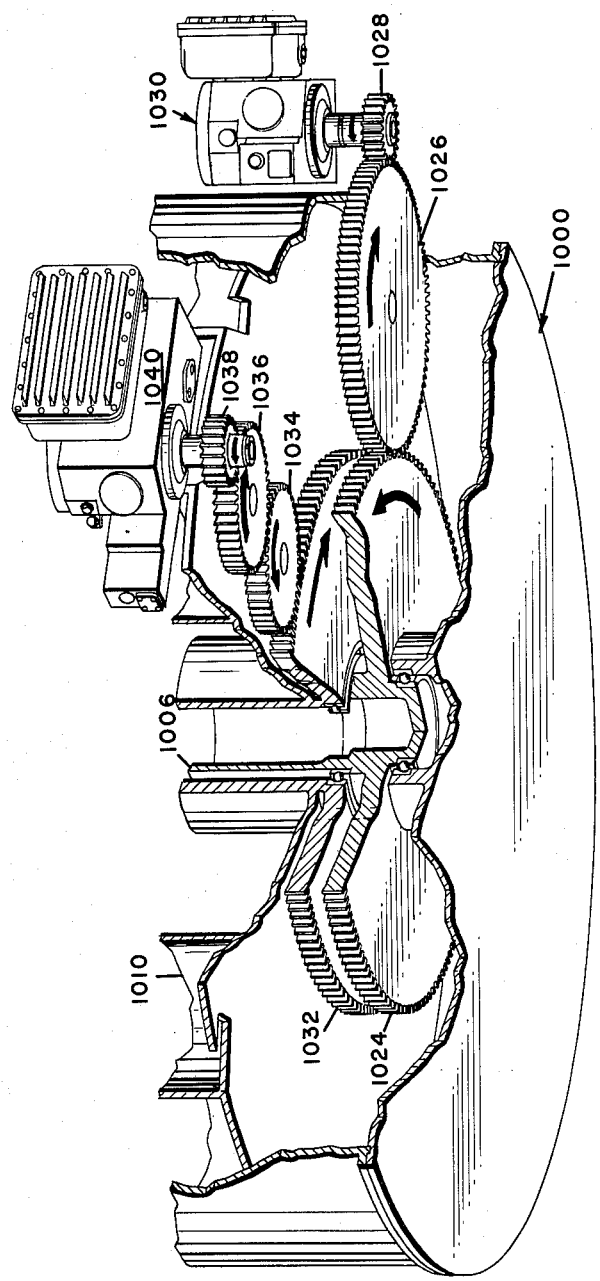
FIG. 9 is a fragmentary perspective view of a loader driving gearing, taken from the underside thereof.

Referring now to FIG. 9, a set of spur gears, namely a projectile drum gear 1024, an idler gear 1026, and a projectile drive pinion 1028 is recessed beneath each loader 1000, and they transmit power from a hydraulic valve block assembly 1030 to the center column 1006 to operate the projectile drum 1008.

Another set of spur gears, namely a projectile case drum gear 1032, an idler gear 1034, another idler gear 1036, and a powder case drive pinion 1038 drives the powder case drum 1010 from a hydraulic valve block assembly 1040. The movement of these drums 1008 and 1010 is of the impulse type so that one chamber 1012 (or 1014), as best seen in FIG. 7, is indexed in place of the previous one, with movement of the drums taking place in a continuous sequence.

At one index position of the drums, a hoist tube passage 1042 is provided where both the top of casing 1002 and the center plate 1018 are perforated for the passage of a round of ammunition therethrough upwardly into the connecting delivery lower hoist tube 2002, as best shown in FIG. 10. A pair of projectile and powder case hoist tube doors 1044 and 1046, respectively, are provided in the casings for access to this passage 1042 in the projectile drum casing 1002 and powder drum casing 1004.

Projectile hoist tube door 1044 contains a mechanism, as shown in FIG. 10A, which supports the ammunition projectile PJ in the hoist tube passage 1042. This same mechanism also actuates several interlock switches in the electrical control circuits of the loader drums 1008 and 1010 and lower ammunition hoist 2000 to indicate whether a projectile support 1048 is extended or retracted and whether the projectile drum chamber 1012 at the hoist tube passage 1042 is loaded or empty.

The mechanism of FIG. 10A consists of the projectile support 1048 having a foot 1049. Support 1048 rides on a sloping T-slide 1050 which, in turn, is mounted on pins 1051 and 1053 secured to the door 1044. Support 1048 is urged downwardly into the hoist tube passage 1042 by a coiled spring 1052 pulling on a clevis rod 1054. The force of spring 1052 is transmitted through a bell crank and yoke 1056 which is pivoted and fastened to a journalled shaft 1058. Bell crank and yoke 1056 is connected by a link 1060 to the projectile support 1048. A stop padding 1062 and a stop collar 1064 limit the excursion of support 1048 at the upper end of T-slide 1050. Shaft 1058 is squared at one end for mating reception of a suitable wrench (not shown), and it is provided with a rotary cam 1066 to operate the actuator arm of a switch 1067.

Another switch 1071 is arranged to be operated by a switch rod 1068, a clevis 1069, and a vertically pivoted cam lever 1070. Cam lever 1070 is mounted at a height suitable for contact with the side of an ammunition projectile PJ when the latter is moved into the hoist tube passage 1042 and onto foot 1049 of support 1048. Cam lever 1070 is spring loaded by a compression coiled spring 1072 placed over switch rod 1068 and it is provided with thrust absorbing cushions 1074.

An arrangement identical to that for switch 1071 is provided on the powder case hoist tube door 1046. An interlock switch 1007, as shown in FIG. 10, senses the presence of a powder case PC within the hoist tube passage 1042.

A strikedown tube door 1021, for use in removing a round of ammunition from the system, is mounted on the lowermost portion 1023 of hoist return tube 2004 as illustrated in FIG. 10, and it is a component of each loader 1000. This door 1021 is opened only when the return tube 2004 is being used for the strikedown of a round of ammunition into the handling room.

An interlock switch 1029 is provided on the loader 1000. This switch 1029 closes an indicating circuit to provide a suitable signal when door 1021 is closed.

Two other sensitive switches are also provided on each loader 1000, namely a switch 1025 which is utilized to signal the approach of a descending round of ammunition, and a switch 1027 which is utilized to signal the arrival of the round of ammunition at the unloading station.

Lower Hoists

Figure 11:
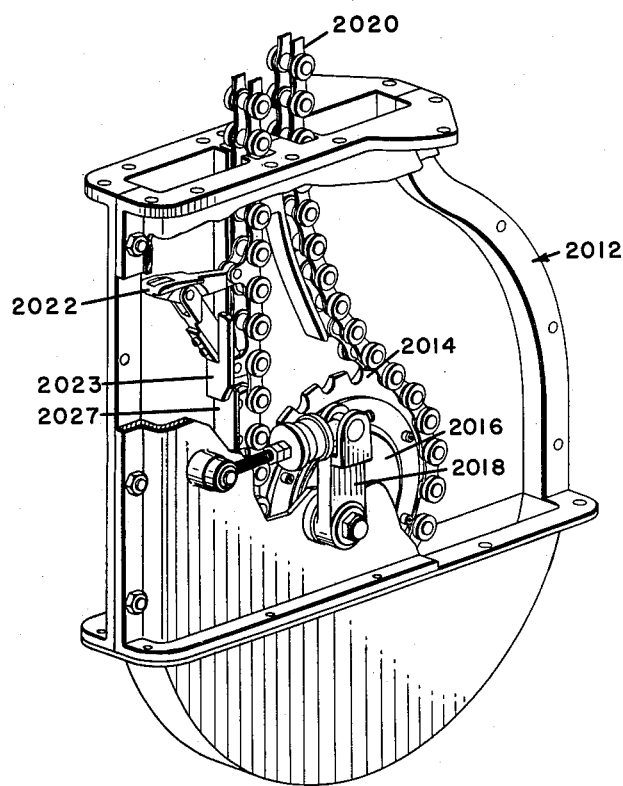
FIG. 11 is a fragmentary perspective view, with parts removed, of a lower hoist sprocket and housing therefor.

Each lower ammunition hoist 2000 includes a lower sprocket housing 2012 which is bolted to the underside of its corresponding ammunition loader 1000. This housing 2012 contains a sprocket 2014, as illustrated in FIG. 11 journalled in a bearing and a hub 2016. Hub 2016 is eccentrically mounted to housing 2012, and it is arranged to be adjustably rotated by means of an external adjusting arm 2018. An endless hoist chain 2020 is driven by the sprocket 2014. This chain 2020 may be tensioned as desired by rotating the eccentrically mounted hub 2016.

Figure 12:
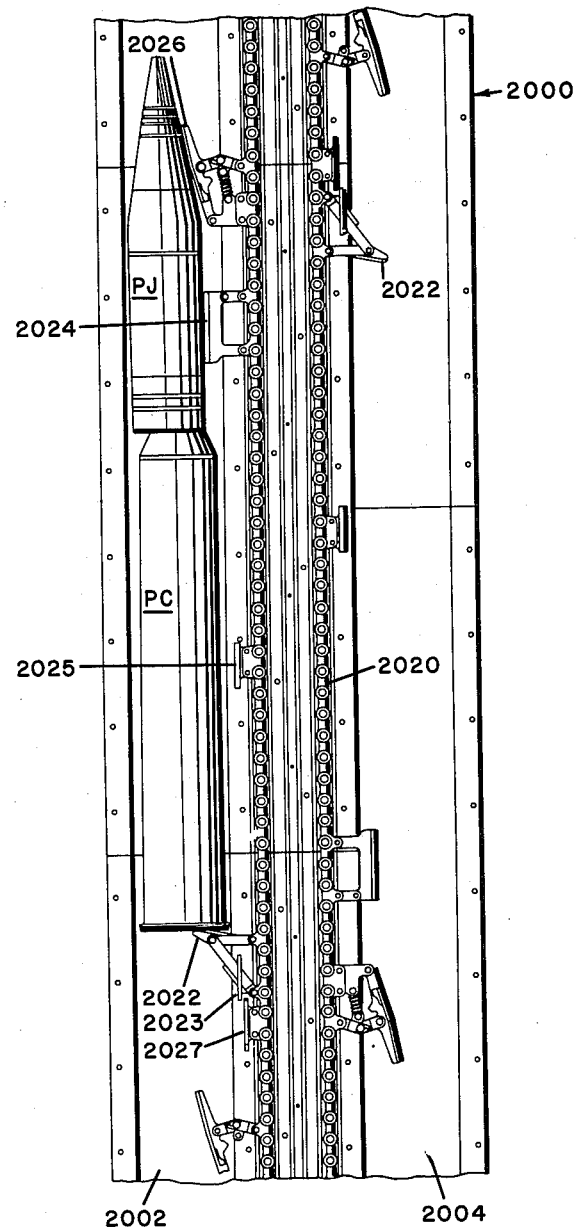
FIG. 12 is a side elevation of the interior of a lower hoist tube, with the side thereof removed.

Chain 2020 for each hoist passes from the sprocket 2014 upwardly through its loader 1000 and thence into its lower ammunition hoist tube 2002. As shown in FIG. 12, each hoist chain 2020 is provided with a plurality of ammunition lift pawls 2022, projectile supports 2024, switch actuating cams 2023, 2025, and 2027, and retractable anti-chucker pawls 2026.

Each anti-chucker pawl 2026 is arranged to engage the ogive of the projectile PJ. It performs the function of steadying the projectile PJ during its passage through the hoist delivery tube 2002, and, in addition, it prevents the round of ammunition from chucking upwardly and away from the lift pawl 2022 during each deceleration to stop the hoist chain 2020.

Chain cams 2023, 2025, and 2027 locate the ammunition lift pawl 2022 with respect to the loading station level. An interlock switch 1031 located on the lower sprocket housing 2012 and shown schematically at the bottom of FIG. 16A signals the approach of a lift pawl 2022. Another interlock switch 1033 located farther along the path of the chain 2020 signals the arrival of the lift pawl 2022 at a loading station. A third interlock switch 1035 located just above the loader indicates that a lift pawl 2022 is clear of the loader 1000.

Figure 2:
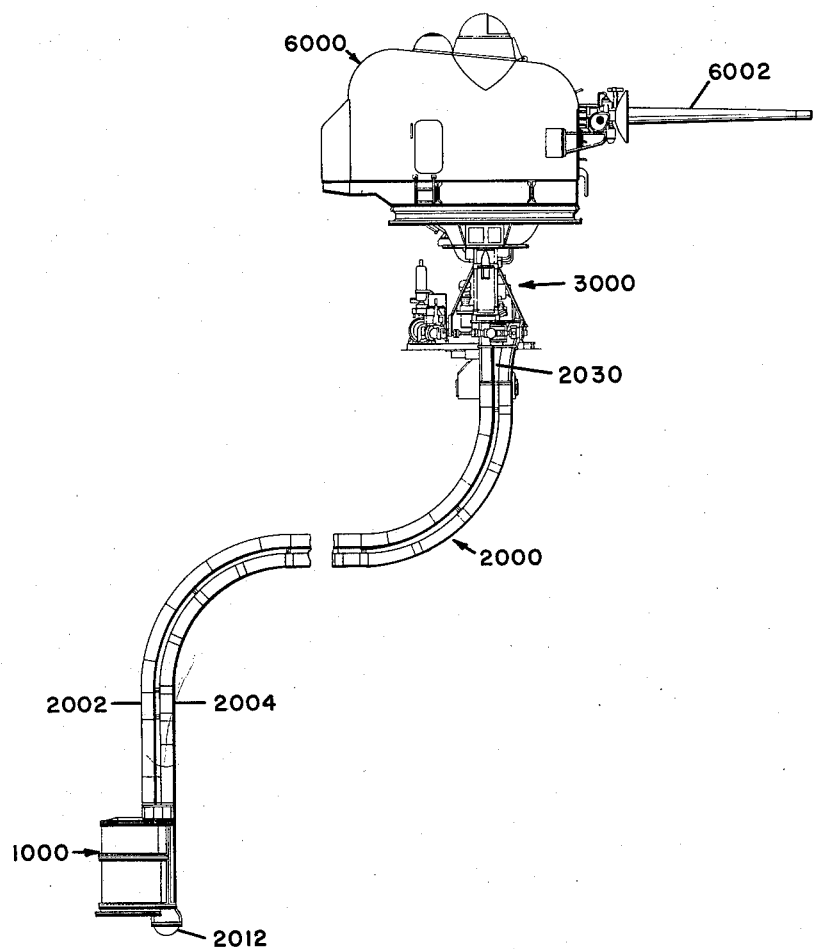
FIG. 2 is a side elevation of a gun mount including the ammunition handling and loading system illustrating the use of curved, parallel, spaced lower ammunition hoist tubes.
Figure 4:
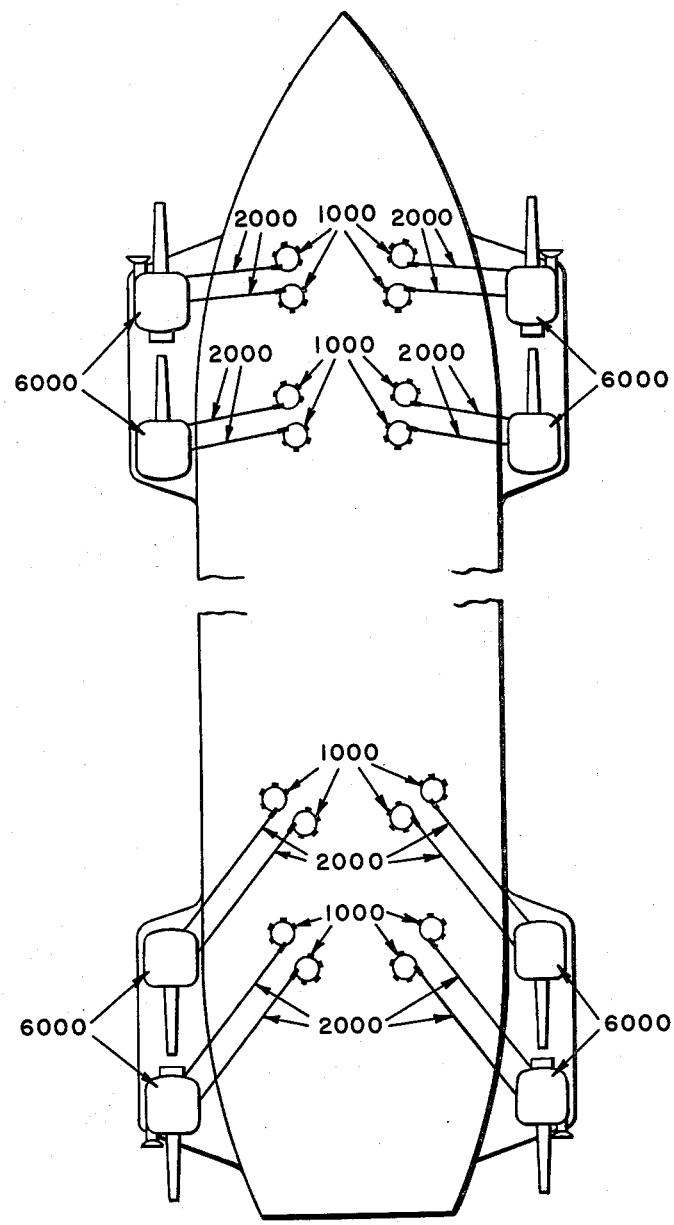
FIG. 4 is a top plan view, partly in schematic, of a naval vessel illustrating offset hoist arrangements for various arrangements of gun mounts.

Hoist delivery tubes 2002 and return tubes 2004 may be straight, as illustrated in FIGS. 5 and 7, or they may be curved, as shown in FIGS. 1 and 2, depending on the requirements of the individual installation. It is also possible to make offset runs of the hoist tubes 2002, as shown in FIG. 4.

Figure 3:
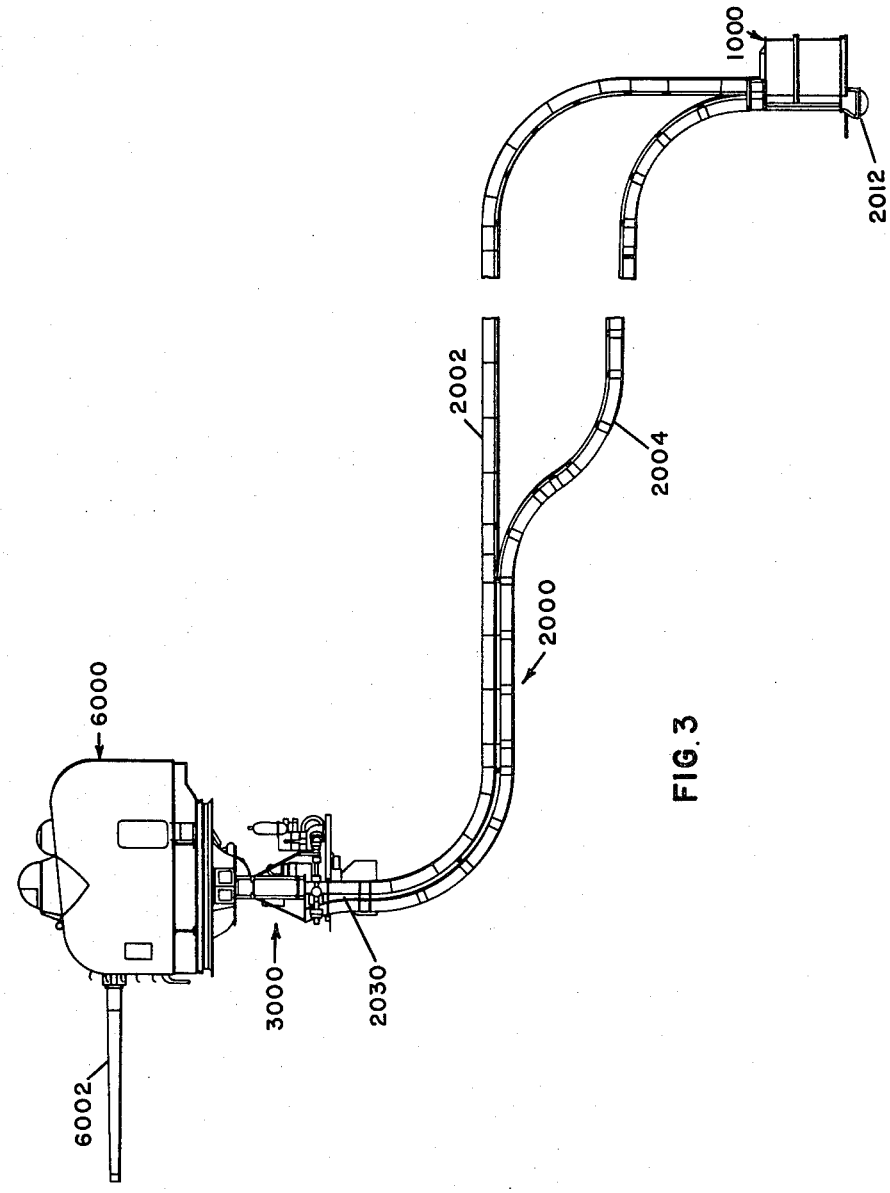
FIG. 3 is a side elevation of a gun mount including the ammunition handling and loading system illustrating the use of curved, split lower ammunition hoist tubes.

In cross-section, hoist tube 2000 is similar to a numeral eight (8), one loop of the eight (8) being the delivery tube 2002 and the other loop defining the return tube 2004. In some installations it may be desirable to separate the return tubes 2004 of hoists 2000 from the delivery tubes 2002 as illustrated in FIG. 3, to allow the tubes to pass around equipment of the vessel which cannot be moved due to the design of the vessel.

Figure 6:
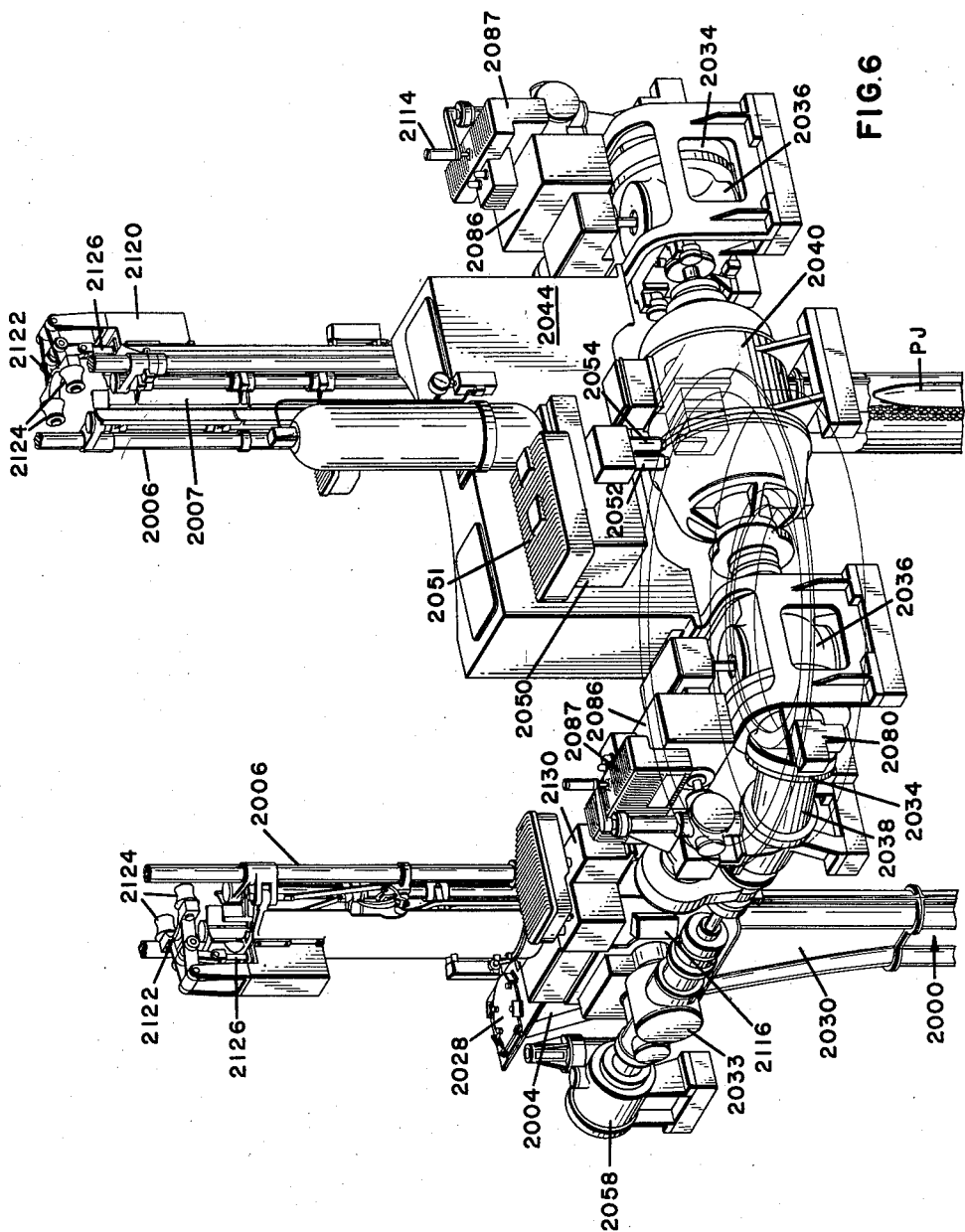
FIG. 6 is a perspective view of the general arrangement of the upper part of the lower ammunition handling and loading system for the gun including the transfer stations.
Figure 13:
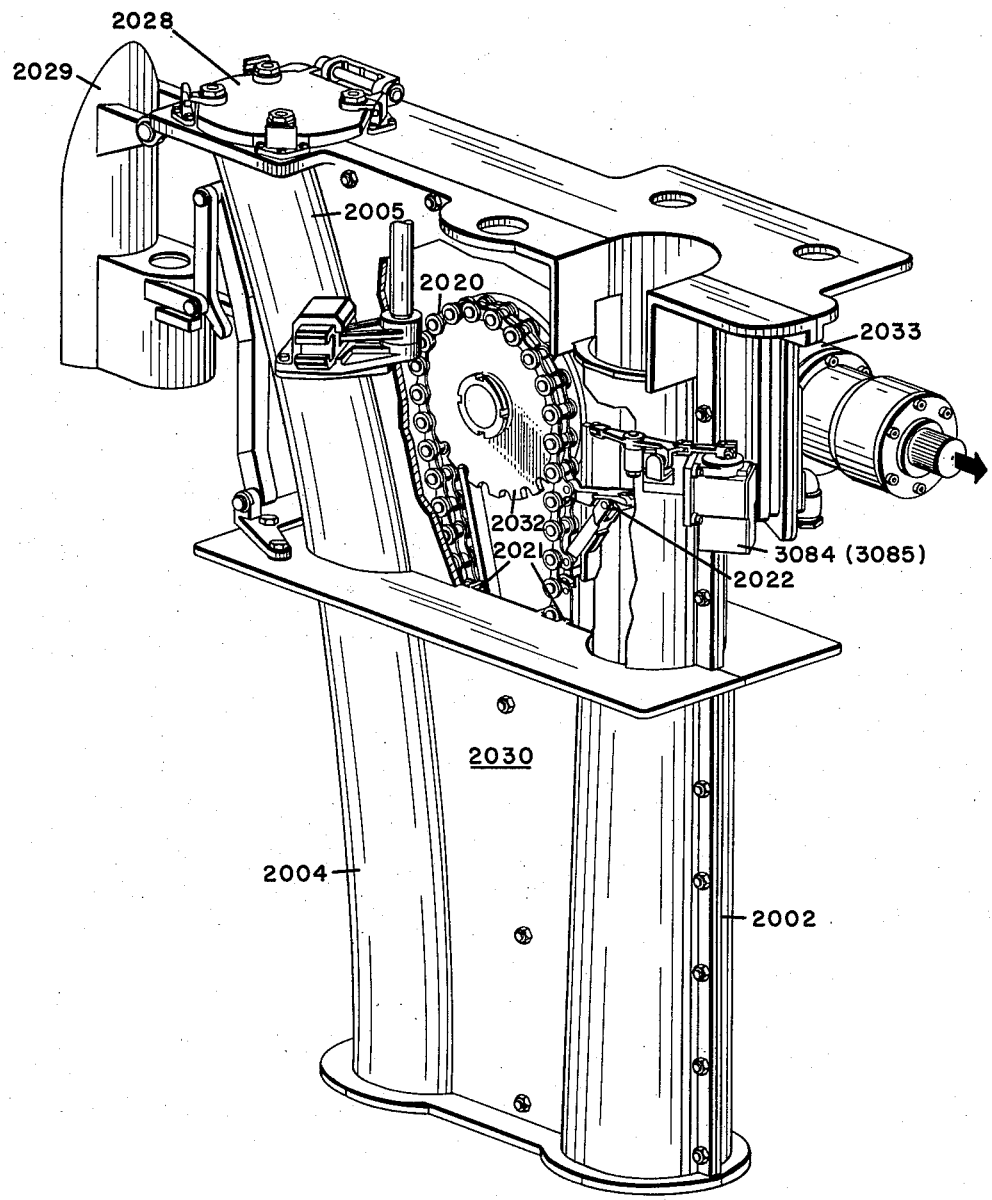
FIG. 13 is a cutaway view, in perspective, of the lower hoist upper sprocket and housing therefor.

Each hoist 2000 terminates in an upper sprocket housing 2030 as shown in FIGS. 6 and 13. Each housing 2030 is provided with a return chute 2005 which, in turn, is provided with a hinged and clasped return chute cover 2028 and a hinged strike-down tray 2029 for striking down rounds of ammunition. The tray 2029 and cover 2028 are illustrated in their open positions in FIGS. 53 and 54. In the latter figure, a projectile PJ is shown being guided into the return tube with the aid of a looped cable 2019, and a hand grip 2017. The strike down of rounds of ammunition will be described in detail subsequently.

Figure 13A:
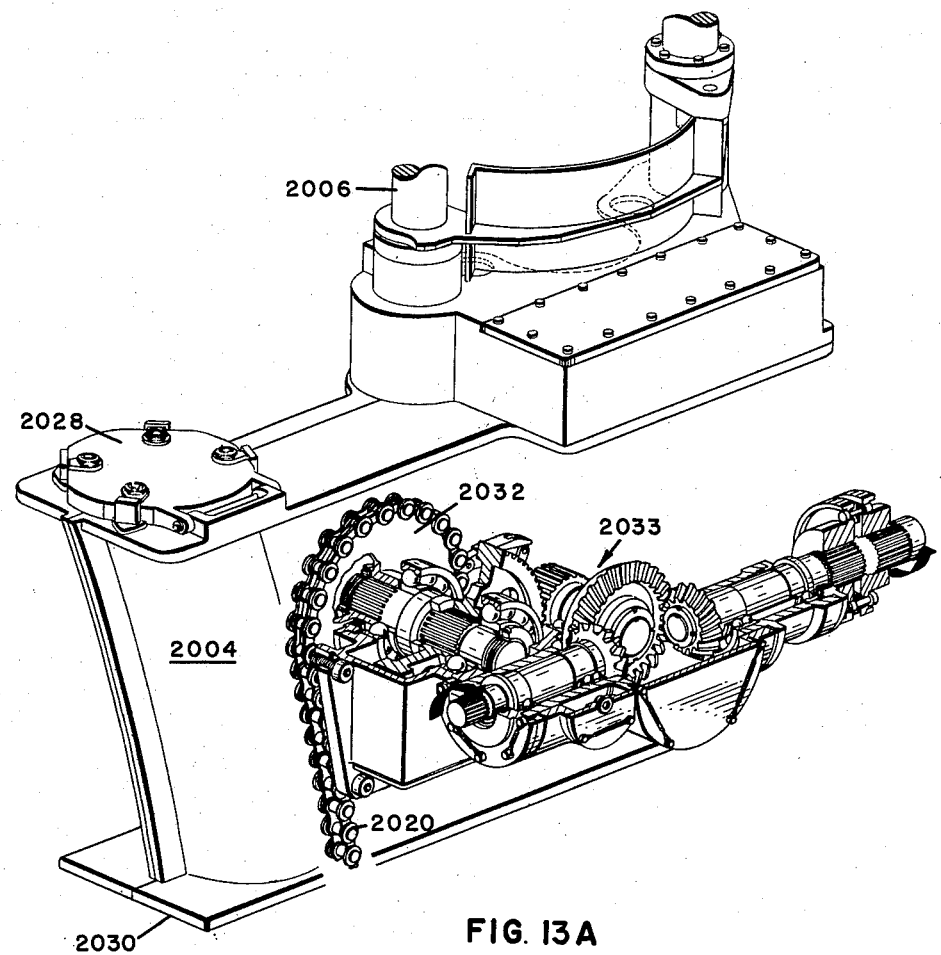
FIG. 13A is a perspective view of the opposite side of the lower hoist upper sprocket gearing and housing therefor shown in FIG. 13.

FIGS. 13 and 13A show how the hoist chain 2020 passes over an upper hoist sprocket 2032 which is shafted and journalled for driving from a sprocket drive gear reducer 2033.

*Hydraulic Operation of Ammunition Loaders*

Referring now to FIG. 7, the operating valve blocks 1030 and 1040, on the ammunition loaders 1000, are supplied with hydraulic fluid under pressure by an ammunition loader accumulator unit 1130. This loader accumulator unit 1130 is located in the handling room 506 of the vessel, and it consists of an electric motor 1132 which drives a constant discharge positive displacement helical gear pump 1134 to pressurize the hydraulic fluid from a fluid storage tank 1090 into a pneumatically charged bag-type accumulator flask 1136 to provide a servo fluid at regulated pressure hereinafter referred to as PA fluid. Hydraulic valve blocks 1030 and 1040 are identical. As stated, these blocks 1030 and 10404 drive drums 1008 and 1010 in impulse type indexing of the ammunition powder case and projectile drums 1010 and 1008, respectively.

FIG. 14 schematically shows valve block 1030 for indexing the powder case drum 1010. The rightward throw of a solenoid 1076 rotates a detented, pivotally mounted lever 1078 clockwise about its pivotal axis and shifts an index selector valve 1082 to the right end of its cylinder. In this position, valve 1082 allows PA fluid to circulate through its right land chamber to the underside of a clutch valve 1084.

It can be seen that PA fluid is also in communication with the upper end of differential valve 1084, which has the lower end thereof of greater area than the upper end thereof. Displacement of the valve 1084, therefore, is upwardly to the position shown in FIG. 14. As valve 1034 moves upwardly in its cylinder, it opens a passage near its bottom end, allowing PA fluid to flow down to an index acceleration limiting valve 1086.

In addition, this valve 1084 exhausts the right hand cylinder of a rack motor 1088 to the fluid storage tank 1090 through the land chambers of an index deceleration valve 1092 and a flow control valve 1094. Finally, valve 1084, through a linkage 1096 and a bell crank 1098, unlocks a clutch 1100. The completion of this action of the valve 1084 is communicated by means of a pair of interlock switches 1101a and 1101b.

Clutch 1100 is splined to a drive shaft 1102. It slidably transfers from a frame fixed clutch jaw 1104 to a portion of a clutch jaw 1106 of a movable operating sleeve 1108.

The PA fluid flows from the lower end of the valve 1084, and passes to the land chamber of valve 1086. From there, the PA fluid moves through the passage in the right land to the right end of the cylinder and starts valve 1086 moving to the left, allowing the PA fluid in the land chamber to begin flowing through a plurality of lengthwise tapered grooves 1110.

By gradually increasing the flow area for the PA fluid through these grooves 1110 as the valve travels, as shown by the arrow in FIG. 14, valve 1086 steadily increases the volumetric flow of the PA fluid to rack motor 1088. The rate of increase of flow of the PA fluid is governed by the speed at which acceleration limit valve 1086 moves to the left and opens the grooves 1110. A dashpot delay is introduced for this purpose by means of the closed left end of the cylinder of valve 1086 which has a built-in fluid leakage path.

Rack motor 1088 is provided with a rack 1112 which meshes with a rack gear 1114. Gear 1114, in turn, is fastened to the lower end of the clutch operating sleeve 1108, and it translates the linear thrust of motor 1088 into a torque which rotates the sleeve 1108 and the coaxial drive shaft 1102. The drive pinion 1028, shown in FIG. 9, of the previously described drive for drum 1008 is mounted on the end of shaft 1102. The gear train following has a step down ratio of ten to one. Therefore, because each index stroke of rack motor 1088 rotates pinion 1028 a half turn or 180 degrees, the resulting index interval of projectile drum 1008 (or powder case drum 1010) is 18 degrees which corresponds to the angular spacing of its rounds chamber 1012 (or 1014).

If the driven ammunition drum 1008 (1010) is lightly loaded, from the start to midway of the index stroke, a too rapid acceleration thereof is checked by restricting the exhaust of the PA fluid from the right hand cylinder of rack motor 1088. Valve 1094, in the path of this discharge, is spring loaded by a compression coiled spring 1095. The overly rapid discharge of hydraulic fluid from the valve 1092 to valve 1094 builds up a pressure in the right hand cylinder of valve 1094 as communicated through a passage 1093. This fluid moves valve 1094 to the left in the direction of the arrow and proportionally restricts the discharge outlet therefrom. It should be noted that this is an automatic runaway prevention and is effective before half stroke of index is reached.

Thereafter, a cam 1116, which is mounted on the operating sleeve 1108, gradually reduces the discharge of the fluid by moving valve 1092 to the right (arrow) until cut-off is reached at the completion of indexing of the drum.

After each index stroke, the throw to the right of a solenoid 1118, shown in FIG. 14, rotates the pivotally mounted lever 1078 and shifts the index selector valve 1082 into the left end of its cylinder and allows PA fluid below clutch valve 1084 to vent to the fluid storage tank 1090 (not shown in FIG. 14). Valve 1084 then moves downwardly due to the unopposed force of the PA fluid above it and pulls the linkage 1096 to move bell crank 1098 clockwise. This motion of the bell crank 1098 disengages clutch 1100 from clutch jaws 1106 and slides it upwardly over the splined portion of drive shaft 1102 into engagement with the fixed clutch jaw 1104. Shaft 1102 is now held stationary, and sleeve 1108 is free to rotate independently in retract stroke.

At the same time that the PA fluid below valve 1084 vents to the tank 1090 as stated around the right end of valve 1082, the PA fluid in lower valve 1086 vents to the tank through the passages in the left land of valve 1082. Valve 1086 then spring returns to the right, and positions its land chamber so that the left cylinder of rack motor 1088 is vented to the tank 1090.

The PA fluid is then passed by valve 1084 to the right cylinder of rack motor 1088 to begin the leftward retract stroke. Cam 1116 is now turning in reverse, and it allows valve 1092 to regain its original position to the left. During the retract stroke, valve 1086 acts as a runaway speed control in the same manner as related for valve 1094 during indexing.

A cam 1120, as shown in FIG. 14, is provided on operating sleeve 1108 to operate a switch 1122 and a switch 1124. These switches 1122 and 1124 are mounted 180 degrees from each other with respect to cam operation. Switch 1122 operates the solenoid 1076 to initiate the index stroke as related above, while switch 1124 operates solenoid 1118 to start the retract stroke.

*Hydraulic Operation of Lower Hoists*

Figure 42:
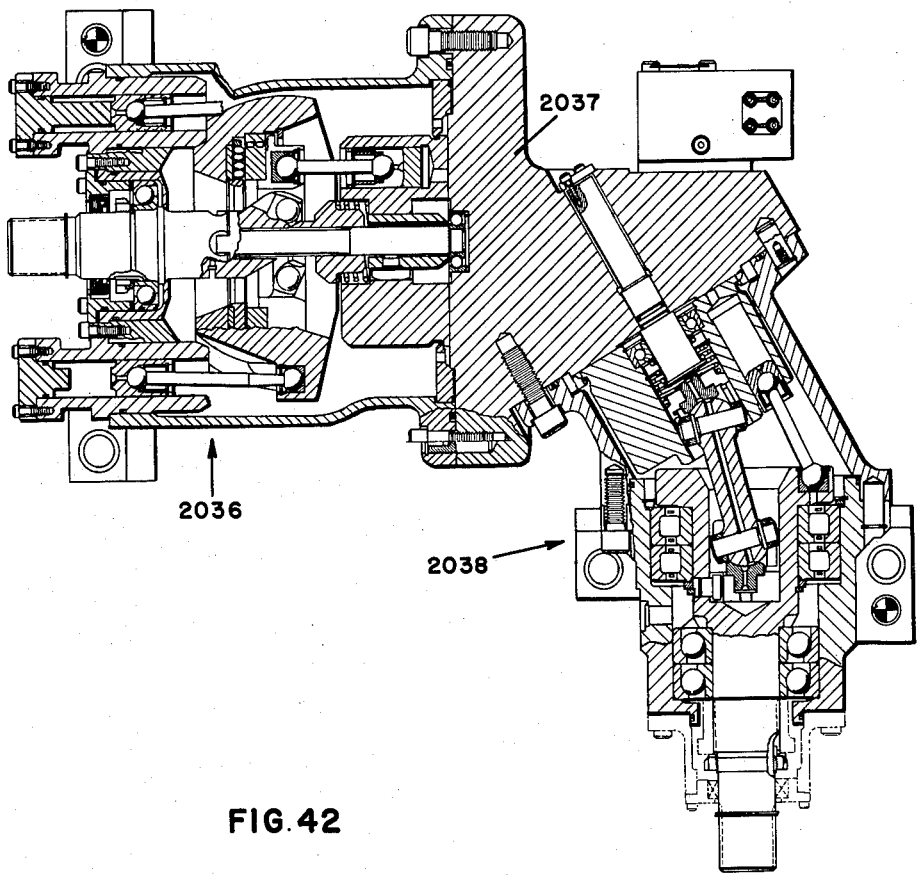
FIG. 42 is a sectional view of a lower hoist combination A-end and B-end unit (hereinafter referred to as CAB unit)

Referring now to FIG. 6 of the drawings, each of the two lower hoists 2000 is operated by its own combination A-end and B-end or CAB units 2034. These units 2034 are conventional hydraulic pump-motors of tilted plate, multi-piston type and consist of an A-end (pump) 2036 and a B-end (motor) 2038. A cross-section view is shown in FIG. 42. Detailed explanations of these units are given in U.S. Patent No. 2,365,067, issued on June 12, 1944, to John Gauld, for "Power Transmission."

Figure 41:
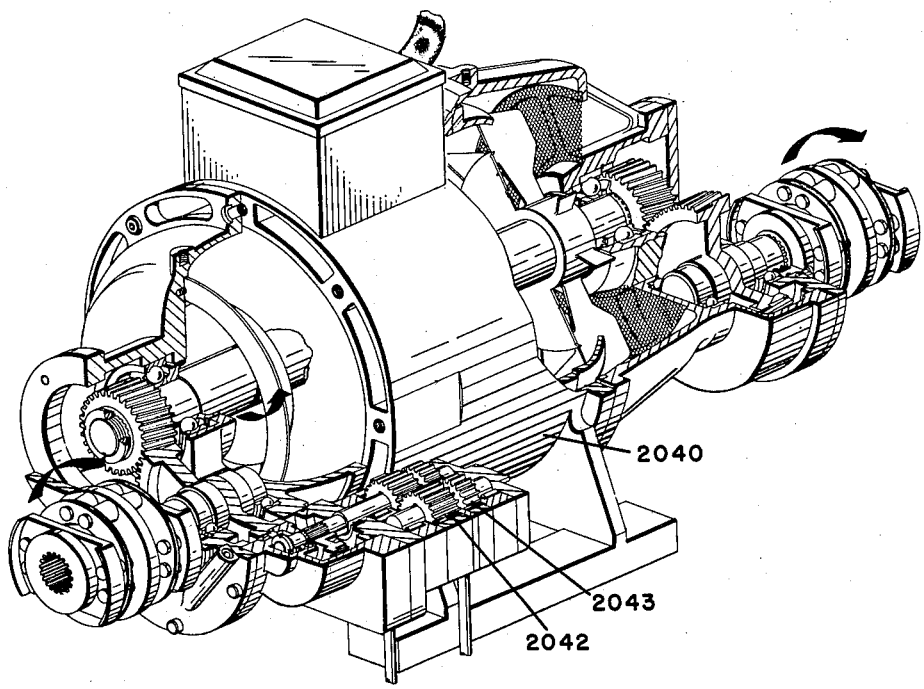
FIG. 41 is a cutaway view, in perspective, of a lower hoist electric motor and gear pumps therefor.

The two CAB units 2034 are both operated by a single electric motor 2040 (illustrated in detail in FIG. 41) which is equipped at each end with a drive shaft for this purpose. Each B-end unit 2038 is hydraulically connected to its associated A-end unit 2036 by means of an internal common valve plate 2037.

The accumulator system illustrated diagrammatically in FIG. 15, in addition to furnishing servo and supercharge pressures in the CAB units 2034, also furnishes operating pressure for the lower latch for the ammunition carrier 3000 to be described, and the power-off brakes. All of the pressure is supplied by a double tandem gear pump consisting of a servo gear pump 2042 and a supercharge gear pump 2043 which is fastened to a gear box located on one end of the double-ended electric motor 2040. A common suction line 2045 from a supply tank 2044 serves both pumps 2042 and 2043, but each pump has its own discharge line 2046 and 2047, respectively, feeding into an accumulator valve block 2050.

Figure 43:
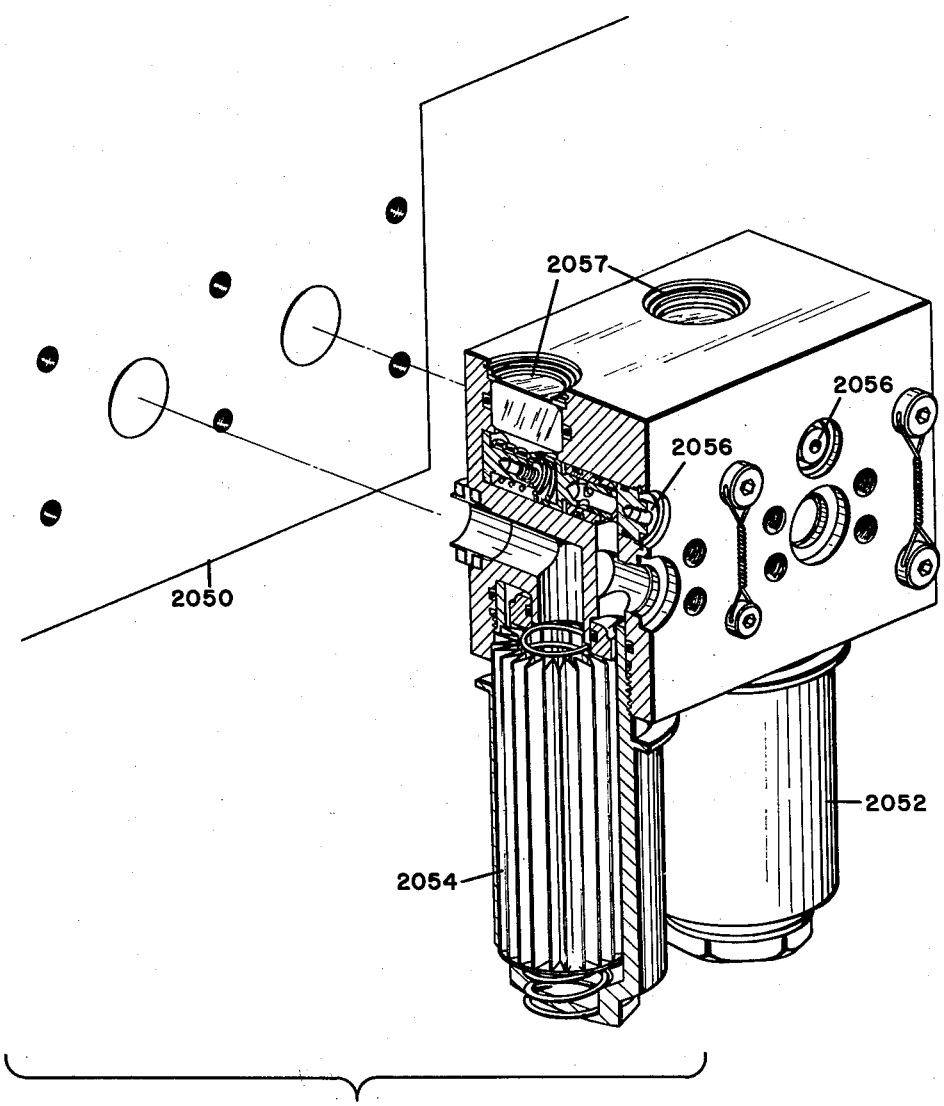
FIG. 43 is a perspective view, partly in section, of a fluid filter.

Accumulator valve block 2050 has filters 2052 and 2054 of a generally conventional nature, for each pump 2042 and 2043, respectively. Thus, all hydraulic fluid going to the accumulator and supercharge systems is filtered immediately upon entering the valve block 2050. The filter 2052 is provided for the servo line 2046 while the filter 2054 is provided for the supercharge line 2047. Each filter 2052 or 2054 has a spring loaded bypass valve 2056 to bypass fluid in case the filters 2052 and 2054 become clogged. In the actual valve as shown in FIG. 43, each valve 2056 includes an inspection window 2057 wherein the bypass action is made visible. A conventional bag-type accumulator flask 2070 is provided for storing servo pressure fluid, hereinafter referred to as PS fluid.

Figure 45:
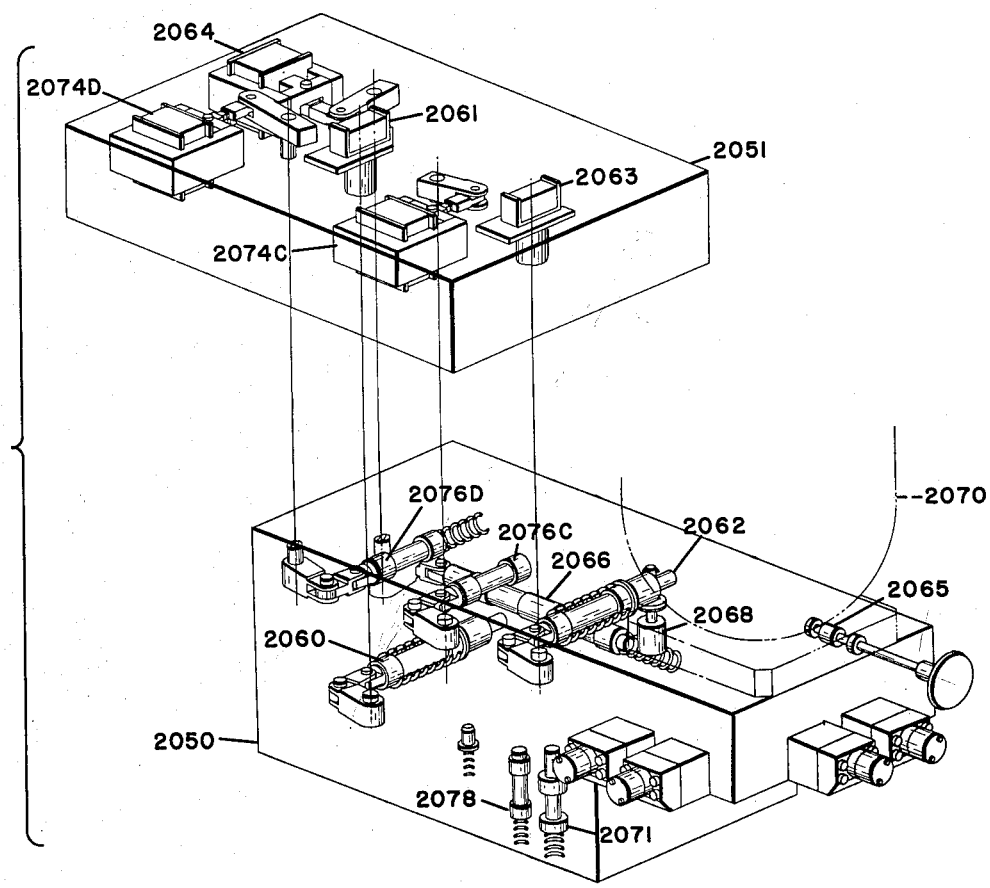
FIG. 45 is a perspective view of a lower hoist accumulator valve block assembly and solenoids therefor.

When the electric motor 2040 starts, as shown in FIG. 15, the pumps 2042 and 2043 build up the fluid in the system to a proper operating pressure almost immediately. This pressure acts against a pair of pistons 2060 and 2062 to control a servo pressure control switch 2061 and a supercharge pressure control switch 2063, respectively, in an associated accumulator solenoid housing 2051, generally shown in FIG. 6 and in detail in FIG. 45.

Figure 44:
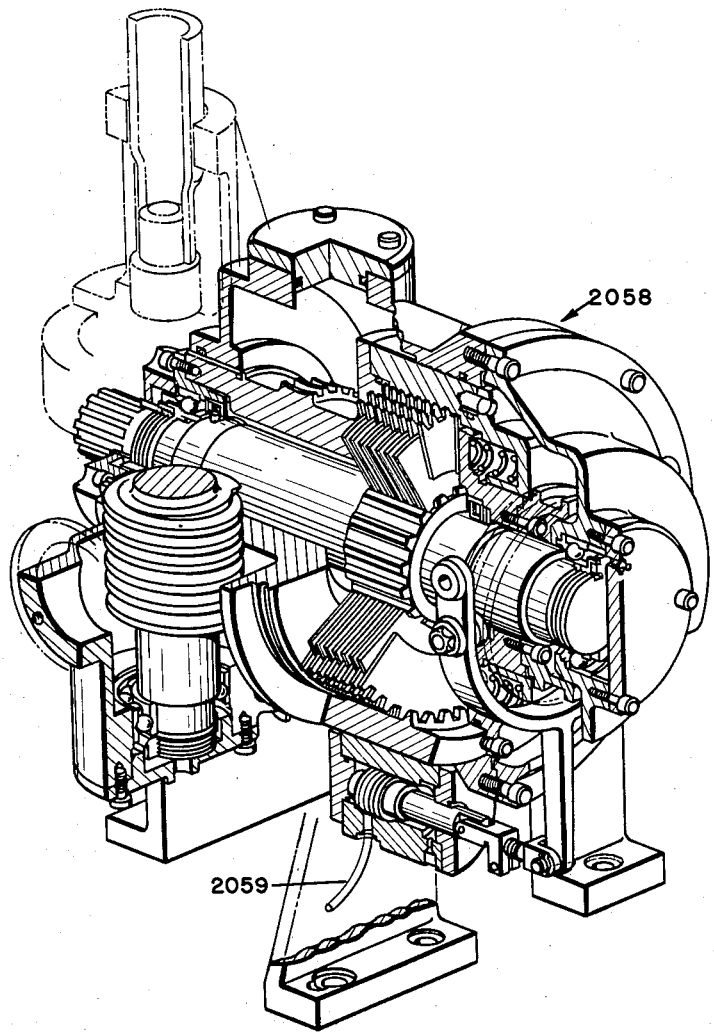
FIG. 44 is a perspective view, with parts removed, of a lower hoist brake.

When the proper operating pressure of the fluid builds up, switches 2061 and 2063 are actuated to energize a solenoid 2064, which, in turn, pushes a start control valve 2066. This allows servo pressure to flow through an external conduit 2059 to release a power-off brake 2058, shown in FIGS. 6 and 16 and the cut-away view of FIG. 44.

PS fluid in the servo system is maintained by a spring loaded servo relief valve 2071. This regulating relief valve 2071 opens a port leading to a bypass outlet conduit 2069 on the left side of FIG. 15 to tank 2044 through an intermediate A-end circulating conduit (not shown) whenever the pressure of the fluid exceeds a predetermined level.

Servo PS fluid enters the accumulator flask 2070 through a check valve 2068 and a manual unloading valve 2065 in the line to the flask. This check valve 2068 prevents immediate loss of fluid pressure in the servo system in the event that the servo pump 2042 fails.

If an electrical circuit for the hoist electric motor 2040 is broken, or if there is a power failure, solenoid 2064 will be de-energized.

A bleed port 2067 through the top land of the start control valve 2066, however, furnishes a time delay means for applying a power-off brake 2058 gradually. Power-off brakes 2058 will be described subsequently. This valve 2066 is held downwardly by the pressure above the top land, giving the electric motor 2040 time to stop, after which a spring 2072 pushes the valve 2066 upwardly to set the power-off brakes 2058 by cutting off PS fluid to a conduit 2059 leading thereto. This arrangement prevents excessive wear on the brakes 2058.

Valve block 2050 also has a brake control valve 2076 operated by a solenoid 2074. In practice, there are actually two solenoid-valve mechanisms 2074 and 2076, one for each hoist 2000C and 2000D. Each solenoid 2074 operates its own brake control valve 2076.

When the solenoid 2074 is energized, the valve 2076 will be pushed downwardly so that PS fluid will be cut off from the brake fluid conduit 2059 and the brake cylinder will be vented to the tank 2044 through the spring chamber of valve 2066.

The purpose of the supercharge system is to pressurize the suction side of the A-end transmission and thus make the hydraulic circuit more rigid. Supercharge pressure referred to as PSC fluid, is also used to seat a main relief valve 2080, shown at the upper right of FIG. 16, at low transmission differential pressures.

PSC fluid is maintained by a supercharge relief valve 2078. Any PSC fluid in excess of that required to maintain the supercharge system at the predetermined pressure PSC is bypassed to the tank 2044 through the previously mentioned A-end circulating conduit 2069.

Figure 46:
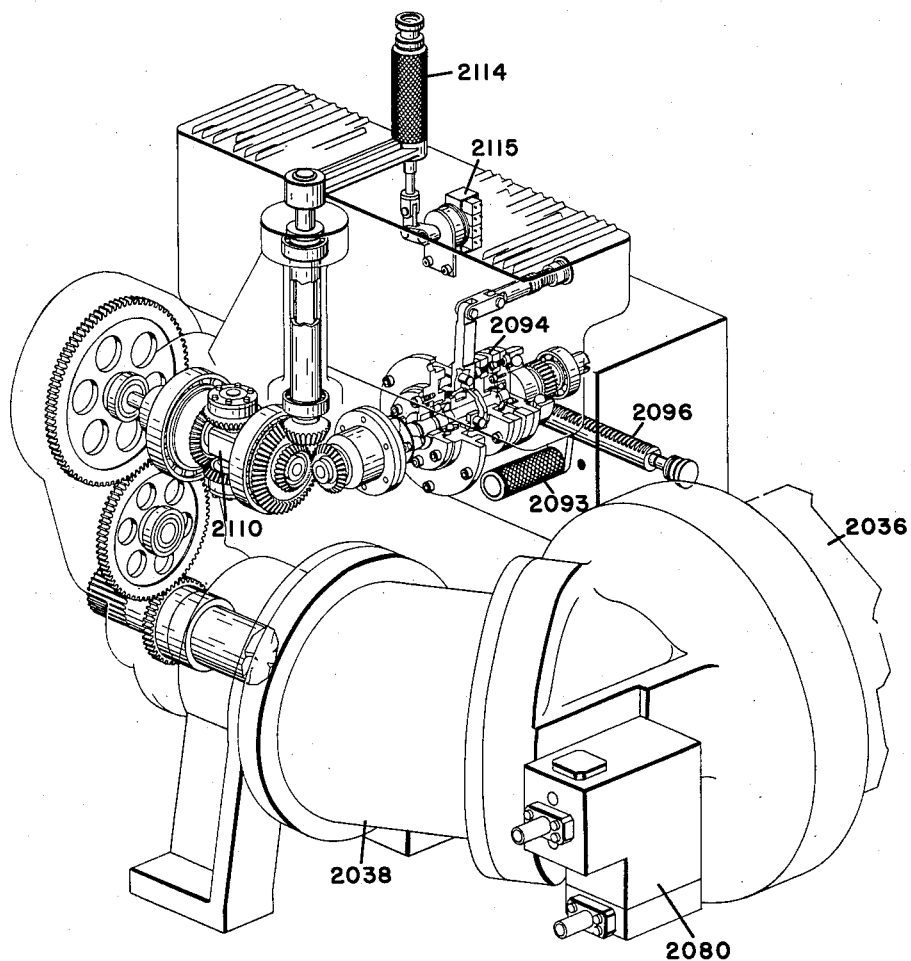
FIG. 46 is a perspective view, with parts removed, of a B-end response arrangement.

The main relief valve 2080 is mounted and connected as illustrated in FIG. 46 between each A-end unit 2036 and B-end unit 2038. It is also shown schematically at the top right of FIG. 16. Valve 2080 is set to relieve at a maximum differential pressure PD. This valve 2080 is a conventional duplex type, and it operates in either direction to bypass fluid around the B-end unit 2038 in case of extreme overload thereon.

When the proper electrical switches have been positioned and servo and supercharge PS fluid and PSC fluid, respectively, are up to normal, the power-off brake 2058 is released, as shown in FIG. 16. Servo PS fluid flowing through the conduit 2059 from the accumulator valve block 2050, forces the release piston of the power-off brake 2058 against spring pressure. This action releases the pressure on the discs of the brake 2058 so that the fixed and moveable discs thereof may rotate past each other.

Figure 47:
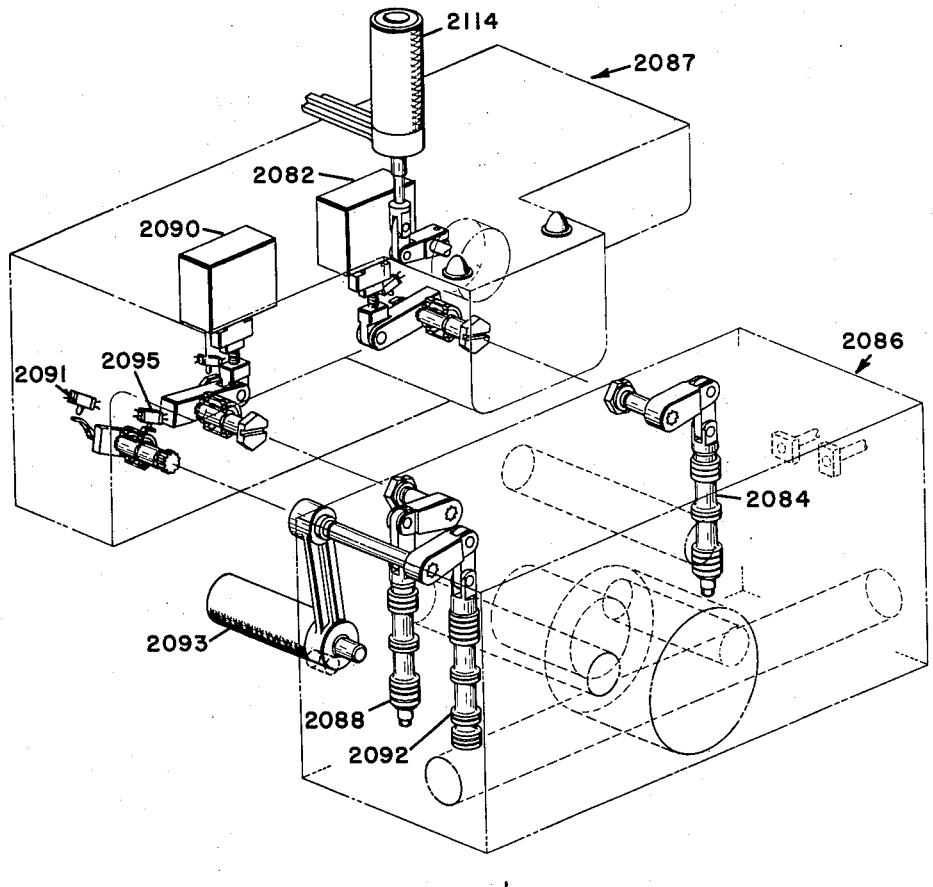
FIG. 47 is a perspective view, with parts removed, of a lower hoist valve block assembly and solenoids therefor.

When a start solenoid 2082, in a control solenoid housing 2087 of FIG. 47, is energized, a start valve 2084, contained in a control valve block 2086, is shifted downwardly to actuate an interlock switch 2083. Servo PS fluid then flows through the passageway between the center and top lands of the valve 2084 and out to passageways leading to other valves and pistons in the control valve block. PS fluid moves through the passageways to a transfer valve 2088, as shown in FIG. 16. This valve 2088 is controlled by a solenoid 2090, also shown in FIG. 47, but since this solenoid is energized only on "Local" control, valve 2088 is held upwardly in its chamber by the spring in the bottom of the valve chamber.

Servo PS fluid thus moves on to a local valve 2092. This valve is manually detented into the "Automatic" position by an operations selector lever 2093 during automatic operation, and servo PS fluid flows through the passageway formed between the top two lands of the valve. From here, the fluid flows to passages leading to the piston of a clutch 2094, pushing it downwardly to disengage the clutch. Lever 2093 has interlock switches 2091 and 2095 which indicate whether it is in "Local" or "Automatic," respectively.

Figure 48:
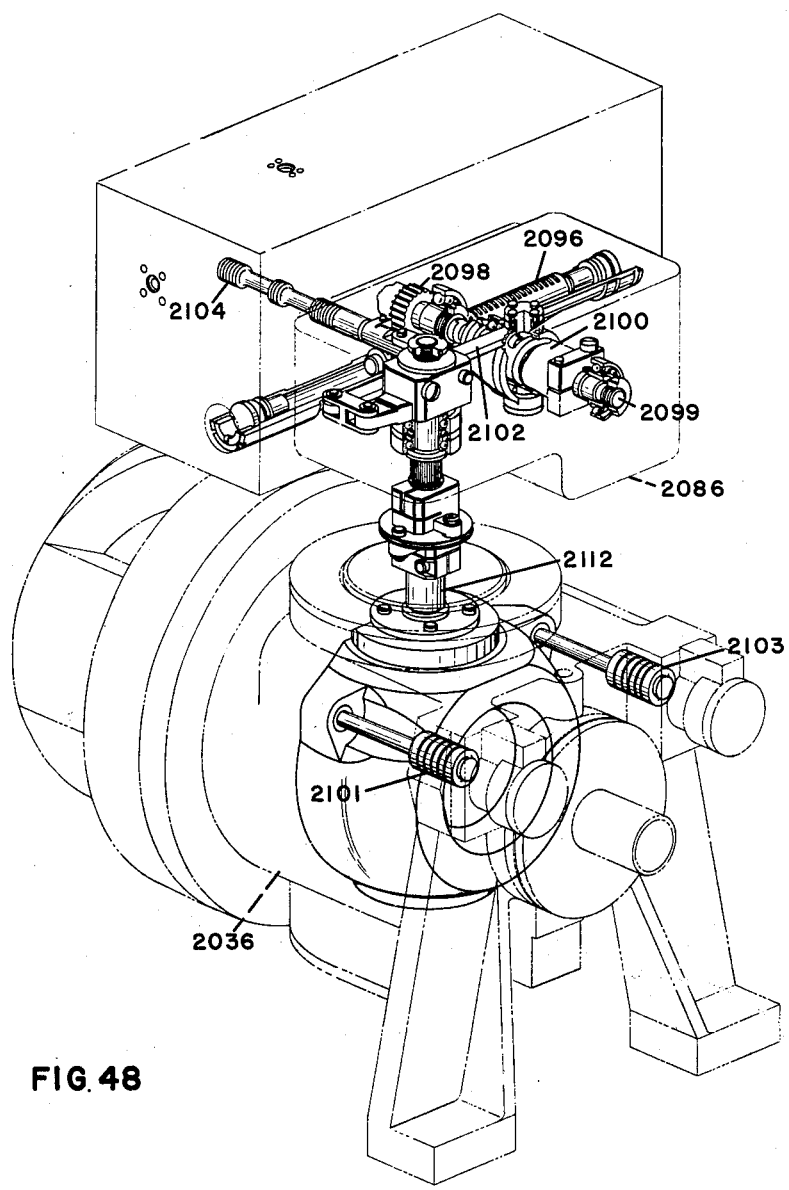
FIG. 48 is a perspective view, with parts removed, of an A-end response arrangement.

Servo pressure fluid also flows through passages leading to the left end of a rack piston 2096 which meshes with a pinion 2098. This is shown in detail in FIG. 48. This pinion 2098 is fastened to a shaft 2099 on which a barrel cam 2100 is mounted. As the rack piston 2096 moves to the right, the barrel cam 2100 is turned and a lever 2102 leading to a servo valve 2104 is pushed upwardly. The rate of fluid flow to the rack piston 2096 is limited by a constriction 2106 in the inlet line.

As the servo lever 2102 moves upwardly, a servo valve 2104 also moves upwardly, allowing servo pressure fluid to flow through a passageway between the bottom and center lands of the valve and out to the right-hand stroking piston 2103 of A-end unit 2036. The rate of stroking is limited by the exhaust fluid from the left-hand stroking piston 2101 as it passes through the exhaust end of the servo valve 2104 and out to a metering valve 2108.

As the B-end unit (motor) 2038 begins to rotate and drive hoist sprocket 2032, a response is fed from the B-end motor 2038 to the lower gear of a differential 2110 and into the clutch 2094 housing. Since the clutch 2094 is disengaged, however, only the lower half of the clutch will rotate and no response will be fed back to the barrel cam 2100.

As the barrel cam 2100 rotates under command of rack piston 2096, the servo valve 2104 is pulled upwardly to allow servo PS fluid to reach the right-hand stroking piston 2103 as stated. As the A-end pump unit 2036 goes on stroke, a tilt plate shaft 2112 is turned in a counter-clockwise direction. As the tilt plate shaft 2112 rotates, the A-end response, working through the stroke control lever 2102, brings the servo valve 2104 back to neutral. When the servo valve 2104 is brought back to neutral, the A-end unit 2036 is on full stroke and it is stopped in this position not only by the servo valve 2104 but by the internal left-hand stroke piston 2101 of the A-end unit 2036 which is now against its stop. The A-end unit 2036 is now operating at full speed, with the angle of the A-end tilt plate being the sole speed-governing factor.

To decelerate the drive, the circuit to start solenoid 2082 is opened. Spring loading shifts the start valve 2084 upwardly to the position shown. Servo PS fluid now enters the valve 2084, flows through the chamber between the middle and lower lands of the valve, through the transfer valve 2088 and local valve 2092 to the lower end of the control piston of clutch 2094. This engages the clutch and couples the response of the B-end motor unit 2038 through differential 2110 to the barrel cam 2100.

Servo PS fluid also flows through the start valve 2084 to the right-hand end of the rack piston 2096 tending to push the piston to the left. As the B-end motor unit 2038 rotates, the response is fed to the barrel cam 2100 to push the servo valve 2104 downwardly to the position shown. Servo pressure then flows through the upper land chamber of the valve 2104 to the left-hand stroking piston 2101 of A-end pump unit 2036, turning the tilt plate shaft 2112 in a clockwise direction back to neutral. The rate of stroking is governed by the feed-back B-end response. As the A-end unit 2036 strokes back to neutral, the A-end response brings the servo valve 2104 to neutral, thus cutting off servo PS fluid to the stroking piston.

If the clutch 2094 should fail, the hoist drive would still be decelerated by the rack piston 2096 and metering valve 2108. The rate of acceleration in this case would be somewhat greater than if the clutch 2094 were used for deceleration.

Local control is used for "striking down" rounds of ammunition through the return tube 2004, that is, for unloading rounds of ammunition from the lower hoists 2000 and the upper ammunition handling and loading subsystem and returning the rounds of ammunition to the loader room. In this type of operation, the hoist 2000 is operated by means of a local handcrank 2114.

During "Local" control, a released crank interlock switch 2115, as shown in FIG. 16, de-energizes the start solenoid 2082 and the spring at the bottom of start valve 2084 holds the valve 2084 in the position shown. Servo PS fluid flows through the chamber between the center and bottom lands of the valve 2084 into passageways leading to the deceleration or right-hand end of rack piston 2096. When the operations selector lever 2093 has been moved to "Local" and solenoid 2090 has been energized, fluid flows through the upper land chamber of transfer valve 2088, thence through the center land chamber of local valve 2092 to the operating piston of clutch 2094. This engages the clutch discs.

When the hand crank 2114 is turned, clutch 2094 will transmit the motion to barrel cam 2100. Response from B-end motor unit 2038, working through differential 2110, continually tends to return barrel cam 2100 to neutral. Therefore, as long as cranking of the handcrank 2114 continues, the position of barrel cam 2100 and consequent position of the A-end tilt plate shaft 2112 will be determined by the speed at which handcrank 2114 is turned. Thus, by faithfully following the rate response fed into it by the crank, the CAB unit is commanded to operate the hoist 2000 as if the crank 2114 itself were the power source.

*Lower Hoist Transfer Stations*

As previously stated, the hoist sprocket 2032, for each lower ammunition hoist chain 2020, is mounted in the uppermost section of the hoist 2000. The lower end of housing 2030 bolts to the hoist tube 2002, and the upper end thereof extends through a rectangular opening in the carrier room deck 504 where it is located relative to the centerline of the mount 6000 and is secured, as best illustrated in FIGS. 1, 5, and 13.

The chain hoist sprocket 2032 and the gear reducer unit 2033, as shown in FIG. 13, are located in the housing bore to insure alignment of the sprocket 2032 with relationship to a chain track 2021 in the housing 2030.

The transfer tube 2006, as shown in FIG. 1 and partially in FIG. 13A, is mounted on the top flange of this upper sprocket housing 2030 and is aligned with the centerline of the hoist tube 2002.

Figure 17:
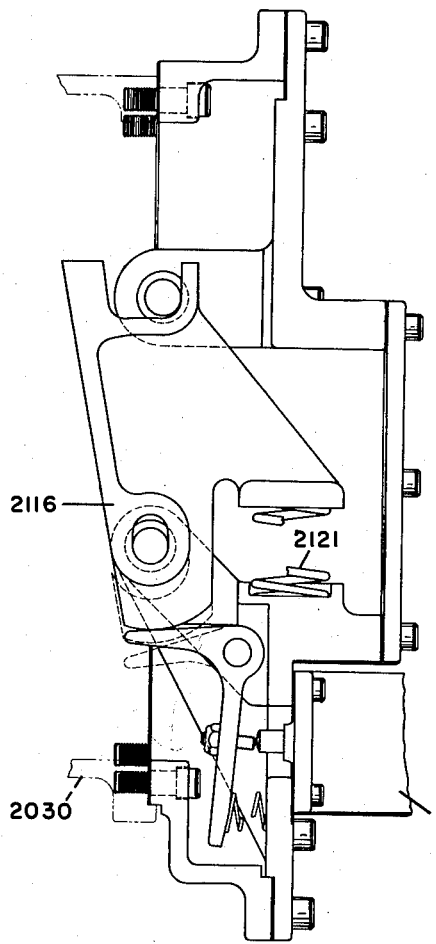
FIG. 17 is a side elevation, partially in section, of a level pawl.

A round of ammuntion consisting of powder case PC and projectile PJ, on being raised by the lift pawl 2022 on the chain 2020, passes through housing 2030, enters the transfer tube 2006, and is guided by transfer tube shutters 2007, as shown in FIG. 6. As the lift pawl 2022 on the chain 2020 moves around the drive sprocket 2032, it leaves the base of the ammunition powder case PC which is supported upon a transfer level pawl 2116, shown in detail in FIG. 17. Transfer level pawl 2116 is spring-loaded by a compression coiled spring 2121 and extends into the ammunition passageway of housing 2030 at a level with the centerline of drive sprocket 2032. Pawl 2116 holds a round of ammunition at the transfer level in a ratchet-like action. An interlock switch 2117, which indicates that the pawl 2116 is extended, operates from this pawl 2116 by the weight of the round of ammunition nesting thereupon.

Figures 49, 50:
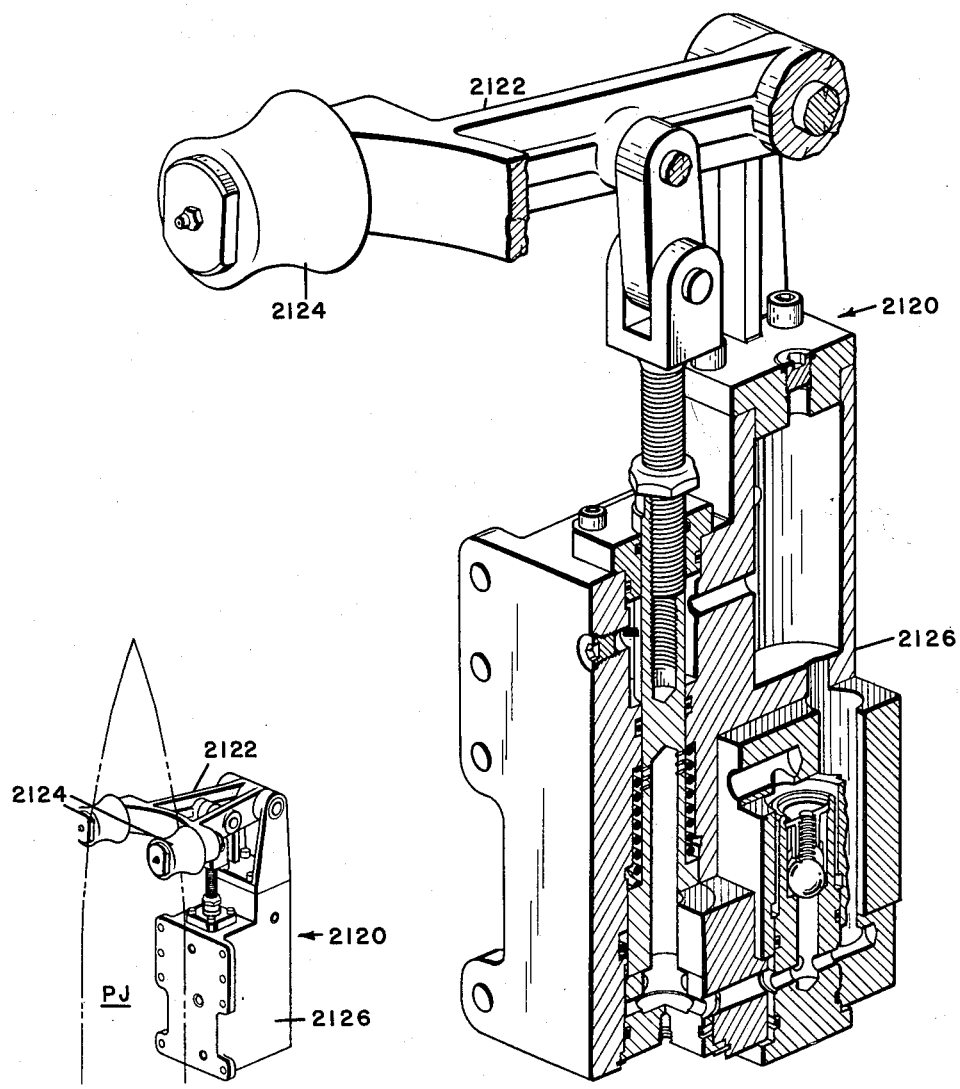
FIG. 49 is a perspective view, of a transfer tube buffer with a projectile in position therein.
FIG. 50 is an enlarged perspective view, partly in cross-section, of the transfer tube buffer of FIG. 49, with the projectile removed therefrom.

An ammunition deceleration buffer 2120, as shown in FIG. 50, is mounted at the top of the transfer tube 2006, as shown in FIG. 6. Its function is to bring the upwardly moving round of ammunition to a smooth halt at the transfer level. This action is accomplished by means of a buffer yoke 2122. Yoke 2122 has, at its tips, steel spools 2124 shaped to conform to the ogive of the ammunition projectile PJ as it engages diametrically opposite points thereon, as best illustrated in FIG. 49. Yoke 2122 is pivoted and is linked to a hydraulic check valve 2126.

A switch 2127, as shown in FIG. 52, is mounted on the door of transfer tube 2006 to indicate when a round of ammunition is contained therein. Another switch 2129 is provided to sense whether the door is open or closed.

Ammunition Carrier

Figure 19:
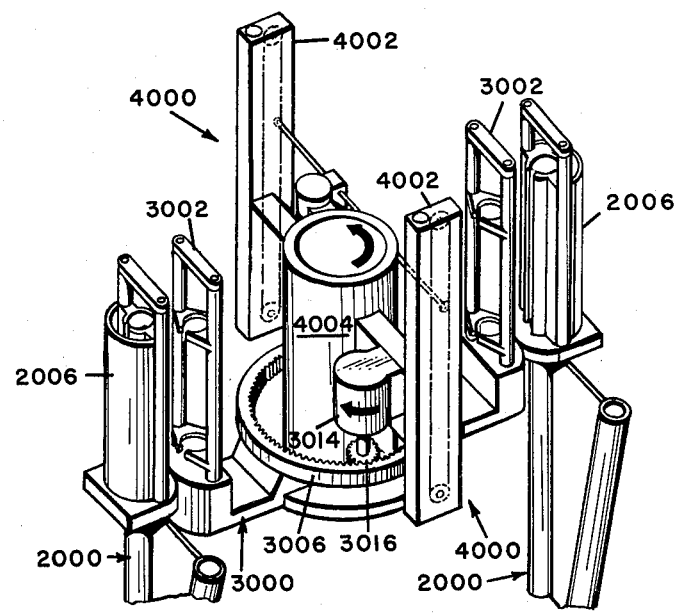
FIG. 19 is a perspective view of elements of the ammunition carrier with the mount trained 89° from its normal position.

The ammunition carrier 3000 is installed aboard the vessel as part of the carrier-upper hoist-center column assembly. FIG. 19 shows the basic components of this assembly in diagrammatic relationship.

The tubes 3002 of bi-direction, rotatably mounted ammunition carrier 3000 receive rounds of ammunition laterally from the transfer tubes 2006 of the lower hoists 2000, and deliver them to the tubes 4002 of the upper hoists 4000 and then return to the transfer tubes 2006 for more rounds of ammunition.

The transfer tubes 2006 of the lower hoists 2000 are fixed within the ship structure. The upper hoists 4000, as previously mentioned, are secured to the underside of the gun mount 6000 of the gun 6002 and move with it in train.

This design of the ammunition carrier 3000 enables it to deliver rounds of ammunition to the upper hoist 4000 regardless of the position of the gun mount 6000 in train, to synchronize with the gun mount at all training speeds, and to rotate from the lower to the upper hoists 2000 and 4000, respectively, or vice versa, in either a clockwise or a counterclockwise direction as required to perform its function most efficiently.

The two arms of the center column support bracket 4006 are used for mounting the entire carrier assembly to the underside of the mount base (not shown). The bottom of the support bracket 4006 is secured to the top of the center column 4004. Since the upper hoist 4000 is rigidly fastened to the center column 4004, it, therefore, moves with the gun mount 6000 in train.

The ammunition carrier 3000 is mounted, however, on radial bearings around the base of the center column 4004, and it is, therefore, free to move around the center column 4004 as the ammunition carrier control mechanism may direct.

The principal components of the ammunition carrier assembly are a carrier spider 3004, the spaced carrier tubes 3002, an upper and a lower latch mechanism 4010 and 3010, respectively, a carrier control 3012, and a B-end hydraulic motor unit 3014 and a drive pinion 3016, as best illustrated in FIG. 19. All of these units are mounted around the center column 4004.

The carrier spider 3004 is installed on the lower end of the center column 4004 and consists of a hub with six arms extending outwardly therefrom. The spider 3004 is utilized as the foundation on which the carrier assembly is built.

The bottoms of the two carrier tubes 3002 are bolted to two long arms 3008 of the carrier spider 3004, with the arms being 180 degrees apart. A ring-shaped carrier track 4008, attached to the underside of the gun mount 6000, provides a path for a plurality of roller bearings 3026 mounted at the upper ends of the carrier tubes. This arrangement, combined with a series of brace rods 3027 fastened to the shorter spider arms 3009, hold the tubes in proper alignment with both the lower and upper hoists 2000 and 4000, respectively, and permit the ammunition carrier 3000 to rotate between the hoists as a rigidly constructed assembly.

Figure 21:
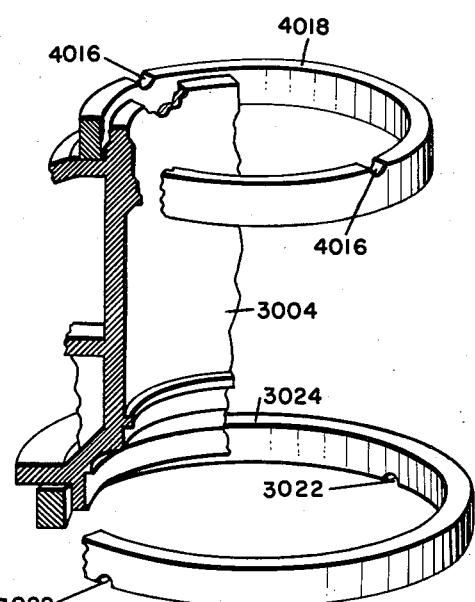
FIG. 21 is a fragmentary perspective view of the ammunition carrier showing the latch notches provided therein.
Figure 20:
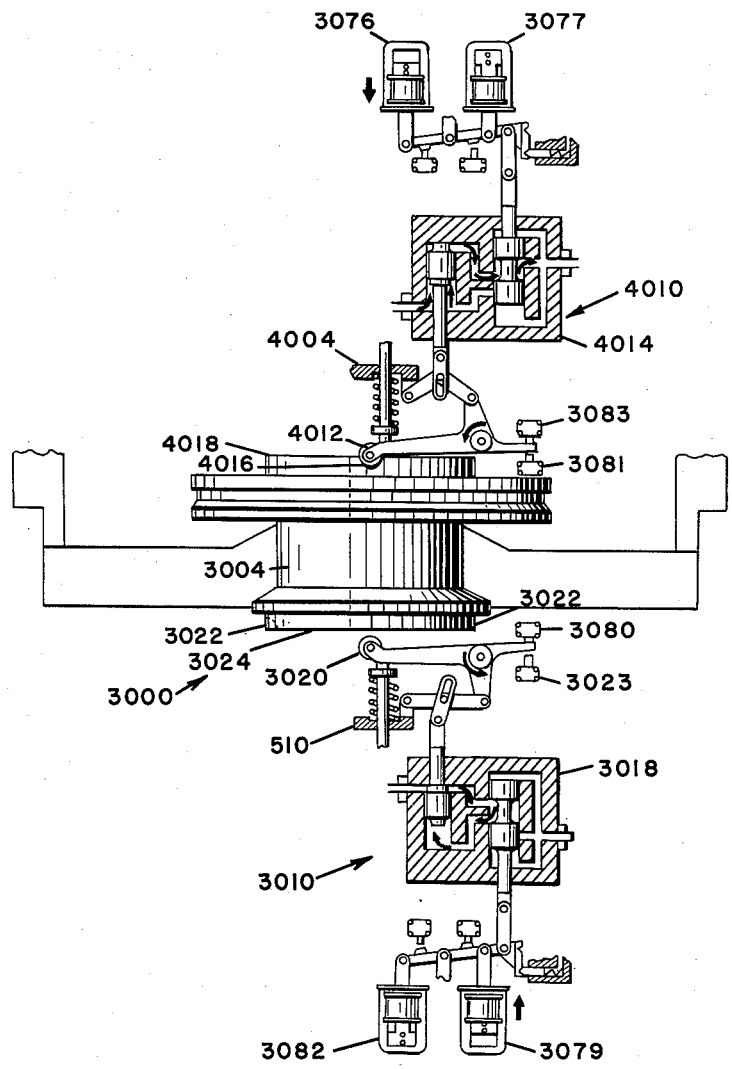
FIG. 20 is a front elevation, partly in vertical section, of a latching mechanism.

When the ammunition carrier 3000 rotates to the position at the upper hoist 4000, it is held there by the carrier upper latch mechanism 4010, which consists of a latch lever and roller assembly 4012, and a solenoid-operated valve block 4014, as shown in FIG. 20. The upper latch lever and roller assembly 4012, which is fastened to the center column 4004, drops into either of a pair of notches 4016 in an upper latch ring 4018, as illustrated in FIG. 21, to hold the carrier tubes 3002 in place at the upper hoist tubes 4002.

When the carrier tubes 3002 are in position at the transfer tubes 2006 of the lower hoists 2000, the ammunition carrier 3000 is held in place by the carrier latch mechanism 3010. This latch mechanism 3010 is fastened to a cable well assembly 510 (in a compartment below the carrier room) and is controlled by a solenoid-operated valve block 3018, as shown in FIG. 20. A roller and lever assembly 3020, which is fastened to the cable well 510, fits into either of a pair of notches 3022 spaced 180 degrees in a lower latch ring 3024 to hold the ammunition carrier 3000 in place at the lower hoists 2000. A switch 3023 is provided to indicate that the ammunition carrier 3000 is latched to the lower hoists 2000. Both of the latch rings 4018 and 3024 are fastened to the carrier spider 3004. Upper notches 4016 and lower notches 3022 in the latch rings 4018 and 3024, respectively, are displaced 90 degrees relative to each other as shown in FIG. 21.

Each carrier tube 3002 receives a round of ammunition from one of the lower hoist transfer stations 2006, retains it in a neutral position while the carrier 3000 rotates to the upper hoist 4000, and then ejects it into one of the upper hoist tubes 4002.

Figure 22:
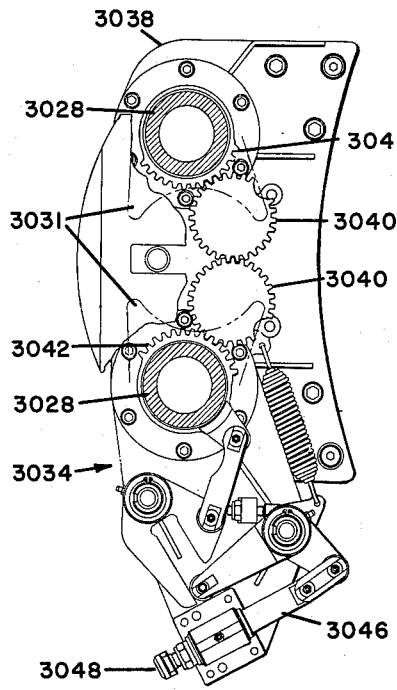
FIG. 22 is a top plan view, partly in section, of a carrier lower linkage.
Figure 23:
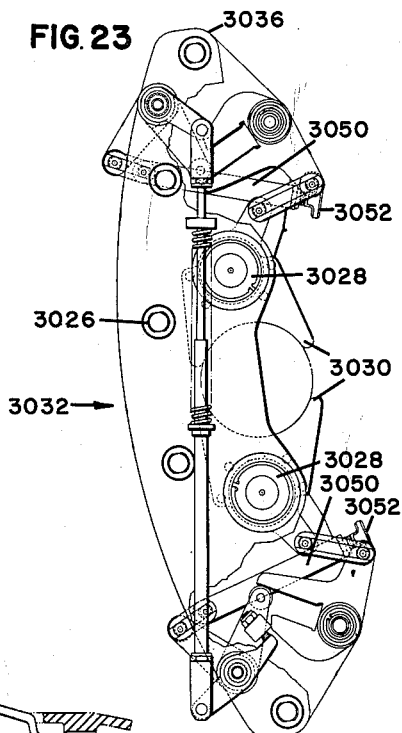
FIG. 23 is a top plan view, partly in section of a carrier upper linkage.

Each carrier tube 3002 consists essentially of two vertical tubular shafts 3028 to which two pairs of ejector plates 3030 and 3031 for the projectile PJ and powder case PC, respectively, are attached. A set of actuating linkages 3032 is located at the top and another set of linkages 3034 at the bottom of an upper and a lower tube housing 3036 and 3038, respectively, as best shown in FIGS. 22 and 23. Lower linkage 3034 has a pair of idler gears 3040 which mesh together and to sector gears 3042 at the lower ends of shafts 3028. The shafts 3028 are thereby made to be cooperatively rotatable in opposite directions, and can be operated from either top or bottom linkages 3032 or 3034.

Each carrier tube 3002 has two sets of ejector plates 3031 for the powder case PC, and two sets of ejector plates 3030 for the projectile PJ. Both sets of ejector plates, 3030 and 3031, are attached to the tubular ejector shafts 3028 and are machined to fit the contour of the rounds of ammunition.

Figure 18:
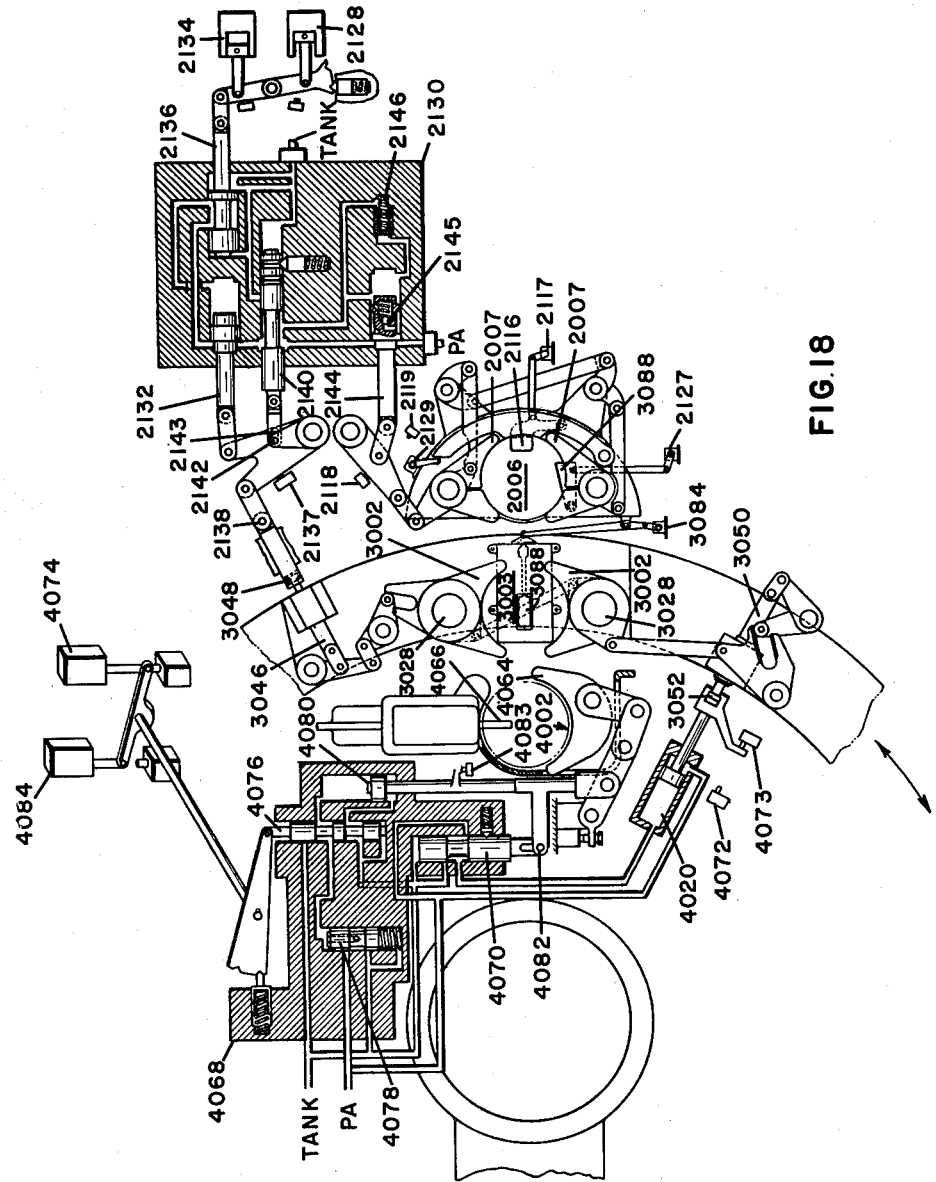
FIG. 18 is a schematic plan view partly in horizontal section of a transfer mechanism.
Figure 51:
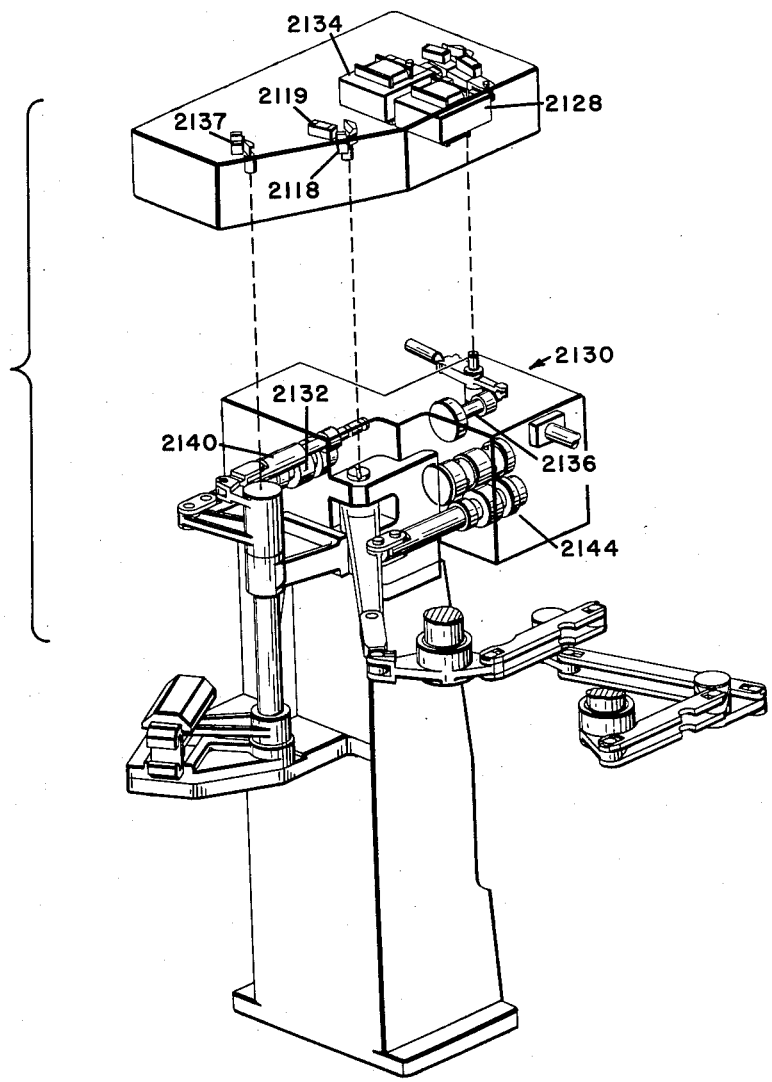
FIG. 51 is a perspective view, with parts removed, of a transfer tube control valve block assembly and solenoids therefor.

The lower ends of the ejector shafts 3028 are connected to the linkage 3034, as shown in FIG. 22 and diagrammatically illustrated in FIG. 18. Linkage 3034 is actuated by a piston 2132 located in the lower hoist transfer valve block 2130 illustrated in FIG. 51. As shown in FIG. 18 the carrier tube 3002 has a slide bar 3046, and a button 3048 which engages the piston 2132 mechanism when the carrier 3000 is at the lower hoist ammunition transfer station.

Outward movement of the slide bar 3046 opens the ejector plates 3030 and 3031 of carrier tube 3002 to receive a round of ammunition from the transfer tube 2006. Inward movement of the slide bar 3046 returns the ejector plates 3030 and 3031 of carrier tube 3002 to a neutral (or closed) position, as shown in FIG. 18, where the round of ammunition is held until ejected into the upper hoist tube 4002.

The upper ends of the ejector shafts 3028 are connected to the previously mentioned actuating linkage 3032 as shown in FIG. 23, which is actuated by a piston 4020 located on the center column 4004, as shown in FIG. 18.

This linkage 3032 has a slide bar 3050 and button 3052 which engage the piston 4020 when the ammunition carrier 3000 is latched to the mount center column 4004.

Inward movement of the slide bar 3050 ejects a round of ammunition from the carrier tube 3002 into an upper hoist tube 4002. Outward movement of the slide bar 3050 returns the ejector plates 3030 and 3031 of carrier tube 3002 to a neutral or closed position.

As will be noted in FIG. 23, actuating button 3052 with its associated linkage is provided in duplicate in the actual embodiment of the invention. The reason for the duplication of elements is because the right and left hand carrier ejector pistons 4020L and 4020R are not mounted diametrically opposite each other on the upper hoist tubes 4002L and 4002R, respectively. In this way, both ammunition carrier tubes 3002 are ambidextrous and either may stop and cooperate with either upper hoist 4000.

*Hydraulic Operation of Ammunition Carrier Tubes and Transfer Tubes*

In FIG. 18, when a solenoid 2134 is energized, a valve 2136 moves to the right. This cuts off PA fluid to the right side of piston 2132 and vents the right-hand end of its cylinder to the tank. PA fluid now acts on the left-hand end of piston 2132 and pushes it to the right. This action pulls a linkage 2138, leading to the carrier tube actuating button 3052, and swings open the ejector plates 3030 and 3031 of carrier tube 3002 toward the transfer tube 2006.

Just before the carrier tube ejector plates 3030 and 3031 reach their fully open position, a spring detented valve 2140 is actuated by a segment of the shutter operating linkage. This linkage segment contains a pin 2142 which slides in a slotted portion 2143 of the punger of valve 2140. FIG. 18 shows that the pin 2142 must move to the right to the limit of the slot 2143 before valve 2140 is actuated. It is also to be noted that PA fluid is ported to both ends of a piston 2144. Since the right-hand end of the piston 2144 contains the greater surface area, however, the piston will remain in the position shown.

Let it now be assumed that valve 2140 has been moved to the right to its second detent position. This cuts off the PA fluid to the right-hand side of piston 2144 and vents this end of the piston to the tank. With no effective pressure on the right side of piston 2144, PA fluid on the left-hand side of the piston moves it to the right.

A check valve 2145 inside piston 2144 prevents fluid from leaking out through the piston. Fluid is then forced to exit through the line containing a valve 2146. Valve 2146 is a metering valve with a fixed orifice located in the head of its valve plunger. This valve 2146 acts as a variable orifice in the exit line from the chamber of piston 2144. The rate of fluid discharge from the end of piston 2144 is thereby controlled, thus governing the speed at which the round of ammunition is ejected into the open ejector plates 3030 and 3031 of carrier tube 3002 from transfer tube 2006. A pair of interlock switches 2118 and 2119 indicate that the transfer tube shutters 2007 are extended or retracted.

When a solenoid 2128 is energized instead of its companion solenoid 2134, the ejector plates 3030 and 3031 of carrier tube 3002 and shutters 2007 of transfer tube 2006 are brought back to neutral as will now be explained.

Valve 2136 exposes both ends of piston 2132 to PA fluid. Since the right-hand end of the piston 2132 contains the greater surface area, however, the piston will move to the left as shown, thus closing the ejector plates 3030 and 3031 of carrier tube 3002 around the round of ammunition located therein. An interlock switch 2137, illustrated in FIG. 18, is actuated at this time.

When linkage segment pin 2142 reaches the limit of its travel in slot 2143, the valve 2140 will be pulled back to its first detent position. This closes the exit of the piston to discharge fluid to the tank and connects both ends of piston 2144 to PA fluid. The right-hand end of piston 2144 has the greater area, and, therefore, the movement of the piston is to the left, thus closing the now empty shutters 2007 of transfer tube 2006. Check valve 2145 allows PA fluid to fill in behind the right-hand end of the piston 2144 in addition to that passing through the metering valve 2146. A more rapid return stroke is thus initiated.

*Ammunition Carrier Rotary Structure, Latch Rings and Drive Motor*

Figure 25:
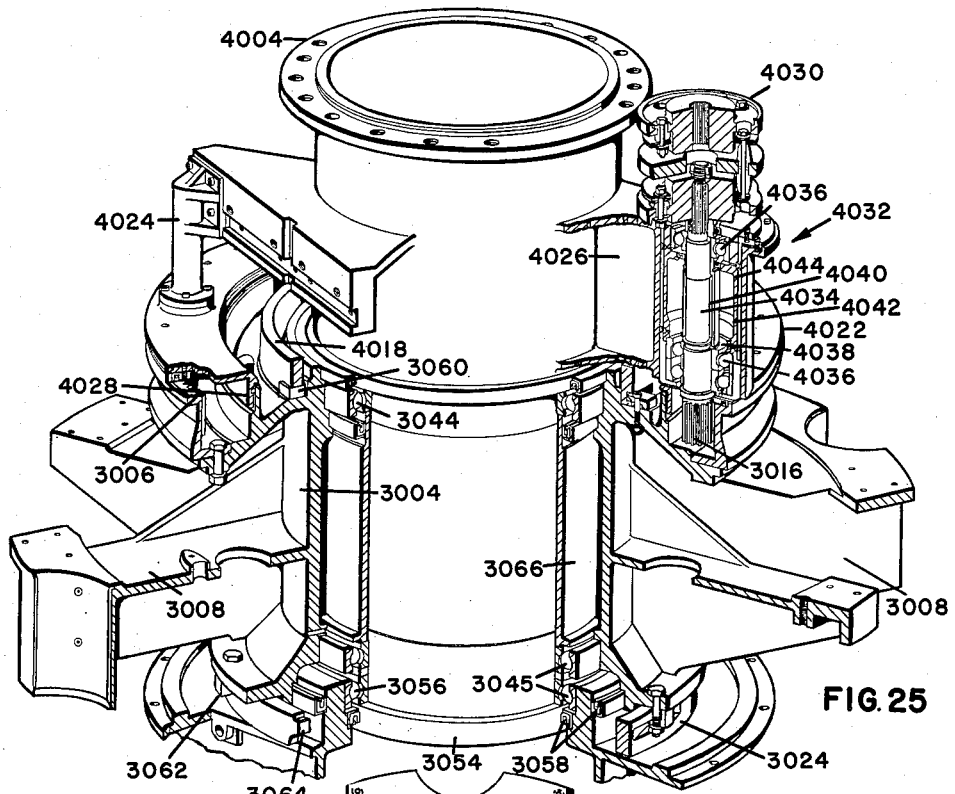
FIG. 25 is a perspective view of a carrier spider.

As shown in FIG. 25, the carrier spider 3004 is mounted around the bottom of the center column 4004 on two radial ball bearings, an upper spider bearing 3044 and a lower spider bearing 3045. The inner race of the upper spider bearing 3044 fits onto a bearing surface on the center column 4004, while the outer race fits into a machined lip inside the upper portion of the hub of the carrier spider 3004. An oil seal 3058 is placed on top of the upper spider bearing 3044, between the center column 4004 and the carrier spider 3004.

A bearing spacer 3066 fits under the inner face of the upper spider bearing 3044 and extends downwardly around the center column 4004 to the top of the inner race of the lower spider bearing 3045. Another oil seal 3058 is placed below the upper spider bearing 3044 on a machined portion of the bearing spacer 3066. This seal 3058 also rests against a surface on the inside of the carrier spider 3004. Lubrication for the upper spider bearing 3044 is furnished through suitable grease fittings around the outside of the upper portion of the hub of the carrier spider 3004.

The inner race of the lower spider bearing 3045 fits onto the center column 4004, while the outer race fits into a machined surface on the lower inside portion of the hub of the carrier spider 3004.

The inner race is held by a bearing retainer 3054. The outer race fits into a machined surface inside the ammunition carrier latch and cable well assembly (not shown). This assembly is bolted to the center hole of the carrier positioning plate, which is, in turn, bolted to the deck of the carrier room 504.

A center column positioning bearing 3056, for the center column 4004, is located below the lower spider bearing 3045. This bearing 3056 positions the center column 4004 about its vertical axis and rotates when the center column turns with the mount 6000 in train.

Two spaced oil seals 3058 are also installed in the area around the bottom of the center column 4004. One oil seal 3058 is located below the outer race of the center column positioning bearing 3056, between the inside top surface of the cable well assembly and the lowermost bearing retainer 3054. The other seal 3058 is located around the outside of the top machined surface of the cable well, between the well and the hub of the carrier spider 3004.

The bottom of the spider 3004 is provided with a flange which extends outwardly around the circumference of the hub of the carrier spider 3004. This flange extends beyond the top machined surfaces on the cable well assembly and contains the surface on which the lower latch ring 3024 is mounted.

A flange near the top of the carrier spider 3004 extends outwardly around the circumference of the spider hub. A carrier ring gear 3006, which is a circular steel unit of approximately Z-shaped cross-sectional area, is mounted on a machined surface at the outer edge of this flange as shown in FIG. 25.

This ring gear 3006 has gear teeth cut around its inside circumference, and is designed so that its outside surface serves as part of the ring gear housing. The other portion of the housing consists of a lip on the carrier spider 3004.

Figure 26:
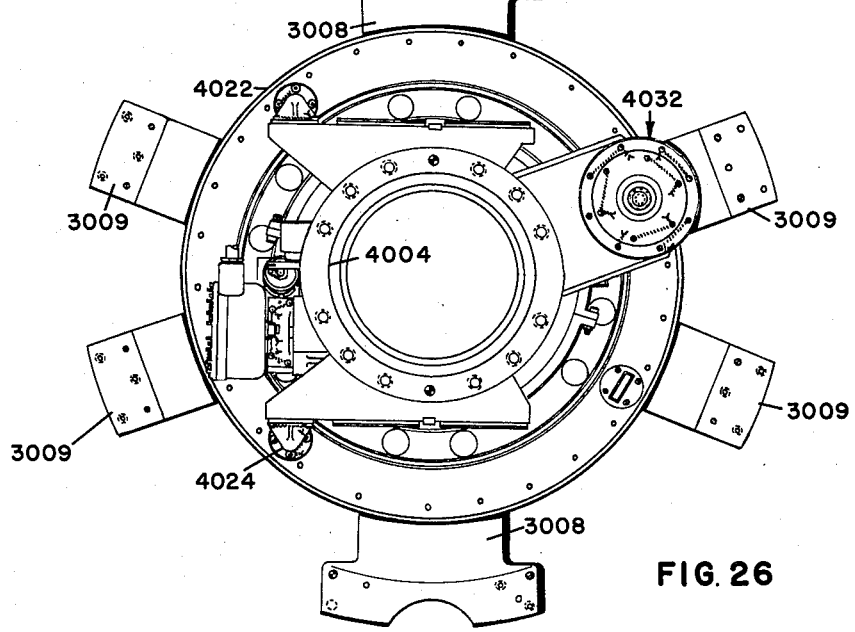
FIG. 26 is a top plan view of a carrier spider and center column therefor.

A circular steel ring gear cover 4022, having an L-shaped cross-sectional area, is located immediately above the ring gear 3006. This cover 4022 is fastened to the center column 4004 by a pair of gear cover supports 4024 as shown in FIG. 25. This cover 4022 is further secured by being bolted to a bracket 4026 on the center column 4004 which holds a drive pinion assembly 4032, as illustrated in FIG. 26.

A pair of oil seals 4028 are located between the ring gear cover 4022 and its housing. Both seals 4028 are secured to the ring gear cover 4022 and press tightly against the ring gear housing. Since the ring gear cover 4022 is fastened to the center column 4004, it rotates with it. The gear and housing, however, rotate with the carrier spider 3004. As the gear and cover 4022 rotate past each other, the oil seals 4028 rub against the housing and maintain a tight seal between the cover and housing.

The upper latch ring 4018 is located on top of the hub of the carrier spider 3004 near the center column 4004, as shown in FIGS. 21 and 25. This ring 4018 consists of two semi-circular steel pieces bolted together to form a complete circle. The upper latch ring 4018 is secured to the carrier spider 3004 by bolts and clamps, and it is secured in position by keys 3060.

The lower latch ring 3024 is located under the bottom flange of the carrier spider 3004. It is also composed of two halves and is secured to the carrier spider 3004 by clamps 3062 and bolts, and by keys 3064 and keyways as shown in FIG. 25.

The upper and lower latch ring notches 4016 and 3022, in the upper and lower latch rings 4018 and 3024, respectively, are spaced 90 degrees away from each other as in FIG. 21.

The ammunition carrier 3000 is driven around the center column 4004 by means of the B-end motor unit 3014, a flexible colpling 4030, and the drive pinion assembly 4032.

FIG. 25 shows the drive pinion assembly 4032 mounted on the center column 4004 by means of the bracket 4026. In the actual embodiment of the invention, a cylindrical shell, which is an integral part of the lower section of the center column 4004, contains the drive pinion bearing assembly 4032. The drive pinion 3016 is formed on one end of a shaft 4034 with a splined portion on the other end. The pinion end of the shaft 4034 meshes with the ring gear 3006, and the splined end is inserted into the flexible coupling 4030. The upper end of this coupling 4030 is splined for the drive shaft of the B-end motor unit 3014.

The pinion shaft 4034 is journalled in three ball bearings 4036, one near the splined end of the shaft 4034 and two near the pinion end thereof. The two bearings 4036 near the pinion end of the shaft 4034 are held in place by a snap ring 4038 that fits into a wide groove around the shaft. This snap ring 4038 also serves to keep the shaft 4034 from dropping through the bearings 4036 when the flexible coupling 4030 is removed from the splined end of the shaft.

A bearing spacer 4040 is placed around the shaft 4034 between upper and lower bearings 4036. This spacer 4040 serves to locate the bearings 4036 in proper position on the shaft 4034. A single oil seal is provided at the bottom of the lower bearing 4036, and the upper bearing 4036 is provided with two oil seals around the pinion shaft 4034.

The three bearings 4036 on the pinion shaft 4034 are enclosed in a bearing cartridge 4042 inside an eccentric sleeve 4044. The eccentric sleeve 4044 is used to adjust the closeness of the mesh between the drive pinion 3016 and the ring gear 3006.

There are 32 holes provided around the flange of the eccentric sleeve 4044, but only eight of these holes can match up with the eight holes in the flange at the top of the pinion housing. This ratio of holes makes it possible to place the eccentric sleeve 4044 in a variety of positions in order to obtain the most desirable fit between the teeth of the drive pinion 3016 and the teeth of the ring gear 3006.

*Ammunition Carrier Drive Response*

Figure 27:
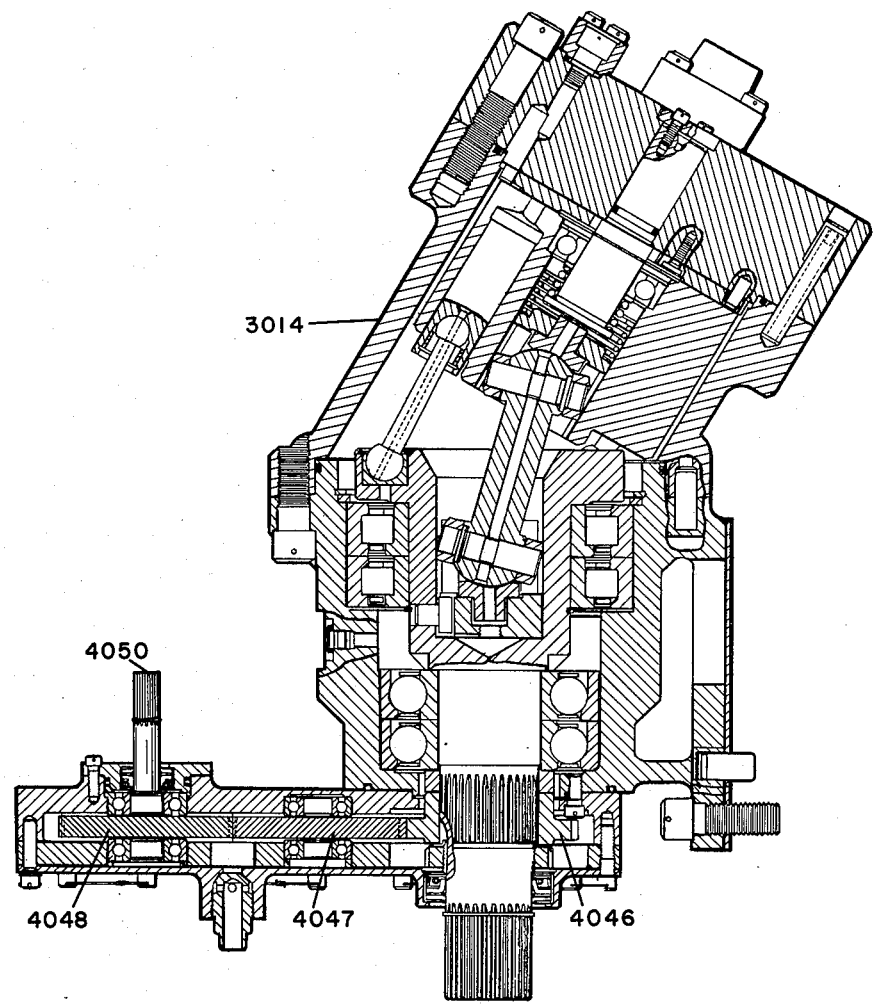
FIG. 27 is a sectional view of a carrier B-end motor and response gearing therefor.

FIG. 27 will now be used in discussing the B-end motor response gears. It will be noted that there are three gears inside the response gear housing attached to the shaft end of the B-end motor unit 3014. The first is a drive gear 4046, the second an idler gear 4047, and the third a response output gear 4048 whose shaft 4050 extends upwardly out of the response gear housing. The response output gear 4048 is connected, through a series of flexible couplings, shafts, and gear boxes, to the carrier control gear train 3070.

Figure 28:
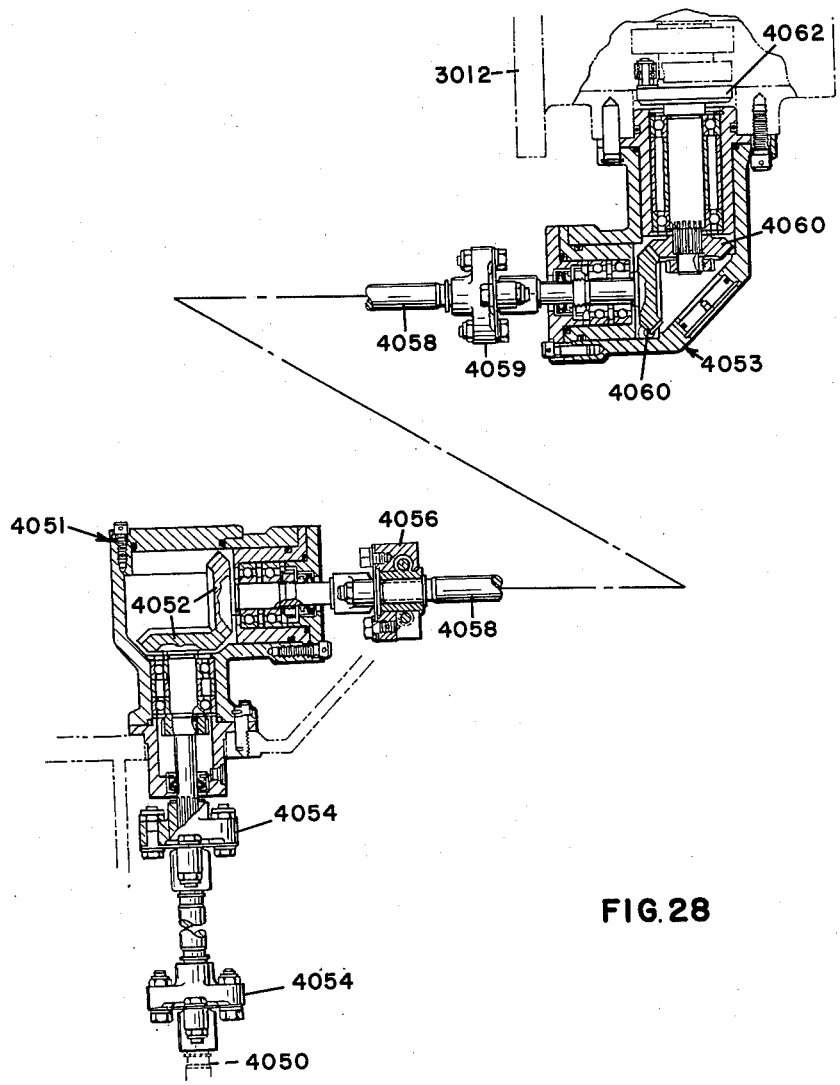
FIG. 28 is a side elevation, partly in section, of a carrier B-end response gearing.

A first gear box 4051 in the carrier B-end response gearing is located near the right upper hoist 4000 and is shown in detail in FIG. 28. Gear box 4051 contains two bevel gears 4052, both of whose shafts are journalled in ball bearings, the bearings being secured to their shafts by bearing lock nuts. Since the gear box 4051 is filled with lubricating oil, the gears 4052 and bearings run in an oil bath. O-rings and oil seals prevent loss of oil around the shafts, cover, and bearing retainers.

The shaft of the lower gear 4052 in the gear box 4051 is placed in a vertical position and is splined to a pair of flexible couplings 4054. These flexible couplings 4054 connect the bevel gear 4052 to the shaft 4050 leading downwardly to the response gears located on the drive shaft end of the carrier B-end motor unit 3014.

The shaft of the upper gear 4052 in the gear box 4051 is placed in a horizontal position, and is connected to a vernier coupling 4056 which makes it possible to vary the phase of the carrier B-end response gearing so as to synchronize it with the gear train of the carrier control 3012 to be described subsequently.

A second gear box 4053 is bolted to the underside of the carrier control 3012, and it is mechanically connected to the vernier coupling 4056 by means of a shaft 4058 and a flexible coupling 4059. This gear box 4053, has a pair of bevel gears 4060, one on a shaft placed in a horizontal position while the upper gear 4060 is splined to a carrier control response input shaft 4062. The lower gear shaft and the response input shaft are each journalled in two ball bearings.

At this point, it should be pointed out that there are two B-end responses feeding into the gear train of the carrier control 3012; namely, the carrier B-end response, just discussed, and a train B-end response. These two responses should not be confused. The carrier B-end response is taken off the carrier B-end hydraulic motor unit 3014 as stated and sends an indication back to the carrier control gear train whenever the carrier B-end motor unit 3014 rotates.

Figure 32:
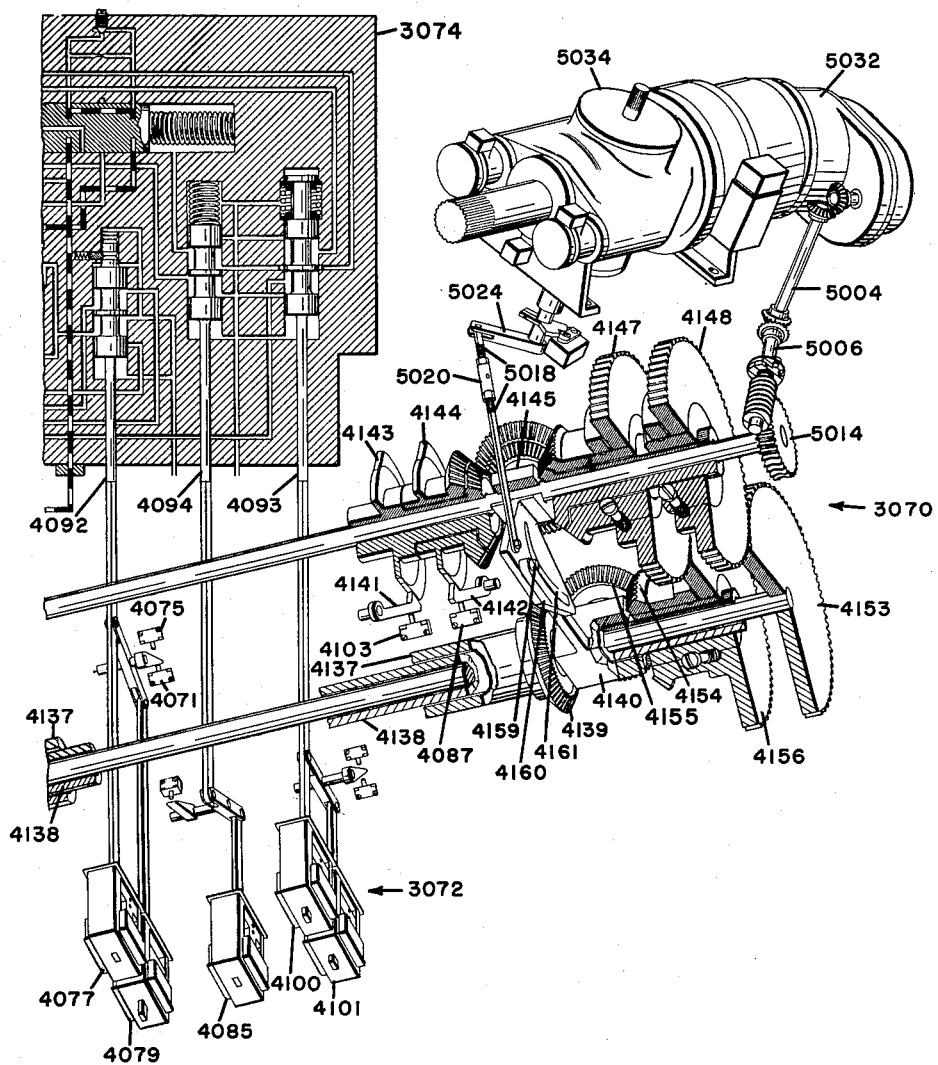
FIG. 32 is a continuation of the hydraulic and mechanical schematic, partly in perspective, of the right half of the carrier control of FIG. 31.

The train B-end response, as the name suggests, is connected to a response output gear on the drive shaft end of a train B-end motor 5032, shown in FIG. 32, which is located in the gun house. This response feeds an indication to the carrier control gear train whenever the gun mount 6000 rotates in train. The train B-end motor 5032, and an associated train A-end unit 5034, with their response shafting are illustrated in FIG. 32.

Figure 29:
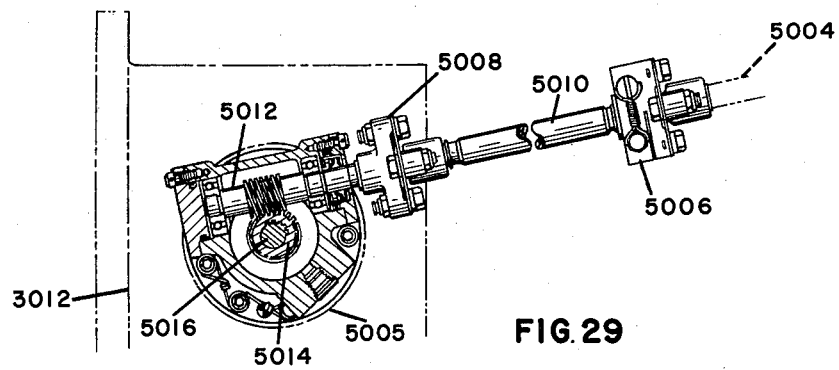
FIG. 29 is an elevation, partly in section, of a train B-end response arrangement.

The train B-end response enters the carrier control 3012 through the top of the gear case of the carrier control as shown in FIG. 29. A train B-end response shaft 5004 is connected to a gear box 5005 which extends through an opening in the circular mount stand 500. The shaft 5004 is connected to the training gear mechanism by means of a vernier coupling 5006 which makes it possible to synchronize the carrier control gear with the movements of the gun mount 6000 in train. A flexible coupling 5008 connects a response shaft 5010 to a worm shaft 5012 inside gear box 5005 bolted to the top of the carrier control 3012.

The worm shaft 5012 is journalled in ball bearings at its ends, and meshes with a worm wheel 5014 which, in turn, is connected to the response input shaft 5016 extending into the carrier control gear case. Lubrication is automatic since the worm gear housing and the gear case are included in the hydraulic circuit. O-rings and oil seals are used to prevent leakage.

In addition to the responses from the train and carrier B-ends, a third response, the training gear A-end speed response, is fed into the carrier control 3012. This third response originates in the train A-end, and it indicates the speed and direction of rotation of the gun mount 6000 when it is in training movements. The mechanism for the third response connects with the carrier control 3012 through a lever and shaft which extend from the training gear A-end through an opening in the base ring.

Figure 30:
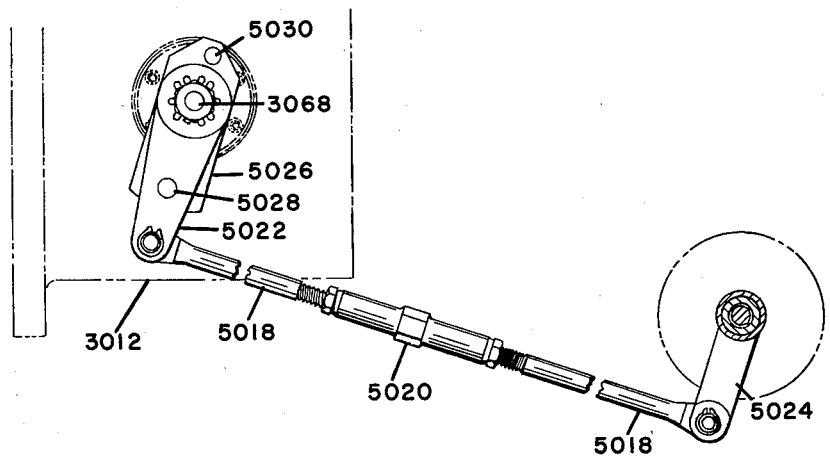
FIG. 30 is a side elevation of a train A-end response.

FIG. 30 (and FIG. 32, in simplified form) shows the linkage between the A-end speed response lever and the training gear. A pair of links 5018 are secured into the ends of a turnbuckle 5020. The left link 5018 is connected to an arm 5022 on the carrier control 3012, while the right or other link 5018 is connected to an A-end speed response lever 5024 which extends beneath the A-end unit 5034. The purpose of the turnbuckle 5020 is to provide for adjustment of the speed response linkage. After adjustment has been made, the turnbuckle 5020 is locked in place by jam nuts.

The arm 5022, to which the speed response linkage 5018 on the carrier control 3012 is connected, is not splined to the shaft leading to the interior of the carrier control 3012. Directly under the arm 5022, however, is a lever 5026 which is splined to a carrier control input shaft 3068.

During normal operation of the system, a pin 5028 connects the arm 5022 and lever 5026 together so that when the arm 5022 moves, the lever 5026 also moves with it. For special reasons, such as disassembly or adjustment, it may be desirable to remove the pin 5028 connecting the lever 5026 and arm 5022. The pin 5028 is then inserted into a locking hole 5030 which is located 180 degrees away from the first hole.

When the pin 5028 is inserted in the second hole 5030, it drops into a partial hole in the gear case below it and locks the speed response on neutral. The arm 5022, located above the lever 5026, can then be moved without affecting the position of the lever 5026.

*Ammunition Carrier Control and Hydraulic Operation*

The carrier control 3012 is composed of separate, but interdependent units, namely the gear train assembly 3070, a solenoid assembly 3072, and three valve blocks 3071, 3073, and 3075 of a valve block assembly 3074. These three units 3070, 3072, and the block components of assembly 3074 are bolted to each other to form a single carrier control 3012 which is mounted on the left arm of a center column support bracket 4006.

Figure 31:
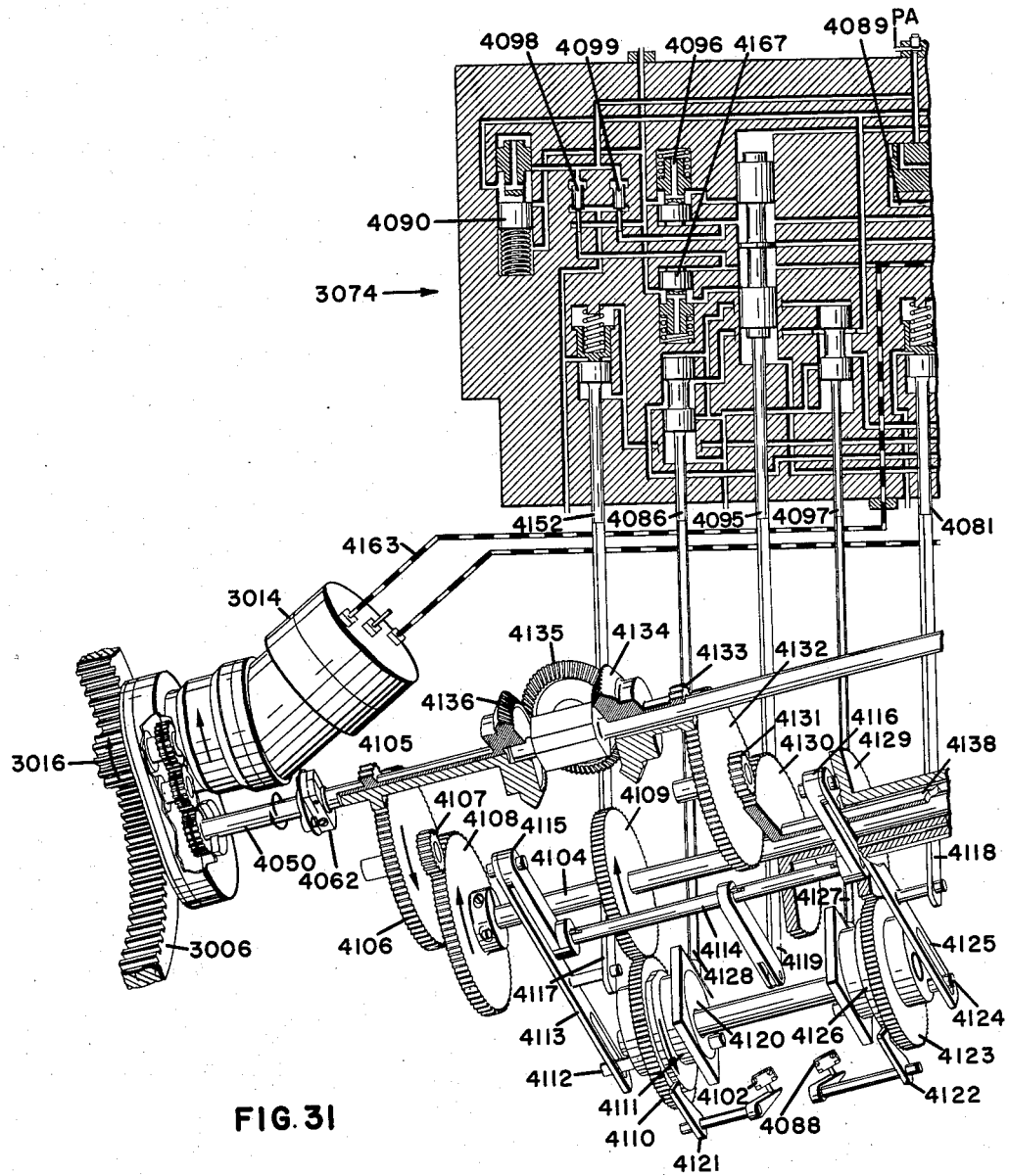
FIG. 31 is a hydraulic and mechanical schematic, partly in perspective, of the left half of the carrier control.

As illustrated in FIGS. 31 and 32, the gear train assembly and the solenoid assembly operate valves within the valve block assembly 3074. The valve block assembly 3074, in turn, controls the flow of fluid to and from the carrier B-end hydraulic motor unit 3014.

In automatic operation of the system, the triggering of a cycle of the ammunition carrier 3000 is controlled by an electrical interlock circuit which keeps the carrier synchronized with the other units of the gun mount 6000.

Control of the cycle of the ammunition carrier 3000 is a function of the carrier control 3012. The solenoid assembly initiates the cycle of the carrier 3000 by positioning certain valves within the valve block assembly 3074. The gear train, by mixing the above mentioned responses, then by positioning valves in the valve block assembly 3074, and by actuating switches inside the housing of the solenoid assembly 3072, determines the direction of rotation of ammnuition carrier 3000 and the number of degrees of rotation. The valve block assembly 3074, through its valves and pistons, controls the flow of fluid to and from the carrier B-end hydraulic motor 3014 so as to control the speed and direction of rotation of the B-end motor 3014 which drives the ammunition carrier 3000.

The rotation cycle for the ammunition carrier 3000 is initiated by the closure of a circuit to actuate a solenoid 3079, as shown in FIG. 20. Solenoid 3079 is provided to control the valve block 3018, which positions the lower latch roller 3020.

As soon as the lower latch of the ammunition carrier 3000 is thus retracted, a switch 3080 closes and energizes a solenoid 4079 associated with the carrier control 3012 diagrammed in FIGS. 31 and 32. A hoist selector valve 4092, shown therein, is shifted upwardly and a switch 4071 is closed. This switch 4071 controls a latch control solenoid 3076 in FIG. 20 to extend the upper latch roller and lever 4012 by means of hydraulic valve block 4014.

The carrier control gear train 3070, through the responses fed into it, effectively computes the number of degress in any particular cycle of the ammunition carrier 3000 and from this determines the direction of rotation of the ammunition carrier. This information is transmitted to the valve block assembly 3074 and solenoid assembly 3072 so that they, in turn, can control the cycle of the ammunition carrier 3000.

Figure 33:
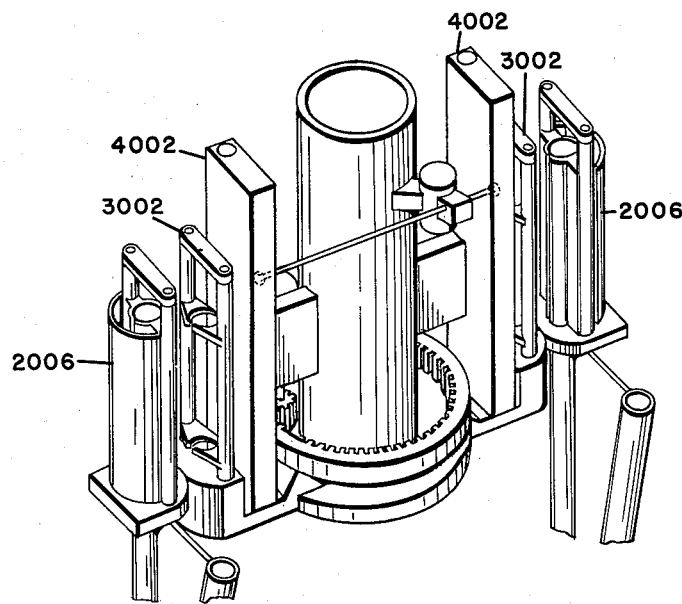
FIG. 33 is a perspective view of elements of the ammunition carrier in neutral relation.

The carrier control in FIGS. 31 and 32 is shown in a neutral condition, with the upper hoist tubes 4002, the carrier tubes 3002, and lower hoist transfer tubes 2006 all in line as illustrated in FIG. 33. If the gun 6002 was fired while in this condition, there would be no need for the carrier tubes 3002 to move, since they are already lined up with the upper and lower hoist tubes 4002 and 2006, respectively.

A similar arrangement is shown in FIG. 19. Here, however, the mount is now trained 89 degrees to the left of the position shown in FIG. 33. This means that the upper hoist 4000 has also rotated 89 degrees left of its original position. The ammunition carrier 3000, however, is still latched to the lower hoist 2000.

FIG. 19 also shows what happens when the gun mount 6000 trains left while the ammunition carrier 3000 is latched to the lower hoists 2000. The upper hoists 4000 and center column 4004 rotate counterclockwise (large arrow), carrying the carrier B-end motor unit 3014 and drive pinion 3016 with them. Since the ammunition carrier 3000 and its ring gear 3006 remain at the lower hoists 3000, however, the B-end drive pinion 3016 must roll on the teeth inside the ring gear 3006, thereby rotating the pinion 3016 in a clockwise direction (small arrow).

As the gun mount 6000 trains left and the carrier B-end motor unit 3014 and pinion 3016 rotate, the associated response gears, and carrier B-end response shaft 4050, rotate the carrier response input shaft 4062 in the direction shown by the arrow in FIGS. 31 and 32. Shaft 4062, through gearing, rotates shafts, pinions, and gears, including a pinion 4105, a gear 4106, a pinion 4107, gears 4108 and 4109, and a carrier-to-upper hoist timing gear 4110.

A shaft 4104, which connects gears 4108 and 4109 together, extends to the extreme right, as illustrated in FIG. 32, and it has a gear 4153 attached to its opposite end. Gear 4153 meshes with a gear 4148, which extends through the inside of a gear 4147, as shown as a cutaway sleeve. The bevel gear portion of gear 4148 meshes with the inner gear of a differential 4145. The inner gear of differential 4145 meshes with the bevel gear sleeve attached to a cam 4143.

Cam 4143 is rotated so that in time the gun mount 6000 reaches the position where a cam follower 4141 will be riding the high portion of the cam 4143, thus closing an element B of a directional control switch 4103, as shown in FIG. 32.

Timing gear 4110, like cam 4143, rotates at twice the speed of the carrier ring gear. Thus, when the carrier drive pinion 3016 rotates through an arc of 89 degrees on the carrier ring gear, timing gear 4110 rotates through an arc of 178 degrees. A cam follower 4121, shown in FIG. 31, which is now riding almost in the center of the low portion of a cam 4111, de-actuates and closes a switch 4102.

Switch 4102 is in an electric circuit with the directional control switch 4103. The directional control switch 4103 may energize either a clockwise rotation control solenoid 4100, or a counterclockwise rotation control solenoid 4101, both shown in FIG. 32. In the present instance, in the gearing arrangement, however, it was pointed out that the cam follower 4141 will be riding the high portion of cam 4143, and that element B of switch 4103 will be closed. The corresponding solenoid 4101 will, therefore, energize, and a directional control valve 4093 will be shifted upwardly to initiate the 89 degrees counterclockwise rotation cycle of the ammunition carrier to upper hoist.

The carrier B-end motor unit 3014 is operated by PA fluid at a pressure of 1400 to 1500 pounds per square inch. The elements of the carrier control valve block, however, are operated by PC fluid at a pressure of 250 pounds per square inch. A pressure regulator valve 4090, shown in FIG. 31, provides and maintains the constant pressure PC fluid in the valve block assembly 3074 by regulating a PA fluid supply line to the PC fluid system.

A by-pass control valve 4094, shown in FIG. 32, is controlled by a solenoid 4085, which is included in an electrical interlock circuit. This interlock circuit will be explained later. When solenoid 4085 is in the energized position, by-pass control valve 4094 is moved upwardly, allowing PC fluid from direction valve 4093 to flow through its bottom land chamber. This PC fluid moves through drilled passageways, and an orifice 4089, shown in FIG. 31, to the left end of a circuit by-pass valve 4091, shown in FIG. 32.

Valve 4091 then moves to the right in its chamber, closing its B-end by-pass passage and the opening PA fluid passageway to a speed control valve 4095, shown in FIG. 31. Fluid in the right end of the cylinder of valve 4091 passes through the upper land chamber of valve 4094 and out to tank.

In case of power failure, solenoid 4085 will deenergize (and valve 4094, of FIG. 32, will be forced downwardly by the spring at the top of its cylinder. This movement of the valve 4094 will put pressure through the upper land chamber of valve 4094 to the right end of the valve 4091. The left end of the cylinder of valve 4091 then vents to tank through the lower land chamber of valve 4094. Orifice 4089 slows the escape of fluid from the left end of the cylinder, keeping the PA fluid passageway open long enough to enable the carrier to complete its cycle.

As directional control valve 4093 moves upwardly, PC fluid enters its lower land chamber and flows out to a passageway at the lower right side of the valve block. The PC fluid then flows through drilled passageways leading to the lower end of the cylinder of speed control valve 4095, and forces speed control valve 4095 upwardly. Fluid at the upper end of the cylinder of speed control valve 4095 vents to tank through the upper land chamber of directional selector valve 4093.

Speed control valve 4095 is connected by means of a shaft and linkage 4119 to a pivot shaft 4114. When valve 4095 moves upwardly, shaft 4114 and linkage 4119 are also pulled upwardly. Shaft 4114 then rotates, pulling a pivot pin 4115 and the left end of a Scotch yoke link 4113 downwardly, with a Scotch yoke link pin 4112 being the pivot point.

An anchor piston valve 4152 is attached to the midpoint of Scotch yoke link 4113 by means of a link 4117, as shown in FIG. 31. When link 4113 moves downwardly, link 4117 and anchor piston valve 4152 are also pulled downwardly.

As soon as the carrier B-end begins to move, the carrier B-end response starts rotating the carrier-to-upper hoist timing gear 4110. An eccentric 4120, which is a part of timing gear 4110, also rotates. A deceleration initiator valve 4086, which is attached to eccentric 4120 by means of a frame bracket and rod 4128, is then in its lowest position. This valve 4086 starts to move upwardly as soon as timing gear 4110 begins to move.

Shaft 4114 is keyed to the short link which connects to linkage 4119 on speed control valve 4095. Since speed control valve 4095 is held in its upper position by PC fluid, shaft 4114 cannot rotate when timing gear 4110 begins to move. Scotch yoke link 4113, however, is forced upwardly by pin 4112. Link 4113, pivoting on yoke link pin 4112, begins to move link 4117 and anchor piston 4152 upwardly. The cam 4111, which is a part of timing gear 4110, also begins to rotate.

In every carrier cycle, approximately half of the cycle involves acceleration and half involves deceleration. In the 89 degree cycle being discussed, deceleration of the carrier begins approximately 44 degrees away from the stop position at the upper hoist 4000. A valve, piston, and interlock switch, as will be described, combine to initiate the deceleration portion of the cycle of the carrier.

Since the ratio of carrier speed to timing gear speed is 2:1, timing gear 4110 has moved a total of 88 degrees in this period. This puts Scotch yoke pin 4112 in the high position (toward the valve block). Cam 4111 has rotated around so that cam follower 4121 is riding the raised portion of the cam 4111, thereby actuating switch 4102 and opening the circuit to counterclockwise solenoid 4101.

As soon as counterclockwise solenoid 4101 is deenergized, the spring at the top of directional control valve 4093, of FIG. 32, returns the valve 4093 to its neutral position, cutting off the flow of PC fluid to the bottom of valve 4095, and venting it to tank. Fluid pressure in the two ends of the cylinder of valve 4095 is then equalized, and valve 4095 is free to be moved by its attached linkage. While the Scotch yoke pin 4112 is being moved upwardly to the position described, Scotch yoke link 4113 also moves upwardly, being pivoted about pin 4112. This action moves link 4117 and anchor piston 4152 upwardly until the anchor piston 4152 is in the position shown.

Eccentric 4120 and rod 4128, shown in FIG. 31, and deceleration initiator valve 4086 are also moved upwardly by the rotation of the timing gear 4110. Approximately 57 degrees away from stop position, the bottom land of valve 4086 completely closes the outlet to tank from its land chamber, and its upper land opens a PC fluid inlet.

PC fluid then flows through the land chamber of valve 4086, then through lower drilled passages, and enters the upper land chamber of hoist selector 4092, shown in FIG. 32. From there, the PC fluid flows through other passageways leading to both ends of the cylinder of anchor piston 4152.

The surface area on top of the anchor piston 4152 is greater than that on the bottom thereof. The top portion of anchor piston 4152, however, cannot move downwardly from the position shown in FIG. 31, because a flange at the top of the piston contacts an internal shoulder in its cylinder and prevents downward movement thereof.

The bottom portion of anchor piston 4152 is held against the top portion thereof by PC fluid, but since the downward hydraulic force on the top portion thereof is greater than that on the bottom portion, the bottom portion of the anchor piston cannot move upwardly, and the piston is locked in position as shown in FIG. 31.

With PC fluid released from speed control valve 4095, and with the piston 4152 locked in position by PC fluid, Scotch yoke link 4113 is now pivoted at the point where link 4117 is fastened to it. As timing gear 4110 continues to rotate, Scotch yoke pin 4112 begins moving in a downward arc. The right end of link 4113 moves downwardly, pivot pin 4115 moves upwardly, and shaft 4114 rotates.

Linkage 4119 is now pulled downwardly, pulling speed control valve 4095 with it. As speed control valve 4095 moves downwardly, its center land begins cutting off the source of PA fluid at the center of the cylinder of valve 4095, and its upper land begins diminishing the cross-sectional area of the left hand top orifice.

A flow control valve 4096, illustrated in FIG. 31, is provided to operate in conjunction with speed control valve 4095. Valve 4096 controls the deceleration of the ammunition carrier 3000 by limiting the gallons-per-minute flow of the hydraulic fluid from the exhaust side of the B-end motor unit 3014 to tank. Limiting this flow of hydraulic fluid sets up back pressure which exerts a retardative torque in opposition to the inertia of the carrier 3000 and force of the PA fluid on the opposite transmission line of the B-end motor unit 3014.

A pair of high pressure relief valve 4098 and 4099 illustrated in FIG. 31, of the differential area type, are located in each of the main transmission lines from the speed control valve 4095 to the B-end motor unit 3014. These valves 4098 and 4099 prevent damage to the driving gear in the event of malfunction of the control during a deceleration cycle.

Carrier-to-upper hoist timing gear 4110 as previously described indicates the position of the carrier 3000 relative to the upper hoists 4000. Similarly, a carrier-to-lower hoist timing gear 4123, illustrated in FIG. 31, indicates the position of the carrier 3000 with respect to the lower hoists 2000. In the over-all mechanical and hydraulic schematic shown in FIGS. 31 and 32, the upper hoist 4000, the carrier 3000, and lower hoists 2000 are all in line, and both of the timing gears are on neutral.

When the gun mount 6000 is rotated around to the 89 degree position, carrier-to-upper hoist timing gear 4110 rotates around to a position which indicates that the ammunition carrier 3000 is at a point 89 degrees clockwise from the upper hoist 4000. Thus, when a carrier cycle to the upper hoist is initiated, timing gear 4110 is able to control the carrier cycle accordingly. When the ammunition carrier 3000 latches to the upper hoists 4000, timing gear 4110 returns to the neutral position.

During the time that the gun mount 6000 is being trained 89 degrees left, the carrier B-end response rotates a bevel gear 4136, as illustrated in FIG. 31. This gear 4136 is a part of the carrier-to-deck response differential 4135. While the carrier B-end response is rotating gear 4136 in the direction of the arrow, the spider of differential 4135 is being rotated by the train B-end response applied through worm wheel 5014 leading from response shaft 5004 and train B-end 5032, illustrated in FIG. 32. The combination of these two responses cancels each other out and the gear on differential 4135 walks around on the teeth of a gear 4134, of FIG. 31. Gear 4134, then, does not move during the time the gun mount 6000 is training, and carrier-to-lower hoists timing gear 4123 remains on neutral, thus indicating that the carrier 3000 is latched to the lower hoists 2000.

During the carrier-to-upper hoist cycle, when the carrier 3000 begins to rotate, response shaft 4050 and bevel gear 4136 rotate. Since there is no response motion from the train B-end, the gear on differential 4135 merely acts as an idler gear.

As bevel gear 4136 rotates, gear 4134, a pinion 4133, a gear 4132, a pinion 4131, and a gear 4130, all shown in FIG. 31, rotate a spur shaft 4138. The illustration of shaft 4138 continues to the right on FIG. 32 where, in turn, a gear 4156, the gear 4147, an outer gear of differential 4145, and a cam 4144 will all rotate.

The ratio between the speed of the carrier 3000 and the speed of cam 4144 is 1:2. Since the carrier 3000 rotates a total of 89 degrees during the cycle to the upper hoist 4000, cam 4144 will rotate a total of 178 degrees.

This puts a cam follower 4142 on the high portion of cam 4144, thereby actuating an element of a directional control switch 4087 to indicate that the shortest return distance between the carrier 3000 and lower hoists 2000 is in a clockwise direction.

Gear 4156 is attached to a bevel gear 4154. Gear 4154 meshes with a bevel gear 4155, which, in turn, meshes with a bevel gear 4139. These three gears 4154, 4155, and 4139 make up the speed response differential. Since it is to be assumed that the gun mount 6000 does not move in train during the present cycle, bevel gear 4155 will merely act as an idler gear between bevel gears 4154 and 4139.

Gear 4139 is connected by means of a spur shaft 4137 to a gear 4129, shown in FIG. 31. Gear 4129 is the driving gear for the carrier-to-lower hoist timing gear 4123. Since the speed relationship between the carrier 3000 and the timing gear 4123 is 1:2, the timing gear will move a distance of 178 degrees during the 89 degree cycle of the carrier 3000 to the upper hoist 4000.

As soon as the carrier 3000 latches to the upper hoist 4000, the carrier ejector mechanism ejects its rounds of ammunition into the upper hoist tubes 4002 as previously described. In the discussion that follows, it is assumed that the gun mount 6000 remains in the same position of train and that the carrier 3000 makes an 89 degree return cycle from the upper hoists 4000 to the lower hoists 2000.

The return cycle of the carrier 3000 is begun by the closing of the circuit to an upper latch solenoid 3077, shown in FIG. 20. Upon actuation of the valve block 4014 by the upper latch solenoid 3077, the upper latch roller and lever 4012 is retracted to close a switch 3081. Upon closing of the switch 3081, a solenoid 4077, shown in FIG. 32, shifts the hoist selector valve 4092 for a cycle of the carrier 3000 to the lower hoist 2000 and closes a switch 4075, also shown in FIG. 32. This switch 4075 controls a latch operating solenoid 3082, shown in FIG. 20, by which means the hydraulic valve block 3018 extends the lower latch roller and lever 3020.

The energization of the clockwise control solenoid 4100 by the directional control switch 4087 positions the directional control valve 4093 downwardly, as shown in FIG. 32. PC fluid then flows through its upper land chambers to the upper end of the cylinder of speed control valve 4095. This PC fluid forces valve 4095 downwardly until PA fluid pressure flows through its upper land chamber to the B-end motor unit 3014.

When the cycle of the ammunition carrier 3000 to the lower hoists 2000 is initiated, a link 4125 is pivoted on a Scotch yoke link pin 4124, as shown in FIG. 31. When link 4119 is forced downwardly by valve 4095, pivot shaft 4114 is rotated.

This rotation of shaft 4114 causes a pivot element 4116 and the left end of link 4125 to move upwardly, with the result that a rod 4118 and an anchor piston 4081 are also moved upwardly. During the first part of the cycle, the PC fluid on top of the speed control valve 4095 holds it immovable together with linkage 4119 and pivot shaft 4114.

When the B-end motor unit 3014 of the ammunition carrier 3000 begins to move as commanded by speed control valve 4095, the carrier B-end response shaft 4050, rotates the gear train, and timing gear 4123 now rotates in the reverse direction, all of which is illustrated in FIG. 31.

An eccentric and cam 4126 then begins moving upwardly from its down position, moving a rod 4127 and a deceleration initiator valve 4097 upwardly therewith. The right end of link 4125 then moves downwardly, pulling rod 4118 and anchor piston 4081 along with it.

At the beginning of the cycle, a cam follower 4122 rides approximately in the center of the low portion of eccentric and cam 4126, and a switch 4088 is de-actuated and closed. This action closes a circuit to the clockwise-commanding solenoid 4100, shown in FIG. 32.

When the ammunition carrier 3000 comes within approximately 57 degrees of its stop position at the lower hoists 2000, the upper land of deceleration initiator valve 4097 uncovers a port, admitting PC fluid to the land chamber of the valve. The PC fluid then flows through passageways to the lower land chamber of hoist selector valve 4092 and out to both ends of the cylinder of anchor piston 4081, shown in FIG. 31.

At the same 57 degree position of the carrier 3000, cam follower 4122 rides the high portion of eccentric and cam 4126 and switch 4088 is actuated, thus opening the circuit of clockwise control solenoid 4100, as illustrated in FIGS. 31 and 32.

With clockwise control solenoid 4100 de-energized, the spring at the top end of directional selector valve 4093 returns the valve to its neutral position to shut off the supply of PC fluid to the top of the cylinder of the speed control valve 4095 and vent the top of the cylinder to tank. With fluid pressure thus vented on both ends of speed control valve 4095, the valve is no longer locked in position.

Anchor piston 4081 is identical to anchor piston 4152 in construction and operation. PC fluid, acting on the top and bottom of the anchor piston 4081, holds it firmly.

With anchor piston 4081 held in position, and with equal hydraulic pressure on both ends of speed control valve 4095 as mentioned, the lower end of rod 4118 becomes the pivot point for Scotch yoke link 4125. Pivot element 4116 then moves downwardly thereby rotating shaft 4114 so as to move linkage 4119 and speed control valve 4095 upwardly.

The return flow of the fluid from the exhaust side of the B-end motor unit 3014 is through an external line 4163, shown in FIG. 31, to the carrier control valve block assembly 3074 and thence through the internal passageways to the lower land chamber of speed control valve 4095.

From the lower land chamber of speed control valve 4095, the fluid flows through a port to a flow control valve 4167 and thence to tank as illustrated in FIG. 31. As speed control valve 4095 moves upwardly, the lower land of the valve gradually closes off this outlet port and deceleration of the B-end motor unit 3014 is accomplished as previously outlined in the discussion of flow control valve 4096 to complete the return cycle of the carrier 3000.

The high pressure relief valve 4098 prevents excessive pressure buildup in the return line to tank. It functions in the same manner as high pressure relief valve 4099, which has already been described, and both of which are shown in FIG. 31.

Any change of position between the carrier 3000 and the lower hoists 2000 is transmitted to the carrier control 3012 as a combination of the carrier B-end response and the train B-end response.

The B-end response of the carrier 3000 is transmitted to the differential 4135 through gear 4136 while the train B-end response is transmitted to the same differential 4135 through shaft 4138, both shown in FIG. 31. The combined response is then transmitted to gear 4134, and from there, through the other gears, to carrier-to-lower hoists timing gear 4123.

If the net effort of the training movement of the gun mount 6000 is to bring the carrier 3000 and lower hoists 2000 closer together, the train B-end response, through differential 4135, moves the timing gear 4123 closer to its neutral position.

If the net result of the training movement of the gun mount 6000 is to increase the distance between the carrier 3000 and lower hoists 2000, the train B-end response moves the timing gear 4123 farther away from its neutral position.

In addition to the train and carrier B-end responses, the train A-end speed response enters the carrier control gear train. This response comes from the tilt plate of the train A-end unit 5034, shown in FIG. 32. Since the angle and direction of tilt of the A-end tilt plate of unit 5034 are directly proportional to the training speed and direction of motion of the gun mount 6000, this response indicates the training speed and direction of movement of the gun mount.

The A-end response is fed into two differentials within the carrier control gear train. Turnbuckle 5020, illustrated in detail in FIGS. 30 and 32, connects the tilt plate of A-end unit 5034 to a cam 4160 on double differential 4145. A cammed slot 4161 in this cam 4160 receives a roller 4159 which is connected to the lever arm of a differential spider 4140.

Thus, the train A-end speed response is connected to a single and a double differential. Differential 4145 modifies the responses fed to directional selector cams 4143 and 4144, while the differential of which spider 4140 is a part modifies the responses to carrier-to-lower hoists timing gear 4123, respectively.

*Ammunition Carrier to Upper Ammunition Hoist Operation*

Upper ammunition hoist tubes 4002, illustrated generally in FIG. 1, are securely mounted to the center column 4004 and are spaced 180° apart and extend from the carrier room platform 504 vertically upward into the gun pocket. The upper hoist tubes 4002 are also hydraulically operated, electrically controlled and interlocked to synchronize with the other units of the ammunition handling and loading system for the gun 6002. These hoist tubes 4002 receive the rounds of ammunition from the ammunition carrier 3000 and elevate them vertically up into the cradles 5002 partially shown in FIG. 1.

The lower portion of each upper hoist tube 4002 is longitudinally divided so that one half forms a shutter 4064 as illustrated in FIG. 18. A chain-driven hoist pawl 4066 extends into the hoist tube 4002 to lift rounds of ammunition into the cradles 5002 of the gun mount 6000.

An upper hoist valve block 4068, illustrated in FIG. 15, is provided to operate shutter 4064 and additionally to hydraulically control the carrier ejector piston 4020 previously mentioned as engaging button 3052 when the carrier tube 3002 moves to a position opposite the upper hoist tube 4002.

Piston 4020 is a differential area type piston, with the smaller area thereof being located on the shaft end. PA fluid is ported to both sides of piston 4020 through the land chamber of a detented valve 4070. Differential pressure between the areas holds the piston 4020 to the right or normal position, as shown in FIG. 18.

When a solenoid 4084 is energized, a valve 4076 is caused to move upwardly. The upper end of the chamber for a piston 4080 is thus vented to tank, and PA fluid regulated by a valve 4078 is admitted against the lower end thereof. Piston 4080, upon moving upwardly, opens shutter 4064 in readiness to receive a round of ammunition. An interlock switch 4083, also shown in FIG. 18, is released at this time.

Valve 4070 is also shifted to its upward detent position by means of a pin and slot arrangement 4082. The lower land of valve 4070 cuts off PA fluid to the left end of piston 4020, while the upper land vents it to tank.

The resulting leftward motion of piston 4020, acting through button 3052 and slide bar 3050, causes the carrier tube 3002 to eject the contained round of ammunition leftward. An interlock switch 4073 is also de-actuated to signal that the carrier ejector plates 3030 and 3031 are extending. Just before piston 4020 reaches the limit of its upward travel on the ejection stroke for the round of ammunition, another switch 4072, shown in FIG. 18, is actuated to close a circuit to a solenoid 4074. This causes valve 4076 to move downwardly to the position shown.

PA fluid regulated by the pressure relating valve 4078 now flows through the upper land chamber of valve 4076 to the upper end of piston 4080 to force it downwardly and close shutter 4064 over the round of ammunition.

Pin and slot arrangement 4082 delay the application of the downward motion of piston 4080 to valve 4070 until piston 4080 nears the end of its travel and then valve 4070 is shifted back to the lower detent.

With PA fluid thereby restored to both sides of piston 4020, the differential area force actuates the button 3052 to close the shutters 4064 of the now empty carrier tube 3002.

*Interlocks and Switches-Carrier*

Figure 24:
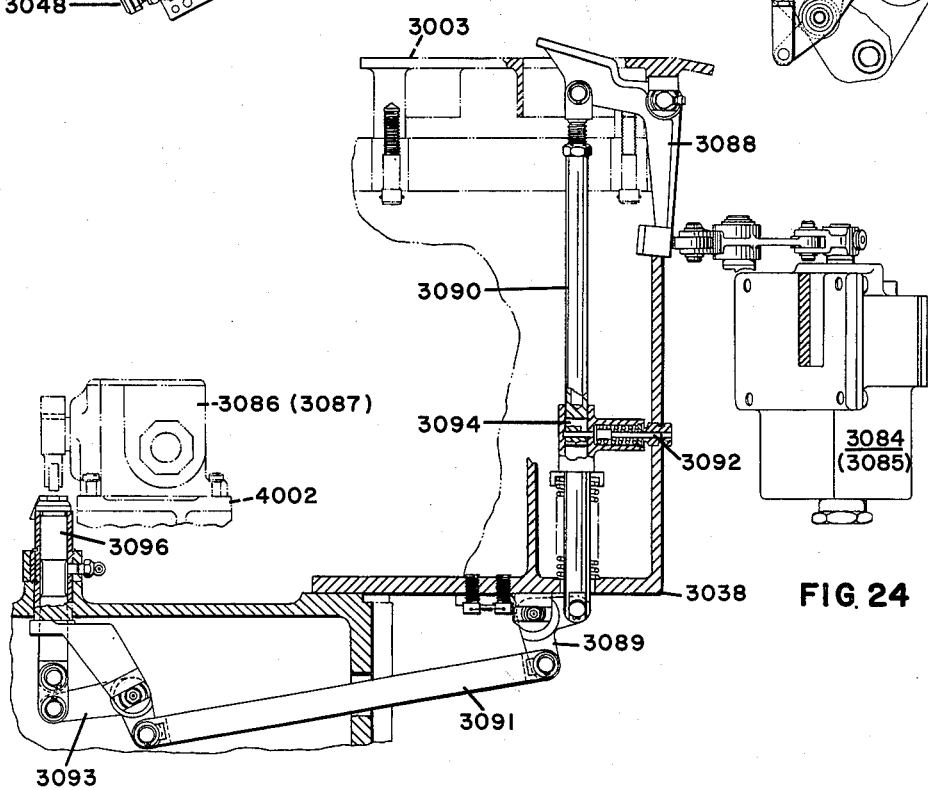
FIG. 24 is a side elevation, partly in section, of a carrier loaded switch linkage.

A pair of interlock switches 3084 and 3085, shown in FIG. 24 indicates the loaded or empty condition of the carrier tubes 3002 when the carrier 3000 is at the lower hoist transfer tube stations. Another pair of switches 3086 and 3087, also shown in FIG. 24, gives similar indications when the ammunition carrier 3000 is at the upper hoists 4000. Only the linkage that operates these switches 3084, 3085, 3086, and 3087 is located on lower support housings 3038 of the carrier tubes 3002. However, switches 3084 and 3085 are supported, as shown in FIG. 13, on the right and left hand lower hoist sprocket housings 2030. Switches 3086 and 3087 are located on the upper hoist tubes 4002.

Since either of the two carrier tubes 3002 may pick up rounds of ammunition at a lower hoist 2000C or 2000D, and since either of the two tubes 3002 may deliver rounds of ammunition to a left or right upper hoist 4002L or 4002R, respectively, it is impossible to state that any carrier tube mechanism will actuate a given set of switches under all conditions. For this reason, a switch will be spoken of as an interlock switch 3084 (3085) or as an interlock switch 3086 (3087).

The switch 3086 (3087) is operative when the carrier 3000 latches to the upper hoists 4000, while switch 3084 (3085) is operative when the carrier 3000 latches to the lower hoist transfer stations.

As stated, these switches 3084 (3085) and 3086 (3087) are arranged so that they are operated by the same lever and linkage assembly. A view of this assembly, as previously mentioned, is shown in FIG. 24.

When a round of ammunition enters a carrier tube 3002 from a transfer tube 2006, it slides upon a base plate 3003. A switch lever 3088 is forced downwardly, and its motion is transmitted by means of a linkage assembly consisting of a linkage 3090, a bellcrank 3089, a linkage 3091, and another bellcrank 3093, to a switch cam 3096, as illustrated in FIG. 24. This action forces the switch cam 3096 upwardly so that it will contact the actuator of switch 3086 (3087) when the carrier tube 3002 comes into alignment with the upper hoist tube 4002.

If a carrier tube 3002 is damaged to the extent that it can no longer function properly, the carrier 3000 may still be operated with only one tube 3002. In this situation, a lock pin 3092, illustrated in FIG. 24 is pulled out of vertical linkage 3090 connected to the switch lever 3088, and the vertical link and actuator are pushed downwardly to a position where the lock pin 3092 can be inserted in an upper hole 3094 as shown in FIG. 24. With the lock pin 3092 in this position, switch actuator 3084 (3085) will not be actuated.

When the carrier 3000 comes to the lower hoist transfer tube station, switch 3084 (3085) will now indicate falsely to the transfer tube 2006 that the carrier tube 3002 is already loaded. This prevents the transfer tube 2006 from injecting a round of ammunition into the damaged carrier tube 3002, and allows the carrier 3000 to rotate as soon as the operative carrier tube 3002 is loaded with a round of ammunition.

Additionally, with the lock pin 3092 in the upper hole, no motion can be transmitted to the switch 3086 (3087) by the switch cam 3096. When the damaged carrier tube 3002 lines up with the upper hoist 4000, the switch cam 3096 is held away from contact with switch 3086 (3087) at the upper hoist position. Switch 3086 (3087) therefore indicates that the carrier tube 3002 is empty. This prevents the operation of the tube ejector mechanism and also permits the carrier 3000 to return to the transfer tube station as soon as the round of ammunition in the operative carrier tube 3002 has been delivered to its opposed upper hoist tube 4002.

*Interlocks and Switches-Loaders*

As previously stated and shown in FIG. 7, each ammunition loader 1000 has two drum operating hydraulic valve blocks 1030 and 1040. One hydraulic valve block 1040 controls the powder case drum 1010, while the other hydraulic valve block 1030 controls the projectile drum 1008. These loaders 1000 have independent electrical control circuits, and drive their drums through separate gearing arrangements, but their operation is otherwise identical.

The mechanism of the valve block 1030 (or 1040) performs two functions in response to command signals from its electrical control circuits. First, in one second of time, the valve block mechanism indexes the drum through an 18 degree arc, which is the angular distance between adjacent ammunition cavities. Each index stroke thus removes one cavity from beneath the lower hoist tube 2002 and reloads it with another. Second, upon completion of each index stroke, it retracts the drum actuating rack to a position of readiness for the next index stroke.

In the explanation that follows, the powder case drum operating valve block 1040 installed on ammunition loader 1000A is used as a reference unit. The ammunition loader 1000A feeds rounds of ammunition into the lower hoist 2000C. It is considered to be a part of the lower ammunition hoist 2000C.

When ordered to "load" his drum, each ammunition handler first moves a shutter control lever 1019, shown in FIG. 8, into the inboard notch on the shutter mounting bracket at the top of the loading door, allowing spring-loaded shutter linkage below the door to hold the shutters 1020 in the closed position. The ammunition handler then places his round of ammunition on a shelf 1037, and pushes it through the shutters 1020 into the empty drum cavity opposite the door. As the round of ammunition moves into the drum 1010, it forces the shutters 1020 open against spring pressure and causes the right-hand shutters 1020 to force a spring-loaded switch actuating plunger rightward into an interlock switch 1017 until a spring-loaded manual switch lever 1015 engages a detent in the plunger and locks it in place.

Figure 34:
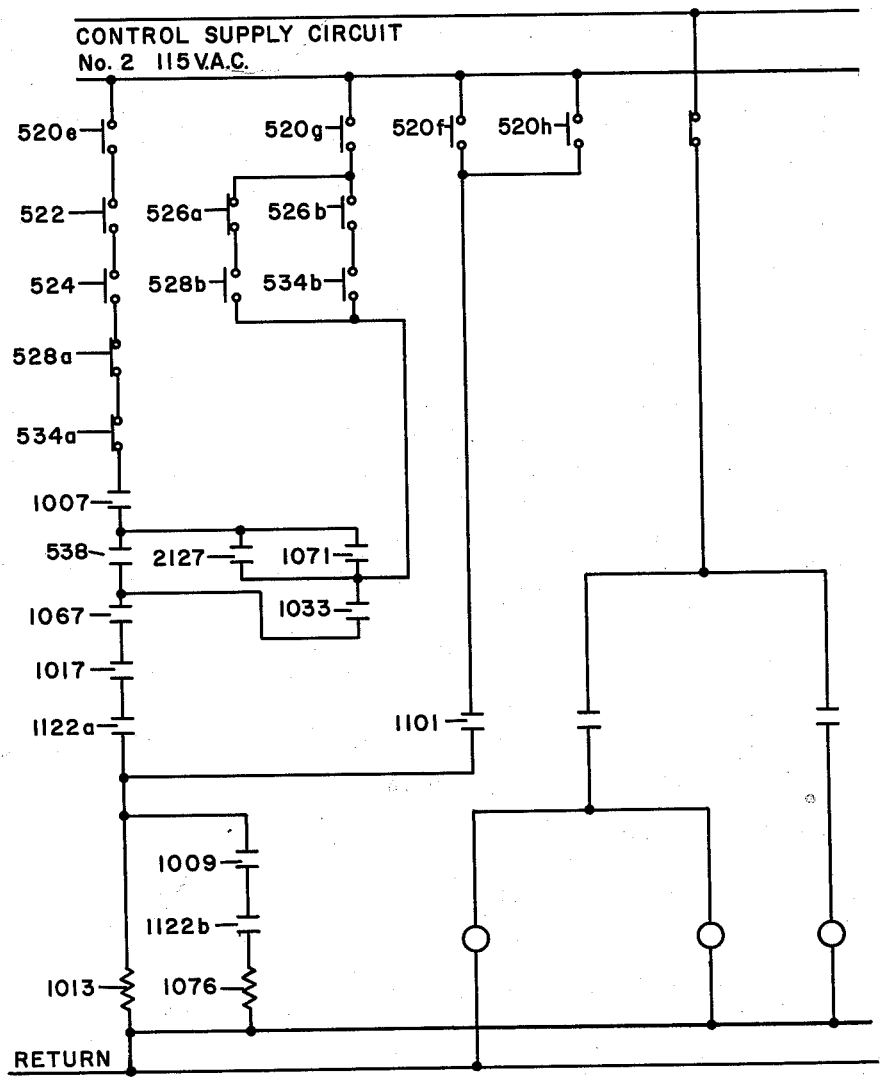
FIG. 34 is a schematic of an electrical control circuit for locking powder case loading door shutters and indexing powder case drum.

In this position, the plunger causes interlock switch 1017 to lock open the electrical control circuit of the drum indexing solenoid 1076, shown schematically on the left side in FIG. 34. This open circuit makes it impossible for the drum 1010 to index until the ammunition handler depresses manual switch detent lever 1015 on the right side of the switch 1017 and releases the plunger to unlock and close the interlock switch 1017. By deactivating the drum indexing control circuit whenever a round of ammunition is loaded into the loader 1000 and allowing only the ammunition handler to determine when the circuit should be reactivated and the drum indexed, the shutter actuated loading door switch thus eliminates the justifiable fear the ammunition handler might otherwise have of getting his hands caught in an indexing drum beyond his control.

If the other interlock conditions in the drum indexing control circuit are satisfied (their respective switches close automatically) at the time the ammunition handler manually closes the loading door switch, a loading door solenoid 1013 is energized. The upper and lower insets to FIG. 8 show the unlocking and locking operations respectively of the shutters 1020 by solenoid 1013. The rightward energization stroke of the solenoid 1013 first locks the shutters 1020 in the closed position by pulling a shutter locking lever 1011, about its pivot mounting until the lip at the outboard end of the lever 1011 engages the locking lug on the right-hand shutter 1020. It next closes an interlock switch 1009 in the solenoid housing which finally completes the circuit to the drum indexing solenoid and allows the operating valve block to now index the drum.

By locking the shutters 1020 in the closed position during the time that the drum of the loader 1000 is being indexed, the solenoid actuated loading door lock thus prevents the ammunition handler from loading ammunition into an indexing drum and acts as another safety device for his protection.

A number of control switches are provided for the use of the gun captain at his station within the gun shield. Among these switches, the following are significant in the control and interlock system.

Figure 35:
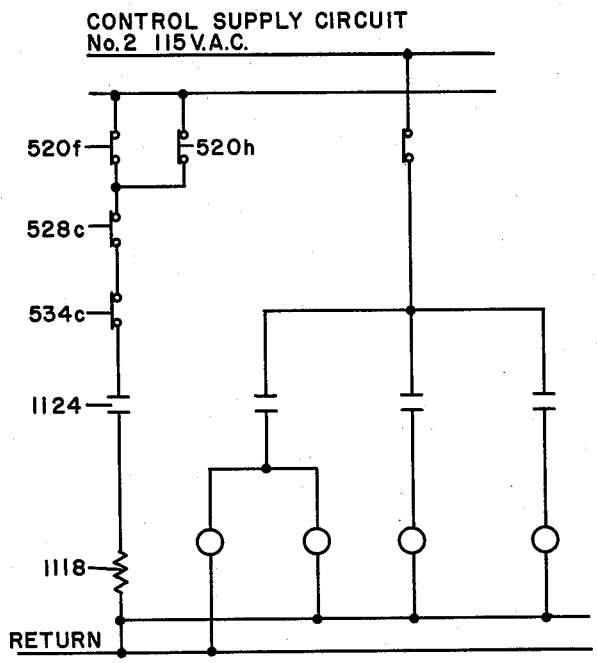
FIG. 35 is a schematic of the electrical control circuit for retracting powder case drum index rack.

There is provided, as shown in FIGS. 34 and 35, a three position multicontact system operation select switch 520 which has three positions designated "Automatic," "Off," and "Manual." Another control switch 522 marked "Automatic Control" has three positions, namely, "Off," "Load," or "Fire." A lower hoist control switch 524 has positions "D," "C and D," or "C."

To delegate his control to the ammunition handler, the gun captain has a two position control transfer switch 526 marked "Gun Captain" and "Loader."

A pair of three position control switches 528 and 529 gives the gun captain control of the ammunition loaders 1000B and 1000A respectively. These switches 528 and 529 are each marked "Projectile," "Automatic," and "Powder Case."

The gun captain also has, under his jurisdiction, a lower hoist control switch 530 marked "Flight Level," "Automatic" and "Raise"; a right upper hoist shutter control switch 532, and an upper hoist select control switch 536.

The ammunition handler has switches for manually controlling the four projectile and powder case ammunition drums 1008 and 1010, respectively, for the ammunition loaders 1000. A representative one of these switches is a powder drum control switch 534.

For purposes of discussion, powder drum control switch 534 for the ammunition loader 1000B will be considered in connection with FIG. 34.

There are also provided auxiliary holding relays 538 and 540. Relay 538 energizes when the hoist pawl is clear of the loader drums, and relay 540 energizes when the hoist pawl 2022 is at flight level.

Hereinafter, interlock elements, such as switches and relays, having multiple contacts are designated by the basic symbol number except where the separate contact has particular significance. In such instances, a lower case suffix letter is appended.

Reference is now made to the simplified control circuit of FIG. 34, and FIGS. 10 and 14. In "Automatic" power control, the drum index stroke begins with the energization of the drum drive clutch unlocking solenoid 1076 through the thirteen electrical control circuit components listed below:

(1) The gun loading system operation selector switch 520 (e and f contacts) is set at "Automatic."

(2) The gun ammunition handling and loading system automatic control switch 522 is set at "Load" or "Fire."

(3) The lower hoist selector switch 524 is set at "D Only" (or "C and D"). Although independently controlled and operated, the loader 1000B is an operational component of the lower hoist 2000D into which it feeds rounds of ammunition. The operation of the two units is therefore interdependent during "Automatic" operation. Hence, the control switch interlock 524 is interlocked.

(4) The drum manual control switch 528a for the drum of the ammunition loader 1000B is set at "Automatic."

(5) The powder case drum manual control switch 534a for the ammunition loader 1000B is set at "Automatic."

(6) Interlock switch 1097 is closed, indicating that no powder case PC for a round of ammunition is in the hoist tube passage 1042 of the ammunition loader 1000B.

(7) Relay 538 is closed, indicating that the round of ammunition is clear of the loader 1000B.

(8) Interlock switch 1067 is closed, thus signalling that the hoist tube projectile support is extended in the ammunition loader 1000B.

(9) Switch 1017 is closed, indicating that the shutters 1020 are closed at the powder case loading door for the ammunition loader 1000B and that the powder case handler has depressed his manual switch lever 1015.

(10) Interlock switch 1122a is closed, indicating that the powder case drum actuating rack for the ammunition loader 1000B is retracted.

If the previously mentioned ten conditions are fulfilled, then:

(11) Solenoid 1013 is energized, locking the powder case loading door shutters 1020 for the ammunition loader 1000B and closing switch 1009, illustrated in FIG. 8.

(12) Switch 1009 is closed, indicating that the solenoid 1013 has completed its energization stroke and that the powder case loading door shutters 1020 are locked.

(13) Finally, interlock switch 1122b indicates that the powder case drum actuating rack for the ammunition loader 1000B is retracted.

It is to be noted that the circuit control component of item (13) duplicates the indication of the circuit control component of item (10). This separate set of circuit contacts is provided only as a means of de-energizing solenoid 1076 after the index stroke has begun. This cannot be done by any of the other switches in the circuit because of the powder case interlock switch 1101 which independently keeps solenoid 1013 energized and interlock switch 1009 closed throughout the index stroke.

In "Manual" power control, solenoid 1076, illustrated in FIG. 34, can be energized through either of two electrical circuits. In the first circuit in which the gun captain controls the movement of the drum, (1) switch 520 (g and h contacts) is set at "Manual"; (2) switch 526a is set at "Gun Captain"; (3) switch 528b is set at "Powder Case Drum"; (4) interlock switch 1033 is closed, indicating that the hoist pawl 2022 is at flight level; and (5) the remaining interlock switch positions (8) through (13) are in the "Automatic" control circuit outlined above.

In the second circuit, when the loader control man controls the movement of the drum, (1) switch 520 (g and h contacts) is set at "Manual"; (2) switch 526b is set at "Loader"; (3) switch 534b is set at "Index"; (4) interlock switch 1033 is closed, indicating that the hoist pawl 2022 is at flight level; and (5) the remaining interlock switch positions (8) through (13) are in the "Automatic" control position.

Referring now to FIGS. 14 and 35 of the drawings, after each index stroke, the rack motor 1088 is hydraulically returned to the left end of its cylinder in order to place the drum actuating rack 1112 in position for the next index stroke. This action, called the "rack retract stroke," begins when solenoid 1118 is energized through the following electrical control circuit components: (1) switch 520, the gun loading system operation selector switch, is set at either "Automatic" or "Manual" (f or h contacts, respectively); switch 528c, the drum manual control switch for the ammunition loader 1000B is set at "Automatic"; (3) switch 534c, the powder case drum manual control switch for the ammunition loader 1000B, is set at "Automatic"; and (4) interlock switch 1124 is closed, signalling that the index stroke is completed and that the drum drive piston of rack motor 1088 is fully extended. Solenoid 1118 then initiates the locking of the drum clutch 1100 to fixed clutch jaw 1104 and the retracting of rack 1112.

In automatic power operation, the lower ammunition hoists 2000 furnish rounds of ammunition to the gun 6002 in accordance with the demands of the gun ammunition handling and loading system. This means that the cycling rate of the lower ammunition hoists 2000 will be determined primarily by the firing rate of the gun 6002.

In the description below, using the simplified drawing of FIG. 36 it is assumed that the gun 6002 is firing continuously in two-side operation. The circuit elements will then function according to the following eighteen (18) conditions:

(1) Switch 520 (*j* and *e* contacts) is positioned to "Automatic." This selects automatic loading of the rounds of ammunition.

(2) Switch 522c is positioned to "Load" or "Fire" to start the loading operation.

(3) Switch 524c is positioned to C and D (or C only) indicating that the lower ammunition hoist 2000C is to be active.

(4) Switch 530a is spring-returned to the "Automatic" position. This switch 530a prevents a "sneak" circuit during "Local" operations and is not used for automatic operation.

(5) The *a* contacts for relay 540 are closed when the lower ammunition hoist 2000 is at a flight level. The coil of relay 540 is energized through switch 1033, right side of figure, which is closed when the hoist 2000 reaches a flight level. This insures that each cycle of the hoist 2000 will begin with an ammunition lift pawl 2022 in position at the bottom of the drum of the ammunition loader 1000.

(6) Interlock switch 2115a is closed when the hoist local hand crank 2114 is locked. This interlock switch 2115a is used in "Local" control and is normally closed during automatic operation.

(7) A hoist tube door interlock switch 1071b is closed when a projectile PJ is at the hoist station in the ammunition loader 1000; interlock switch 1007b is closed when an ammunition powder case PC is at the hoist station in the ammunition loader 1000; interlock switch 1071c is open when an ammunition projectile is at the hoist station in the ammunition loader 1000; and interlock switch 1007c is open when an ammunition case is at the hoist station in the ammunition loader 1000.

During sustained firing bursts of rounds of ammunition, it is possible that the ammunition handlers may not be able to load the drums 1008 and 1010 of the ammunition loaders 1000 fast enough to keep up with the operational demands of the ammunition handling and loading system. This could result in any one of the following conditions being present at the lower hoist station of the loader 1000 at the end of a hoist cycle, namely (1) a powder case PC in the hoist tube passage 1042 with no projectile PJ; (2) a powder case PC and a projectile PJ in the hoist tube passage 1042; and (3) a powder case PC and no projectile PJ or a projectile PJ and no case PC at the hoist tube passage 1042.

If condition (1) above exists, it is advisable to allow the chain of the lower ammunition hoist 2000 to cycle since, in some installations, as many as 19 rounds of ammunition are available for each lower hoist 2000 in the lower hoist tubes 2002. Under these circumstances, it is better to allow the chain of the lower ammunition hoist 2000 to cycle and maintain the firing rate of the rounds of ammunition than to interrupt the firing rate thereof while a complete round of ammunition is positioned in the ammunition loader 1000. In this situation, therefore, interlock switches 1071c and 1007c close to initiate the cycle of the lower ammunition hoist 2000.

If condition (2) exists, where both a powder case PC and projectile PJ are in position in the lower hoist 2000, the hoist chain may cycle in the normal manner. In this situation, interlock switches 1071b and 1007b are closed to allow the chain of the lower hoist 2000 to cycle.

If condition (3) exists, the firing rate of the rounds of ammunition must be interrupted until a complete round of ammunition is in position at the lower ammunition hoist 2000, to prevent raising an incomplete round of ammunition. If powder case PC is present but no projectile PJ, interlock switch 1007b will be closed but interlock switch 1071b will be open, thus preventing the circuit from being completed through these two switches. On the bypass side of the circuit, switch 1071c will be closed but switch 1007c will be open and the circuit will be broken at this point also.

(8) A pair of interlock switches 1103 and 1101 are closed when the loader powder case clutch and the loader projectile clutch, respectively, are locked. This indicates that the loader 1000 has completed its index cycle and will not index to cause interference when the lower hoist pawl 2022 is in the loader cavity.

(9) Interlock switch 1029 is closed when the strike down tube door 1021 is closed. This interlock switch 1029 is used for local control and is normally closed for automatic operation. Switch 1029 insures that the strike down tube door 1021 will be closed when the gun mount 6000 is in automatic operation.

(10) Interlock switch 1027 is closed when the unloading station is not loaded. This interlock switch 1027 is used for local control and is normally closed for automatic operation. In the event that a round of ammunition were left in the strikedown or return tube 2004, the chain of the lower hoist 2000 would jam if allowed to cycle.

(11) Interlock switch 2127 is closed when the hoist transfer tube 2006 is empty. This switch 2127 insures that a round of ammunition will not be lifted into the transfer tube 2006 unless the previous round of ammunition has been ejected into the carrier tube 3002 of the ammunition carrier 3000. This switch 2127 thus prevents ramming one round of ammunition into another.

(12) Interlock switches 2117 and 2091d are open during automatic operation of the ammunition carrier 3000. These switches 2117 and 2091d function for local control and will now be explained in the subsequent paragraphs.

(13) Interlock switch 2118 is closed when the hoist transfer tube ejectors are retracted. If the hoist transfer tube ejectors were not retracted, any round of ammunition being raised into the transfer station would hit the ejectors, damaging both the round of ammunition and the ejectors.

(14) Servo pressure switch 2061 is closed when servo pressure is normal. This switch 2061 opens if the pressure is lost or the motor stops. A holding circuit (to be explained subsequently) keeps start solenoid 2082 energized during the hoisting cycle. If switch 2061 opens during the hoisting cycle, the chain of the lower hoist 2000 must be cranked to a flight level in local control before another automatic cycle can begin.

(15) Interlock switch 2115c is closed when the hoist local crank is locked. This switch 2115c opens the circuit to the start solenoid 2082 during local control.

(16) Interlock switch 2129 is closed when the transfer tube unloading door is closed. This switch 2129 insures that the transfer tube door will be closed during automatic cycling of the system to protect personnel.

(17) Interlock switch 2095 is closed when the hoist operations select lever is in "Automatic." This lever remains in the "Automatic" position during automatic cycling.

(18) When all of the above conditions have been satisfied, the start solenoid 2082 is energized to initiate a hoist cycle.

After the hoist cycle is initiated, some of the interlock switches in the circuit of start solenoid 2082 open. Since this start solenoid 2082 must be energized throughout the hoist cycle, a hold circuit is introduced in the circuit of solenoid 2082 outlined in the following three steps:

(1) Interlock switch 2083 is closed when start solenoid 2082 is energized.

(2) Interlock switch 1025 is closed at all times except when a round of ammunition in the strikedown or return tube 2004 approaches the unloading station. This interlock switch 1025 stops the lower hoist 2000 in case a round of ammunition is accidently left in the lower section of return tube 1023 during automatic operation.

(3) Interlock switch 1031 is closed until a lift pawl 2022 is within a predetermined distance from the flight level. This switch 1031 opens the holding circuit, de-energizing start solenoid 2082 and the chain of lower hoist 2000 decelerates and comes to a stop at flight level.

For manual power operation, operation select switch 520 (contacts *r* and *m*) is placed in "Manual." Control switches 522, 524, and 530*a* are thus bypassed. Switch 530*b* is positioned to "Raise" to initiate the hoist cycle. All other interlock conditions are the same as for automatic power operation.

The electrical interlock circuit elements controlling the operation of the lower hoist 2000 in local control are not wired through switch 520. With additional reference to FIG. 16 and FIG. 16A, these circuits operate as outlined in the following twelve (12) steps discussed below:

(1) Let it be assumed that the hoist electric motor 2040 is running, the hoist local hand crank 2114 is unlocked, and the hoist operation selector lever 2093 is moved from "Automatic" to "Local."

The circuit for energizing solenoid 2090 is then as follows:

(2) Interlock switch 2091*b* is closed when the hoist operation selector lever 2093 is in "Local."

(3) Interlock switches 1071*c* and 1007*c* are closed when the lower hoist 2000 is empty at the loader station. Since this operation is used to unload the ammunition handling and loading system, it would not be desirable to hoist a round of ammunition out of the loader 1000, hoist it all the way to the transfer station and then have to strike it down through the strikedown or return tube 2004 again. Switches 1071*c* and 1007*c* insure that the lower hoist 2000 cannot be operated in "Local" until the round of ammunition is removed from the loader station.

(4) Interlock switches 1103 and 1101 for the projectile PJ and powder case PC perform the same function as in "Automatic."

(5) Interlock switch 1027 opens the circuit when a round of ammunition reaches the unloading station. No further cranking of the hand crank may occur until this round of ammunition is removed. When the ammunition handlers open the unloading door, switch 1029 opens. These two switches 1027 and 1029 insure that cranking of the hand crank may not occur until the round of ammunition has been removed from the unloading station and unloading door 1021 has been closed.

(6) Interlock switch 2127 is closed when the hoist transfer tube 2006 is not loaded. When unloading operations are taking place, rounds of ammunition are being cranked up in the hoist delivery tube 2002 at the same time that the rounds of ammunition are being cranked down in the strikedown or return tube 2004. Since interlock switch 2127 will be actuated when only a part of the round of ammunition is in the transfer tube 2006, it is necessary to bypass this switch 2127 so as to maintain solenoid 2090 energized.

(7) If the operation select lever 2093 is in "Local," a by-pass circuit is established around interlock switch 2127, through interlock switch 2091*d*. This circuit keeps solenoid 2090 energized even if interlock switch 2127 opens. Then, when the round of ammunition is seated on the transfer level pawl 2116, switch 2117 opens the circuit to solenoid 2090 and no further cranking can occur until the round of ammunition is removed from the transfer tube 2006.

(8) Interlock switches 2118 and 2061 function in the same manner as described for "Automatic" operation.

(9) When the local hand crank 2114 is not locked, interlock switch 2115*b* closes the circuit to solenoid 2090. At the same time, interlock switch 2115*c* opens the circuit to start solenoid 2082, thus preventing automatic operation.

(10) When all of the above conditions have been satisfied, solenoid 2090 is energized and the lower ammunition hoist 2000 may be operated in local control.

(11) When operating the lower ammunition hoist 2000 in local control, the hoist operation selector lever 2093 must be positioned to "Local" and the local hand crank 2114 must be unlocked. When the hoist local hand crank 2114 is unlocked, solenoid 2090 is energized, shifting the transfer valve 2083. If the hoist operation selector lever 2093 is positioned in "Local," servo pressure will be ported so as to engage the control piston clutch 2094 and allow local cranking.

However, if solenoid 2090 is energized without the local control selector lever 2093 being shifted to "Local," fluid will be ported so as to disengage the clutch 2094. Under these conditions, if hand cranking of the hoist 2000 is attempted, the clutch 2094 will be disengaged and the chain of the hoist 2000 will not move.

Figure 36:
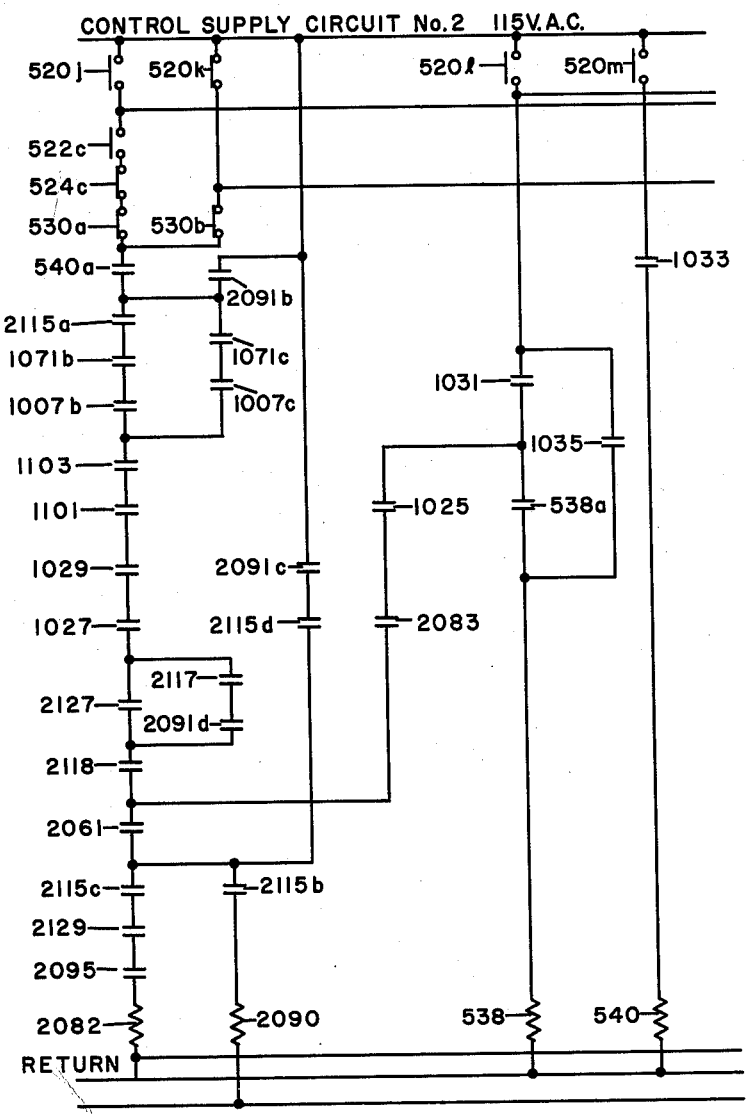
FIG. 36 is a schematic of the electrical circuit for the lower hoist interlocks.

In the electrical circuit shown in FIG. 36, interlock switches 2091*c* and 2115*d* are inserted in the circuit to energize solenoid 2090 and disengage the hoist clutch 2094 whenever the hoist operation selector lever 2093 is left in "Automatic." However, when the hoist operation selector lever 2093 is shifted to "Local," switch 2091*c* breaks the circuit to solenoid 2090. The circuit must now be completed through switch 2091*b* above and the interlock switches following it. With interlock switches 2115*b* and 2091*c* thus in the circuit, a set sequence of shifting to local control is not necessary.

(12) Interlock switch 2115*b* performs the same function as interlock switch 2115*d*.

The interlock circuit which controls the actions of the lower hoist transfer tube 2006 is shown and explained in FIG. 37. In normal automatic operation, the current follows the straight path on the left-hand side of the diagram to energize solenoid 2134. This solenoid 2134 shifts a valve to extend the carrier tube ejector plates 3030 and 3031 cooperatively with the shutters 2007 of transfer tube 2006.

When the transfer tube ejectors are fully extended, interlock switch 2119 is actuated. This switch 2119 closes the circuit to solenoid 2128 from control switch 532*c*. This solenoid 2128 shifts a valve to retract the carrier ejector plates 3030 and 3031 and transfer tube shutters 2007.

For manual power operation of the lower hoist circuit, select switch 520*p* is turned to "Manual" and control switches 522 and 524 are bypassed. Control switch 532*b* is then positioned to "Open" to extend the carrier ejector plates 3030 and 3031, and transfer tube shutters 2007.

If the chain of the lower hoist 2000 is at fight level, so that relay 540*b* is closed, carrier ejector plates 3030 and 3031 and transfer tube shutters 2007 will be allowed to open. To close the carrier ejector plates 3030 and 3031 and transfer tube shutters 2007, control switch 532*d* is positioned to "Close." If the transfer tube shutters 2007 are fully extended, so that interlock switch 2119 is actuated, the carrier plate ejectors 3030 and 3031 and transfer tube shutters 2007 will retract.

A carrier control switch 548 is also provided on the panel for the gun captain as shown schematically in FIG. 38. This switch 548 has three positions marked therein, namely "To Upper Hoist," "Automatic," and "To Lower Hoist."

The first step in the initiation of a cycle of the ammunition carrier 3000 to the upper hoist 4000 is the energization of a carrier-to-upper-hoist interlock relay 542, also shown in FIG. 38. This relay 542, when energized, closes contacts to enable various other circuits to be energized, as will be discussed later on.

In automatic power operation of the system, the following twelve conditions must be fulfilled before relay 542 can be energized, namely:

(1) The operation select switch 520 is positioned at "Automatic";

(2) The switch 522 is positioned at "Load" (or Fire);

(3) The switch 548 is positioned at "Automatic";

(4) The interlock switch 3084 is closed to indicate that the ammunition carrier 3000 is at the lower hoist 2000 and that the carrier tube 3002 opposite the lower hoist 2000C is loaded;

(5) The interlock switch 3085 is closed to indicate that the ammunition carrier 3000 is at the lower hoist 2000 and that the carrier tube 3002 opposite the lower hoist 2000D is loaded;

(6) The interlock switch 2118C is closed to indicate that the transfer tube shutters 2007 for the lower hoist 2000C are retracted;

(7) The interlock switch 2137c is closed to indicate that the carrier 3000 is at the lower hoist 2000 and that the carrier tube ejector plates 3030 and 3031 at the hoist 2000C are retracted;

(8) The interlock switch 2118D is closed to indicate that the transfer tube shutters 2007 for the lower hoist 2000D are retracted;

(9) The interlock switch 2137D is closed to indicate that the ammunition carrier 3000 is at the lower hoist 2000 and that the carrier tube ejector plates 3030 and 3031 at the hoist 2000D are retracted;

(10) The servo pressure switch 2061 is closed to indicate that the pressure is available from lower hoist accumulator to operate the roller and lever 3020 of lower latch 3010 for the carrier 3000;

(11) The interlock switch 3023 is closed to indicate that the ammunition carrier 3000 is latched to the lower hoist 2000; and

(12) A pressure operated switch 5040 is closed to indicated that the main accumulator system contains more than a predetermined quantity of oil. This assures that there is enough PA fluid available to complete a cycle of the ammunition carrier 3000 if it is initiated.

When all of the above conditions have been met, relay 542 is energized, indicating that the ammunition carrier 3000 is ready for a cycle to the upper hoist 4000. The contacts of the relay 542 then energize other circuits which actually initiate the cycle of the ammunition carrier 3000.

Relay 542, when energized, closes contacts so as to actuate solenoid 3079 shown in FIG. 20. This solenoid 3079 retracts the roller and lever 3020 of lower latch 3010. As soon as the roller and lever 3020 of the lower latch 3010 of the ammunition carrier 3000 is retracted, switch 3080 closes and solenoid 4079 shown in FIG. 32 in the carrier control housing energizes and shifts the hoist selector valve 4092 for a cycle of the ammunition carrier 3000 to the upper hoist 4000. Simultaneously, interlock switch 4071 is closed. This switch 4071, in conjunction with relay 542, energizes solenoid 3076 to extend the roller and lever 4012 of the upper latch 4010.

Interlock switch 4071 is placed in the solenoid 3076 circuit to insure that the hoist selector valve 4092 has been shifted before the roller and lever 4012 of the upper latch 4010 is allowed to extend. This switch 4071 prevents the tie-ups that might result if the upper hoist 4000 happened to be in alignment with the ammunition carrier 3000 at the time of switching. In FIG. 20, there is illustrated a schematic diagram of the ammunition carrier 3000 latched to the upper hoist 4000 at the end of a carrier-to-upper hoist cycle.

When energized, the lower solenoid 3079 retracts the roller and lever 3020 of the lower latch 3010 by means of the control valve block 3018. As the latch lever rotates, interlock switch 3023 is de-actuated, and interlock switch 3080 is actuated. Switch 3080, in combination with interlock relay 542, initiates the carrier-to-upper hoist cycle, as will be explained later.

In the mechanism for the upper latch 4010, solenoid 3076 is energized by the interlock relay 542 and switch 4071 in the carrier control. When energized, solenoid 3076 initiates a tripping of the operating linkage for the upper latch 4010, allowing spring pressure to force the latch lever downwardly so that the roller and lever 4012 is positioned onto the surface of the latch ring 4018. Then, when the ammunition carrier 3000 rotates around to the position of the upper hoist 4000, spring pressure forces the lever and roller 4012 of the upper latch 4010 into the notch on the upper latch ring 4018 as shown in FIG. 20.

When the roller of the upper latch 4010 is forced onto the surface of the upper latch ring 4018, switch 3081 is de-actuated. An opposing switch 3083, however, is not actuated until the latch roller has actually entered the notch of the latch ring 4018.

Figure 39:
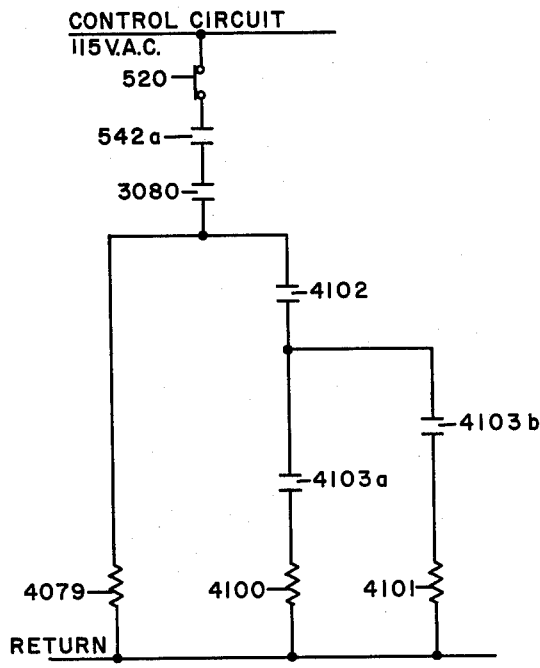
FIG. 39 is a schematic of the electrical circuit for the hoist selector and directional selector.

In addition to initiating the latching sequence of the carrier 3000, relay 542 is also included in the hoist and directional selector circuits. These circuits, illustrated in FIG. 39, are energized by having (1) the control switch 520 set at "Automatic"; (2) the relay contacts 542a closed; and (3) the interlock switch 3080 closed to signal that the lower latch 3010 of the carrier 3000 is retracted.

The above circuit energizes solenoid 4079, which then positions valve 4092 in the carrier control housing illustrated in FIG. 32 to initiate a cycle to the upper hoist 4000. This circuit is also part of the directional selector circuit that determines whether the ammunition carrier 3000 will rotate clockwise or counterclockwise.

In the type of cycle outlined above, the following will be true as illustrated in FIG. 39:

(1) The directional selector circuit will include items (1), (2), and (3) listed in two paragraphs above.

(2) Assuming this will be a cycle to the upper hoist 4000 and that the ammunition carrier 3000 is more than 57° from its destination, switch 4102 will be closed by the action of cam 4111 and cam follower 4121, illustrated in FIG. 31.

(3) The circuit at this point may be in either of two directions, through directional control switch 4103a or 4103b, depending on the position of cam 4143, illustrated in FIG. 32. In the discussion of the gearing arrangement, however, it was pointed out that cam follower 4141 will be riding the high portion of cam 4143, and that counterclockwise contact of directional control switch 4103 will be closed. Counterclockwise control solenoid 4101 will, therefore, energize and the rotation of the ammunition carrier 3000 will be in a counterclockwise direction.

A relay 544, illustrated schematically in FIG. 40, when energized, indicates that the ammunition carrier 3000 is ready for a cycle to the lower hoist 2000. In automatic power operation, the following conditions must be fulfilled before this relay 544 can operate:

(1) Control switch 520 must be positioned at "Automatic";

(2) Control switch 522 must be positioned at "Load" (or "Fire");

(3) Control switch 548 must be positioned at "Automatic";

(4) Interlock switch 3086 must be closed to indicate that the ammunition carrier 3000 is at upper hoist 4000 and that the carrier tube 3002 at right upper hoist 4000R is empty;

(5) Interlock switch 3087 must be closed to indicate that the ammunition carrier 3000 is at the upper hoist 4000 and that the carrier tube 3002 at the upper left hoist 4000L is empty;

(6) Switch 4073R is closed to indicate that the carrier ejector plates 3030 and 3031 at the right upper hoist 4000R are retracted;

(7) Switch 4073L must be closed to indicate that the carrier ejector plates 3030 and 3031 at left upper hoist 4000L are retracted;

(8) Switch 4083R must be closed to indicate that the right upper hoist shutter 4064 is closed;

(9) Switch 4083L must be closed to indicate that the left upper hoist shutter 4064 is closed;

(10) Interlock switch 3083 must be closed to indicate that the roller for the upper latch 4010 is in position in the notch 4016 in the upper latch ring 4018, and that the ammunition carrier 3000 is latched to the upper hoist 4000; and

(11) Interlock switch 5040 is closed to indicate that the main accumulator contains a predetermined quantity of oil. This indicates that there is sufficient fluid in the main accumulator to complete a cycle of the ammunition carrier 3000.

When the above conditions have been fulfilled, relay 544 is energized. The contacts of relay 544 are in other circuits which initiate the carrier-to-lower hoists cycle.

The first step in the initiation of a carrier-to-lower hoist cycle is the actuation of the carrier latching mechanism. Relay 544 when energized, closes the circuit to solenoid 3077 illustrated in FIG. 20. As soon as solenoid 3077 is energized, the valve block 4014 for the upper latch 4010 functions and the upper latch roller and arm 4012 is retracted. When the upper latch roller and arm 4012 retracts, switch 3081 is actuated, closing the circuit to carrier control solenoid 4077, and shifting the hoist selector valve 4092 for a cycle to the lower hoist 2000 as illustrated in FIGS. 31 and 32.

When the solenoid 4077 operates, switch 4075 is closed and the solenoid 3082 for the lower latch 3010 is energized. This causes lower latch valve block 3018 to extend the lower latch roller and lever 3020. Interlock switch 4075 is included in the circuit of the solenoid 3082 to insure that a cycle to the lower hoist 2000 has been initiated before the lower latch 3010 is extended.

Under command of solenoid 3077, the linkage attached to the upper latch roller and lever 4012 rotates the latch lever, thus lifting the roller of the upper latch 4010 out of the notch in the upper latch ring 4018. As the upper latch lever and roller 4012 retract, interlock switch 3083 is deactuated, and switch 3081 is actuated.

The energization of lower solenoid 3082 initiates the lower latch control valve block 3018 to release the linkage and allow the spring pressure to force the roller of the lower latch lever and roller 3020 onto the surface of the lower latch ring 3024. When the ammunition carrier 3000 rotates to the notch 3022 in the latch ring 3024, spring pressure forces the latch roller into the notch 3022 in the lower latch ring 3024, latching the ammunition carrier 3000 to the lower hoists 2000.

Switch 3080 is de-actuated as soon as the roller of the upper latch lever and roller 4012 moves onto the surface of the upper latch ring 4018. However, switch 3023 becomes actuated only when the ammunition carrier 3000 actually latches to the lower hoist 2000.

*Operational Sequence of Ammunition Handling and Loading System*

The operational sequence of the ammunition handling and loading system for the gun 6002 will now be explained. The gun mount 6000 illustrated in the following sequence is shown trained 90 degrees relative to the fixed lower hoists 2000 to illustrate the maximum rotation of the ammunition carrier 3000, as illustrated in FIG. 5.

Regardless of the train position of the gun mount 6000, the ammunition carrier 3000 always seeks the shortest route between the upper and lower hoists 4000 and 2000, respectively, and vice versa. The ammunition carrier 3000 never rotates through an angle of more than 90 degrees.

In reviewing the operation of the ammunition handling and loading system for the gun 6002, it should be remembered that:

(1) The operation of the system is entirely automatic, except for the manual loading of the ammunition loader drums 1000;

(2) The operational sequences discussed and illustrated hereinafter are based on the time cycle chart illustrated in FIG. 55;

(3) The Gun Captain controls the ammunition handling and loading system from a control panel in the gun house;

(4) Once the initial supply of rounds of ammunition in the loaders 1000 is exhausted, the automatic firing rate of the gun 6002 depends on the loading proficiency of the ammunition handlers;

(5) The lower hoists 2000 are fixed with relation to the ship structure, but the upper hoists 4000 are suspended from the underside of the base ring and rotate with the gun mount 6000 in train;

(6) The operating arcs through which the cradles 5002 swing rounds of ammunition from the upper hoists 4000 to the gun slide will vary from 5 to 105 degrees, depending upon the angle of elevation or depression of the gun 6002; and (7) The round of ammunition consisting of the projectile PJ assembled to the top of the powder case PC will be designated for individual tracing by the letters "R$d$–" followed by a serial number.

Figure 56:
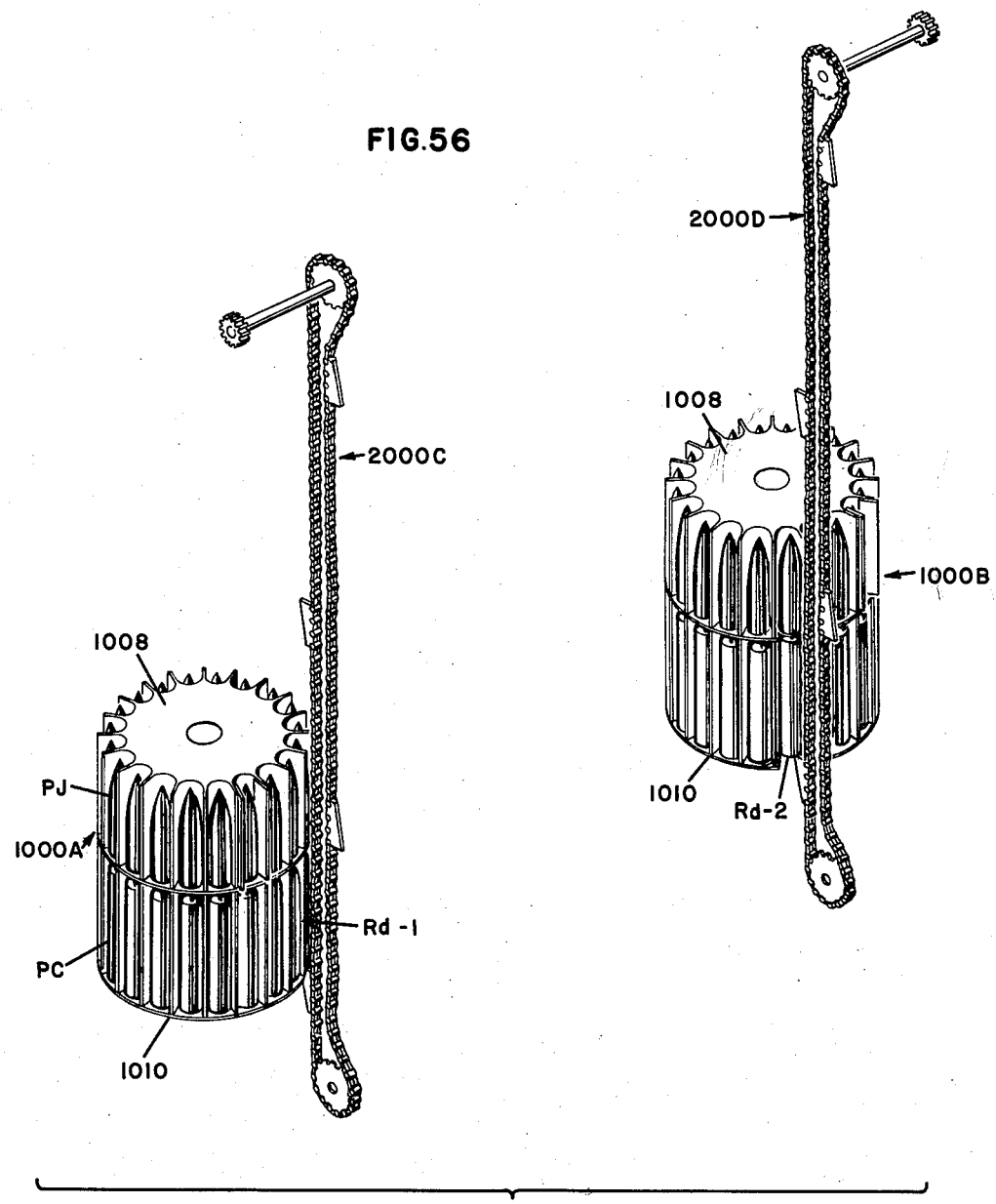
FIG. 56 is an operational sequence diagram for the system illustrating Step 1 in the handling of the rounds of ammunition.

Referring now to FIG. 56, the ammunition loaders 1000 and lower hoists 2000 are shown just before start of a hoist cycle of a round of ammunition. Rounds R$d$–1 and R$d$–2 are in position at the lower hoist position of loaders 1000A and 1000B, and the chains for the lower hoists 2000C and 2000D are at flight level. Loader drums 1008 and 1010 are not indexing.

Figure 55:
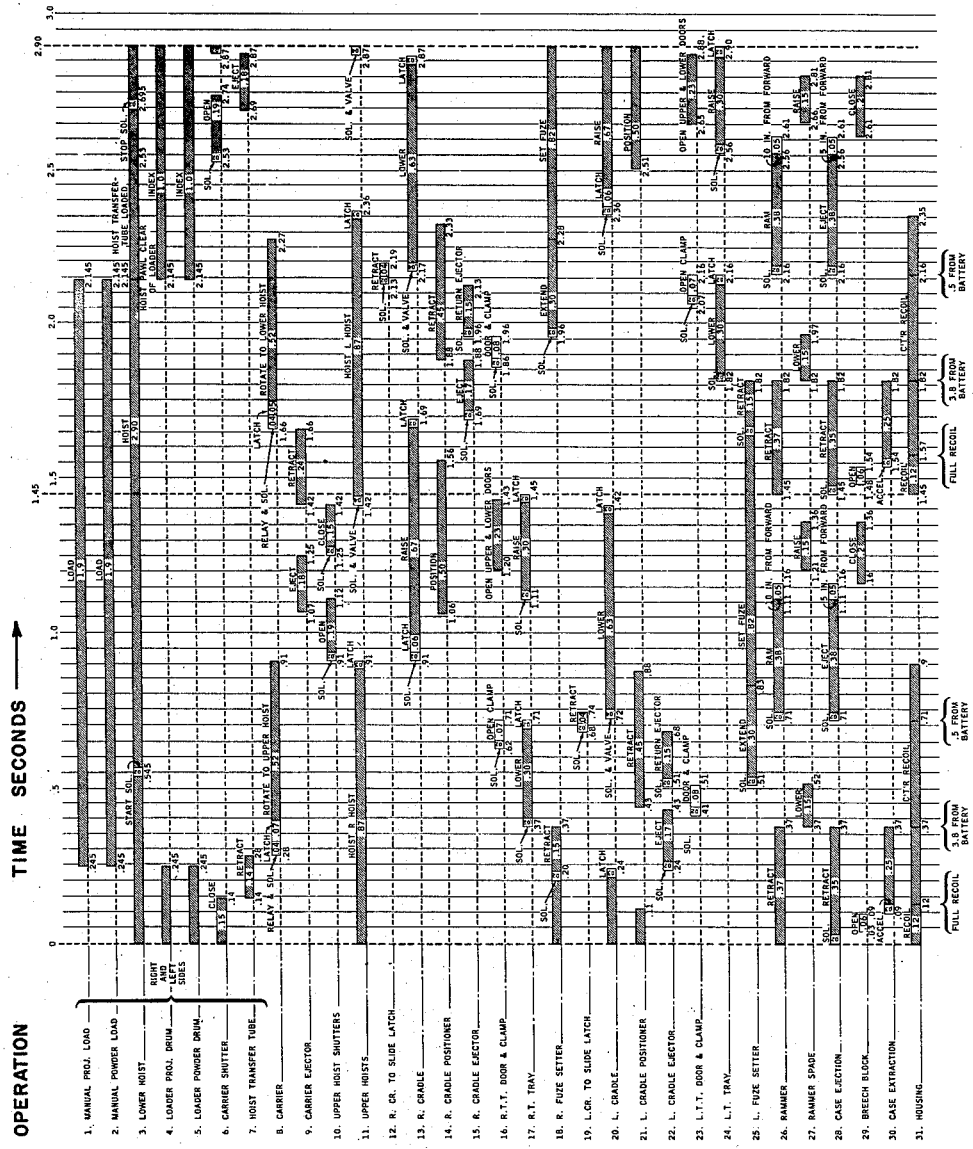
FIG. 55 is a time cycle chart for the ammunition handling and loading system for the gun.

In following the sequence of operation, reference is again directed to the chart illustrated in FIG. 55 and let it be assumed that there is automatic power operation of ammunition handling and loading system for the gun 6002.

Figure 57:
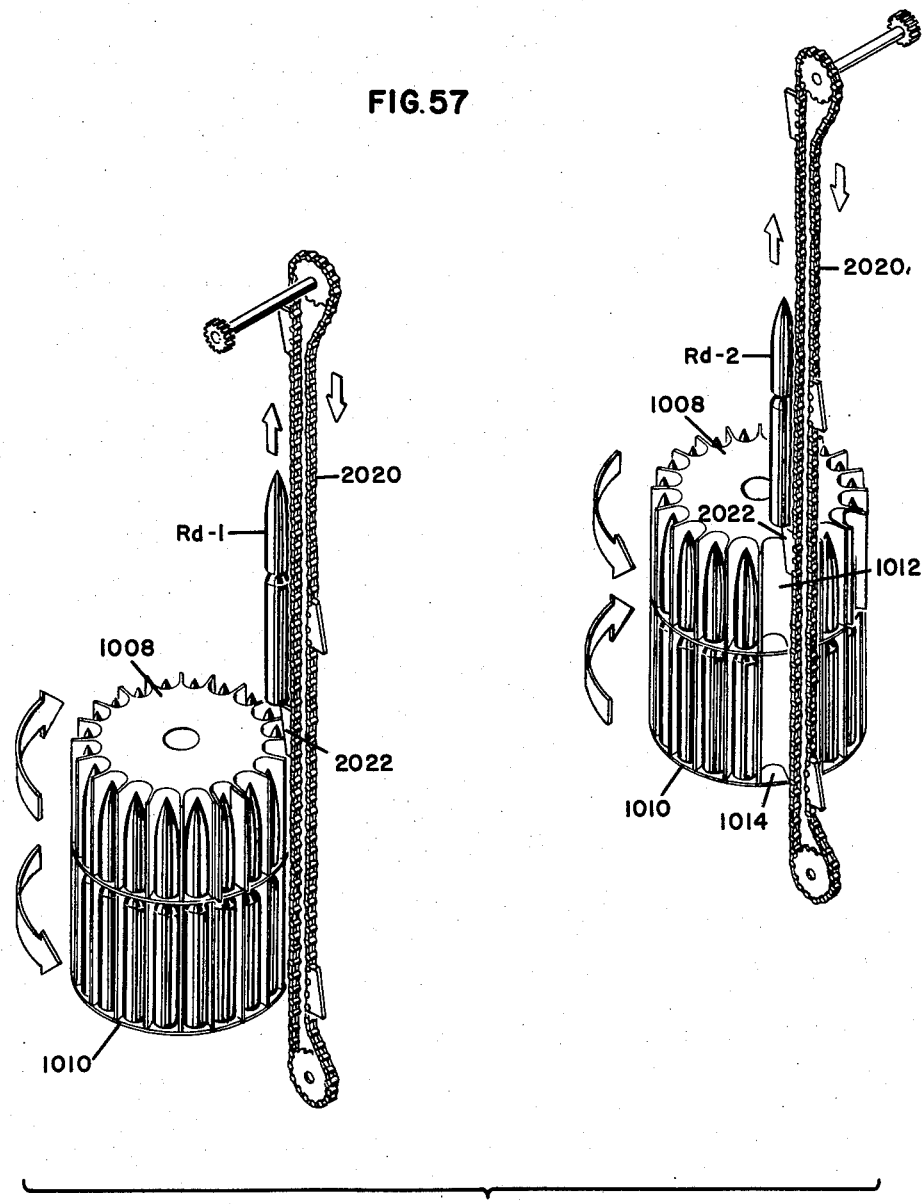
FIG. 57 is an operational sequence diagram for the system illustrating Step 2 in the handling of the rounds of ammunition thereof.

As illustrated in FIG. 57, loader drums 1008 and 1010 first remain stationary as hoist chains 2020 cycle to elevate rounds of ammunition R$d$–1 and R$d$–2 upwardly. When hoist lift pawls 2022 clear their loaders 1000A and 1000B, the loader drums 1008 and 1010 index (arrows) and place rounds of ammunition R$d$–3 and R$d$–4 in the lower hoists 2000.

When a few rounds of ammunition have been lifted out of loaders 1000A and 1000B, the rotating drums 1008 and 1010 bring empty ammunition projectile and powder case chambers 1012 and 1014 into the loading position at the projectile and powder case loading doors 1022 and 1020, respectively. When this happens, projectile and powder case handlers load the empty drum cavities with projectiles PJ and powder cases PC and continue loading as long as the drums 1008 and 1010 bring empty cavities to the doors.

Figure 58:
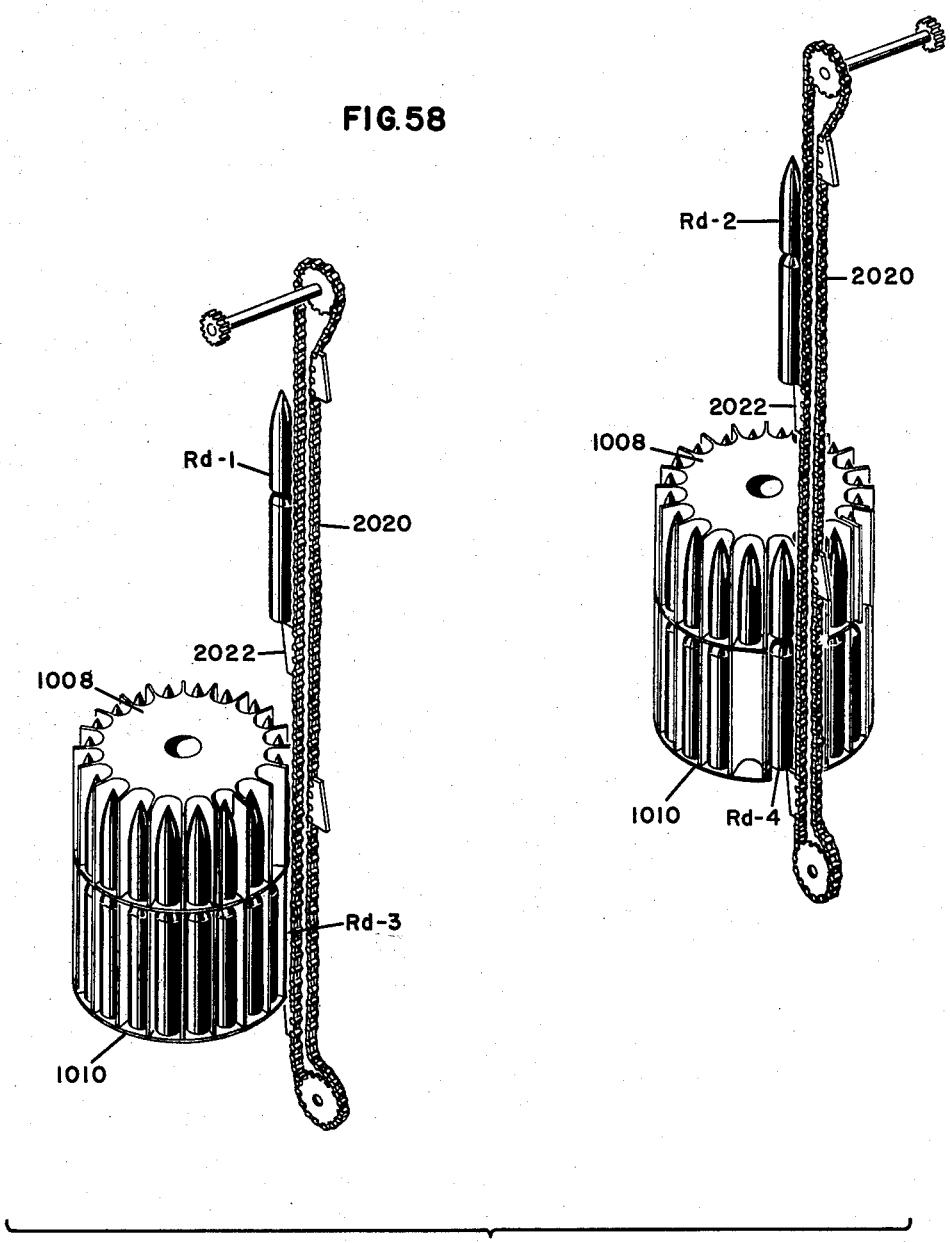
FIG. 58 is an operational sequence diagram for the system illustrating Step 3 in the handling of the rounds of ammunition thereof.

Referring now to FIG. 58, when the first raise cycle of hoist chains 2020 is completed, rounds of ammunition R$d$–1 and R$d$–2 rest on the hoist chain lift pawls 2022 at the first flight position in lower hoist delivery tubes 2002. The next lower hoist cycle is then triggered and the hoist chains 2020 begin lifting rounds of ammunition R$d$–3 and R$d$–4 out of loader drums 1008 and 1010. It is to be noted that whenever a hoist chain 2020 is being cycled, drums 1008 and 1010 are automatically stopped and in an indexed position.

Figure 59:
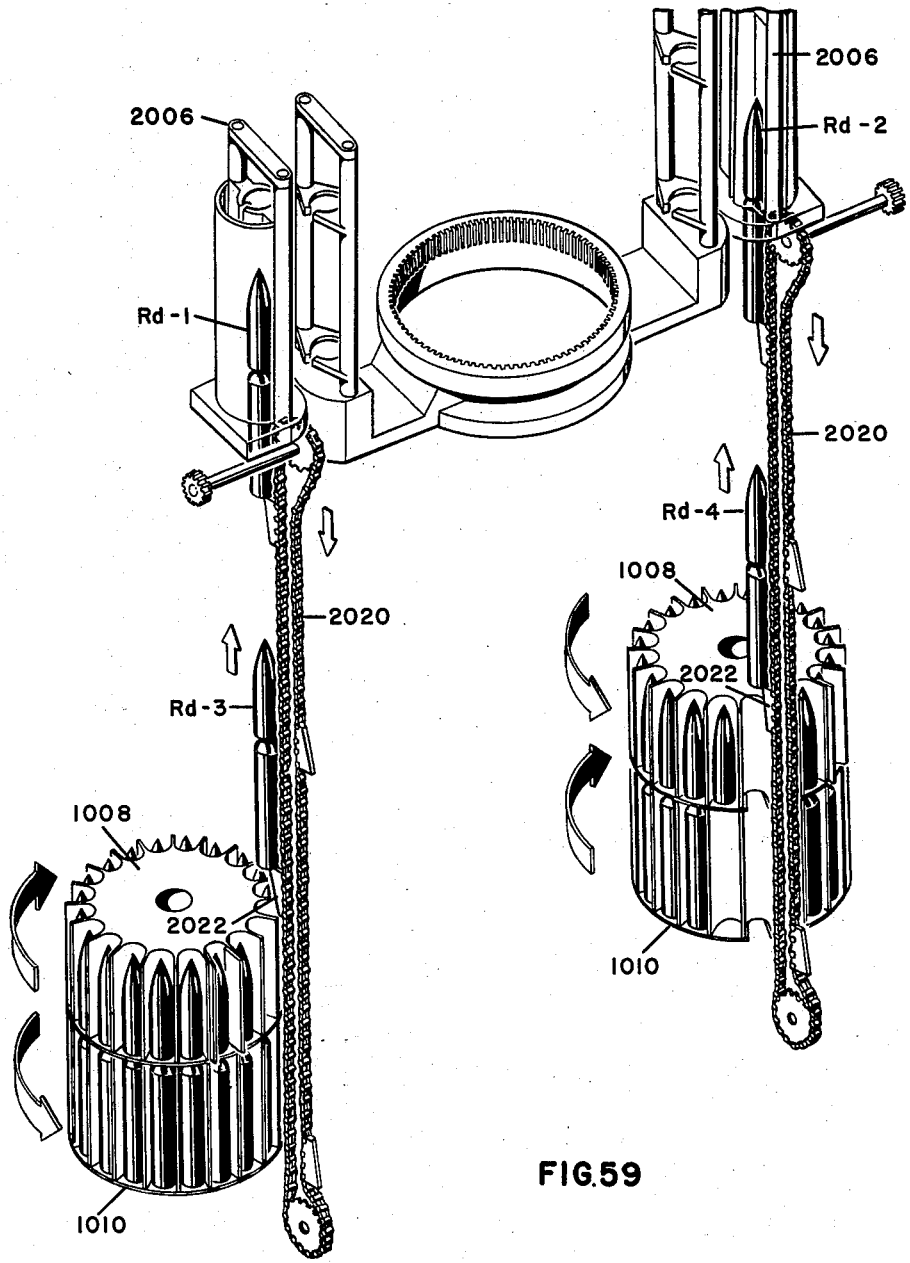
FIG. 59 is an operational sequence diagram for the system illustrating Step 4 in the handling of the rounds of ammunition thereof.
Figure 60:
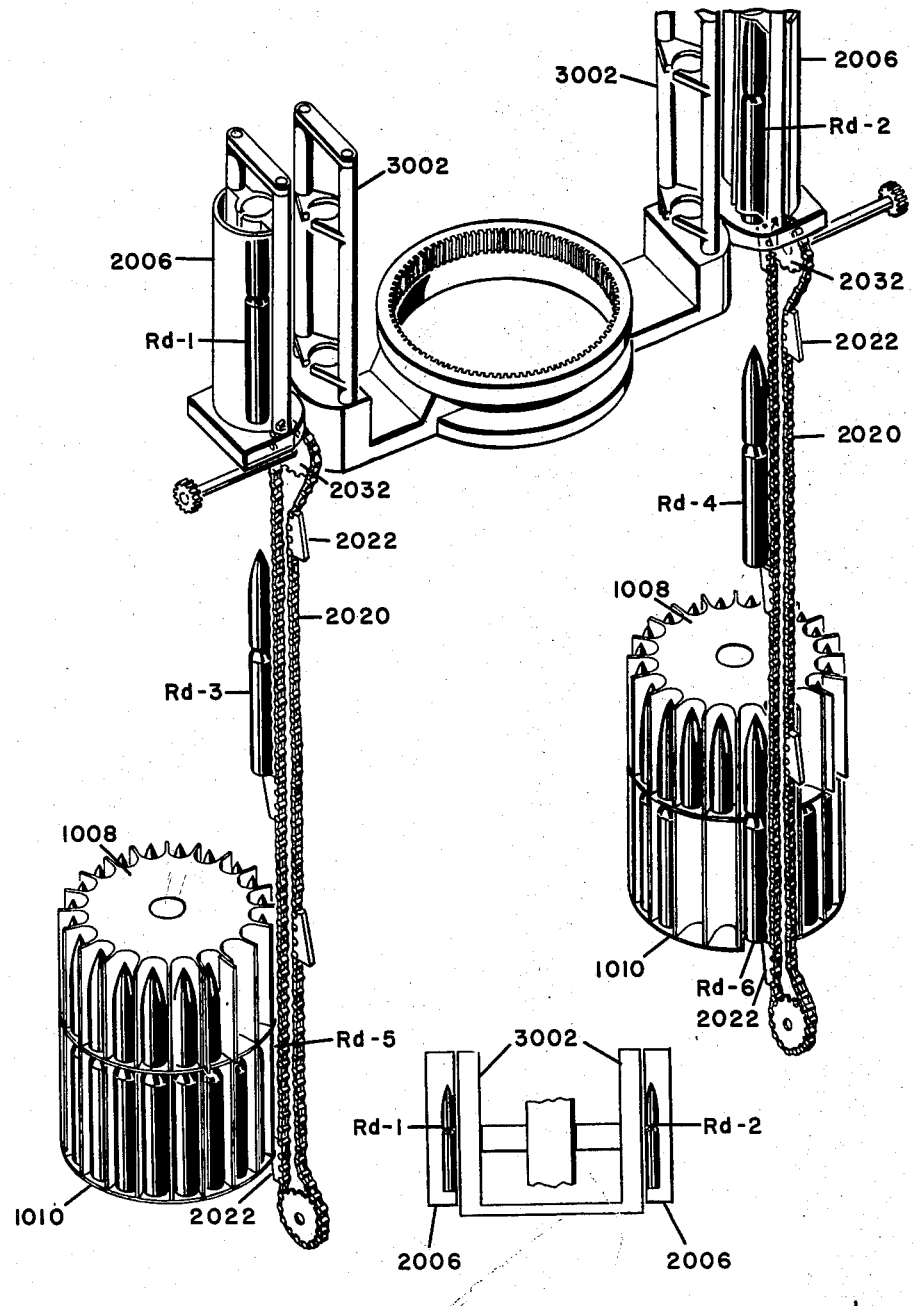
FIG. 60 is an operational sequence diagram for the system illustrating Step 5 in the handling of the rounds of ammunition thereof.

In FIG. 59, loader drums 1008 and 1010 have begun indexing rounds of ammunition R$d$–5 and R$d$–6, shown in FIG. 60, into the lower hoists 2000 as soon as the ascending hoist pawls 2022 under rounds of ammunition R$d$–3 and R$d$–4 clear the drums 1008 and 1010 of the loaders 1000.

As rounds of ammunition R$d$–3 and R$d$–4 are raised to the first flight position of the chain 2020, rounds of ammunition R$d$–1 and R$d$–2 are hoisted into the transfer tubes 2006 at the transfer station.

After raising rounds of ammunition R$d$–1 and R$d$–2 into transfer tubes 2006, as illustrated in FIG. 60, uppermost hoist pawls 2022 continue on around the tops of their upper sprockets 2032, and stop when rounds of ammunition R$d$–3 and R$d$–4 are at the first flight level of the chains 2020 and pawls 2022 at the bottoms of the lower hoists 2000 engage the rims of the powder cases PC of rounds of ammunition R$d$–5 and R$d$–6.

Figure 61:
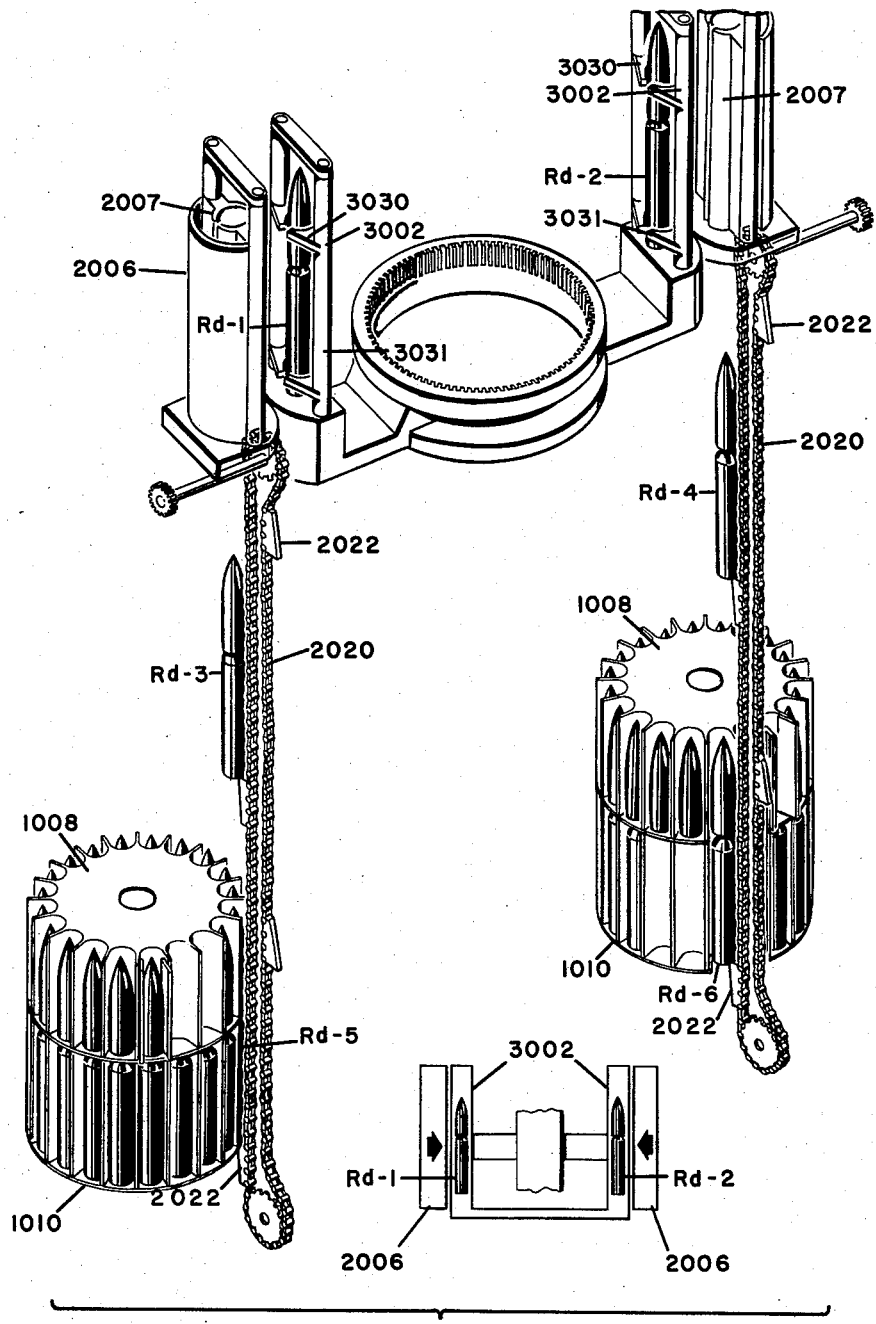
FIG. 61 is an operational sequence diagram for the system illustrating Step 6 in the handling of the rounds of ammunition thereof.

With reference now to FIG. 61 as rounds of ammunition R$d$–1 and R$d$–2 seat on the transfer tube pawls (not shown), the weight of each round of ammunition actuates a switch. Acting independently of one another, these switches trigger transfer mechanisms of the transfer stations, and the following sequence takes place: (1) the ejector plates 3030 and 3031 of the carrier tube 3002 open; (2) the shutters 2007 of the transfer tube 2006 eject; (3) the ejector plates 3030 and 3031 of the carrier tube 3002 close; and (4) the shutters 2007 of the transfer tube 2006 retract.

This sequence of operation moves rounds of ammunition R$d$–1 and R$d$–2 from the transfer tubes 2006 laterally into the carrier tubes 3002, as may best be seen by comparing the inset diagrams of FIGS. 60 and 61.

Figure 62:
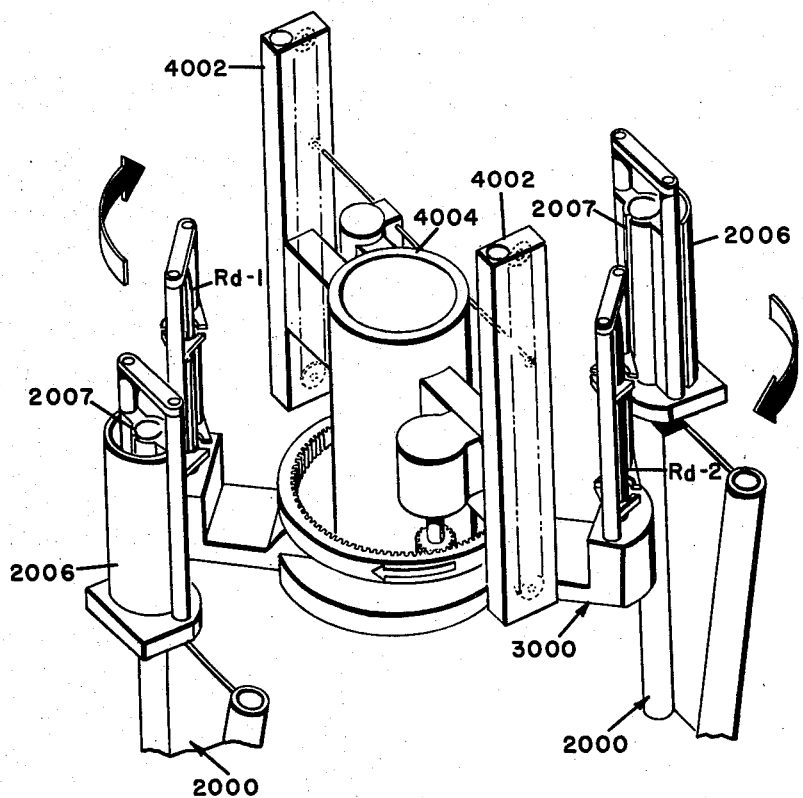
FIG. 62 is an operational sequence diagram for the system illustrating Step 7 in the handling of the rounds of ammunition thereof.

In FIG. 62, with rounds of ammunition R$d$–1 and R$d$–2 securely locked in its carrier tubes 3002, the ammunition carrier 3000 unlatches from the lower hoists 2000 and transfer tubes 2006 (fixed within the ship structure), and rotates, as shown by the arrows, to the upper hoist tubes 4002, which are mounted on the center column 4004 and rotate with the gun mount 6000 in train. The center column 4004, as previously mentioned, is suspended from the underside of the base ring, which rotates in train.

Regardless of the position of the gun mount 6000 in train, the ammunition carrier 3000 always turns through shortest possible angle of rotation to reach the upper hoist tubes 4002. As the ammunition carrier 3000 rotates to the upper hoist tubes 4002, the lower hoists 2000 begin another cycle to raise rounds of ammunition upwardly to the transfer tubes 2006.

Figure 63:
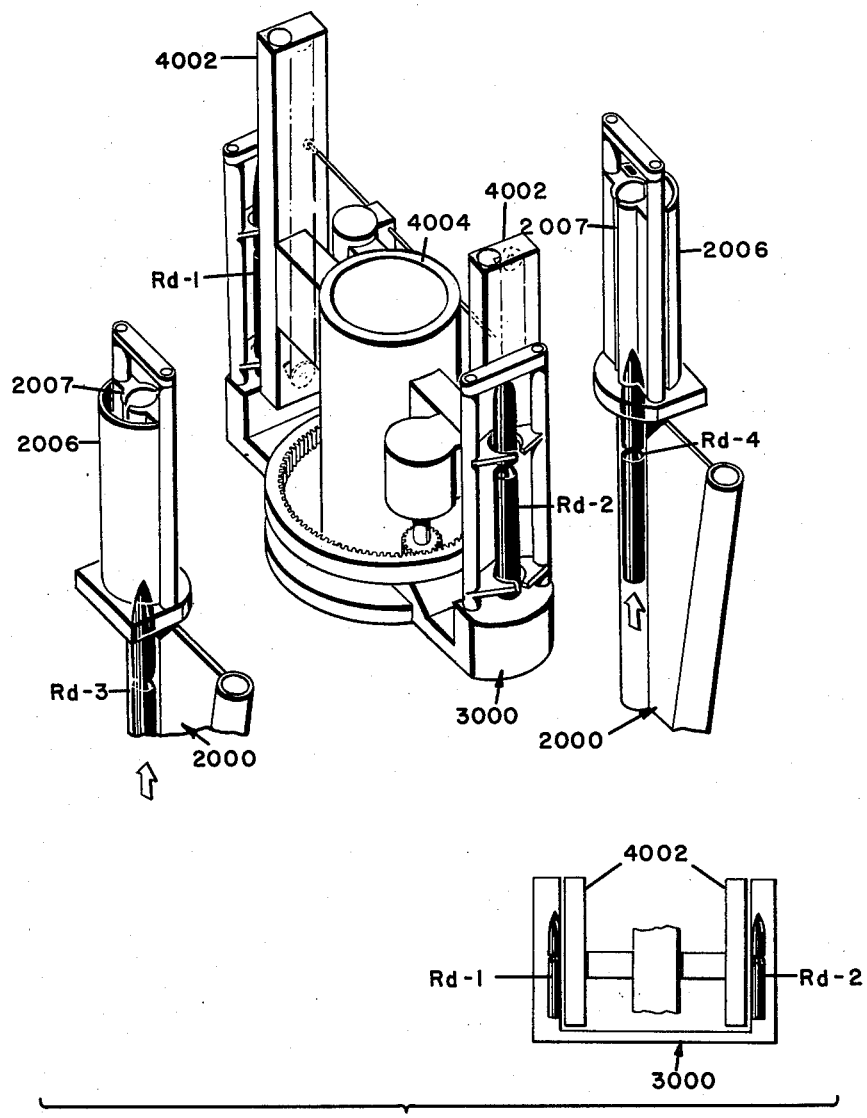
FIG. 63 is an operational sequence diagram for the system illustrating Step 8 in the handling of the rounds of ammunition thereof.

Referring now to FIG. 63, when the ammunition carrier 3000 latches to the upper hoist tubes 4002 with rounds of ammunition R$d$–1 and R$d$–2, the upper hoist shutters (not shown) open. Meanwhile, the lower hoists 2000 lift rounds of ammunition R$d$–3 and R$d$–4 into the transfer station tubes 2006.

As rounds of ammunition R$d$–3 and R$d$–4 continue movement into the transfer tubes 2006, as illustrated in FIG. 64, the carrier ejector plates 3030 and 3031 of carrier 3000 eject rounds of ammunition R$d$–1 and R$d$–2 laterally onto the slotted support shelves (not shown) in the opposed upper ammunition hoist tubes 4002, as best observed by comparing the inset diagrams of FIGS. 63 and 64.

Figure 65:
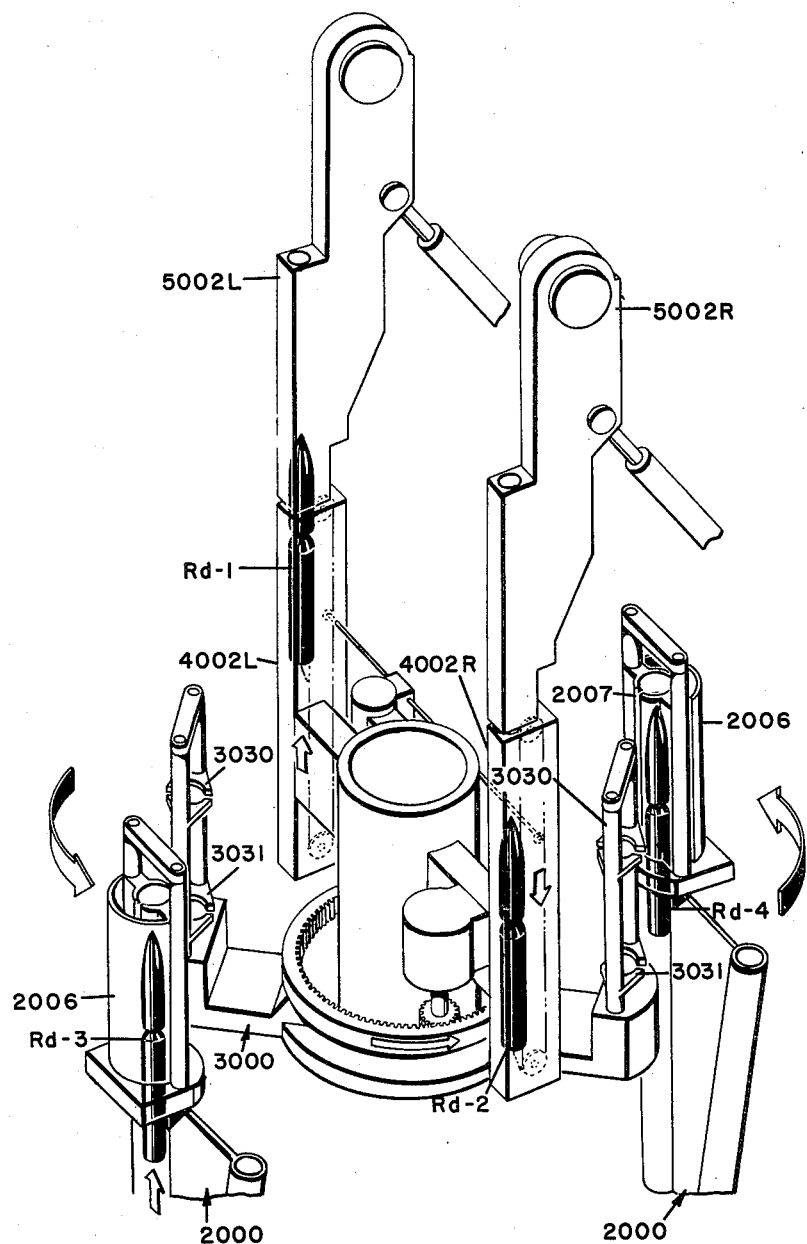
FIG. 65 is an operational sequence diagram for the system illustrating Step 10 in the handling of the rounds of ammunition thereof.

When the upper hoist shutters close and the carrier ejector plates 3030 and 3031 begin the retract stroke as illustrated in connection with FIG. 65, the chain pawl for the left upper hoist 4002L starts raising the round of ammunition R$d$–1 upwardly into the left cradle 5002L, and the chain pawl for the right upper hoist tube 4002R moves downwardly (arrow) from the right cradle 5002R toward the start-of-hoist position below round of ammunition R$d$–2, retracting in its housing as it moves past the round.

As soon as carrier ejector plate 3030 and 3031 are fully retracted, the ammunition carrier 3000 unlatches from the upper hoist tubes 4002 and starts rotating back to the lower hoists 2000 and transfer station tubes 2006 to pick up rounds of ammunition R$d$–3 and R$d$–4.

Figure 66:
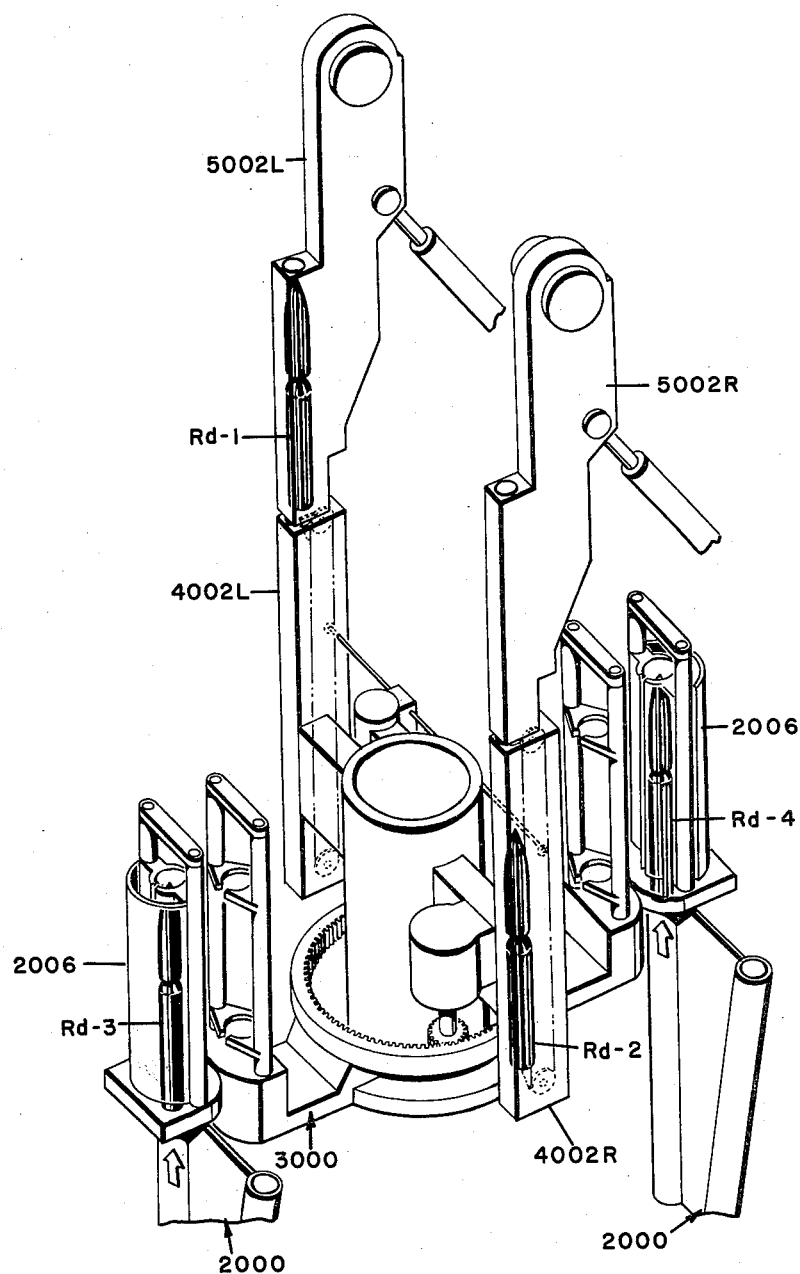
FIG. 66 is an operational sequence diagram for the system illustrating Step 11 in the handling of the rounds of ammunition thereof.

As illustrated in FIG. 66, when the upper hoist cycle ends, round of ammunition R$d$–1 is securely locked in the left cradle 5002L by a buffer yoke and base pawl (not shown), the pawl of right upper hoist tube 4002R is at the start-of-hoist position and extended in readiness to raise the round of ammunition R$d$–2 into the right cradle 5002R, and the ammunition carrier 3000 is latched to the lower hoists 2000 and the transfer station with rounds of ammunition R$d$–3 and R$d$–4 almost seated in the transfer tubes 2006. When rounds of ammunition R$d$–3 and R$d$–4 are seated in the transfer tubes 2006, they will be ejected laterally into the carrier tubes 3002.

Figure 67:
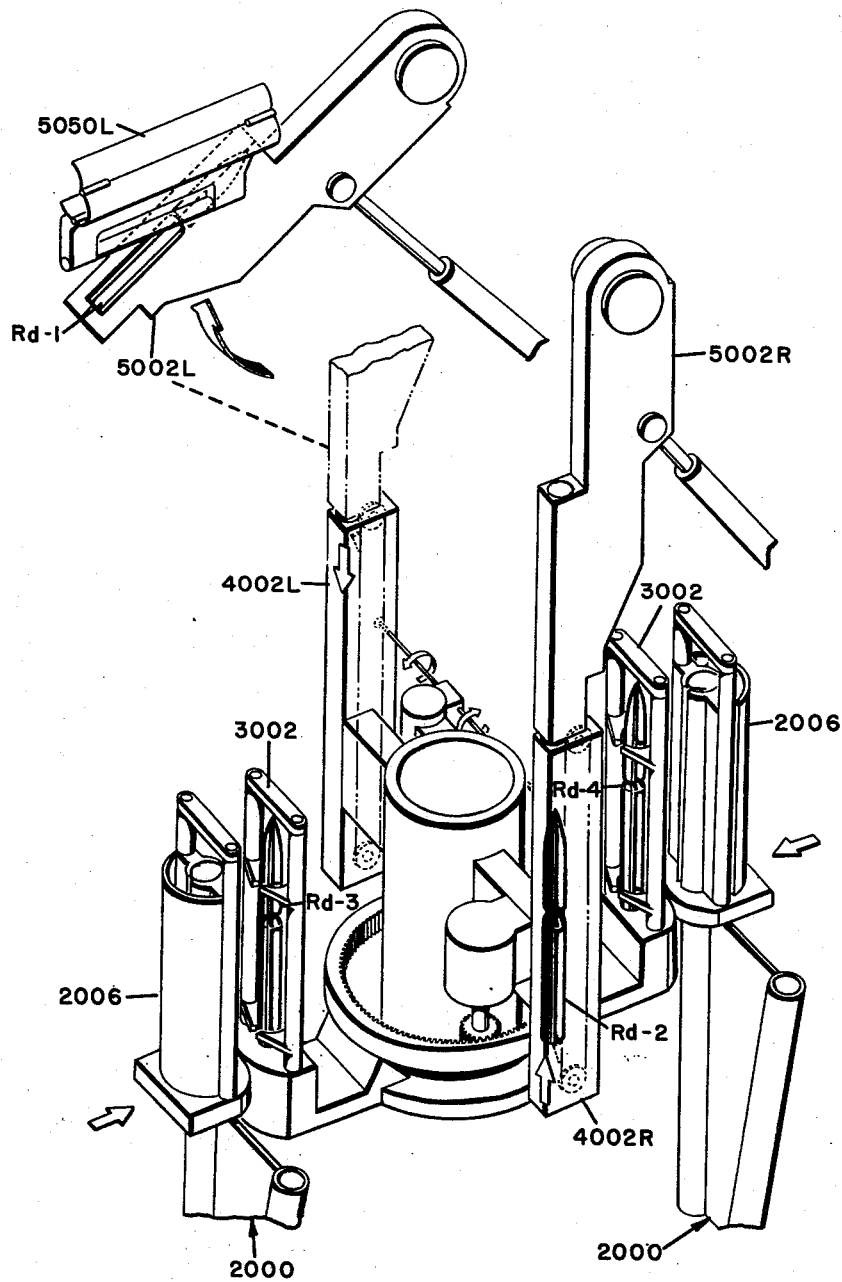
FIG. 67 is an operational sequence diagram for the system illustrating Step 12 in the handling of the rounds of ammunition thereof.

Now referring to FIG. 67, as rounds of ammunition R$d$–3 and R$d$–4 are ejected from the transfer tubes 2006 laterally into the carrier tubes 3002, the right upper hoist tube 4002R begins raising the round of ammunition R$d$–2 into the right cradle 5002R, and left upper hoist tube 4002L begins lowering its chain pawl to the start-of-hoist position.

Meanwhile, the left cradle 5002L unlatches from the left upper hoist tube 4002L and swings the round of ammunition R$d$–1 upwardly toward the slide latch position opposite a raised left transfer tray 5050L.

Figure 68:
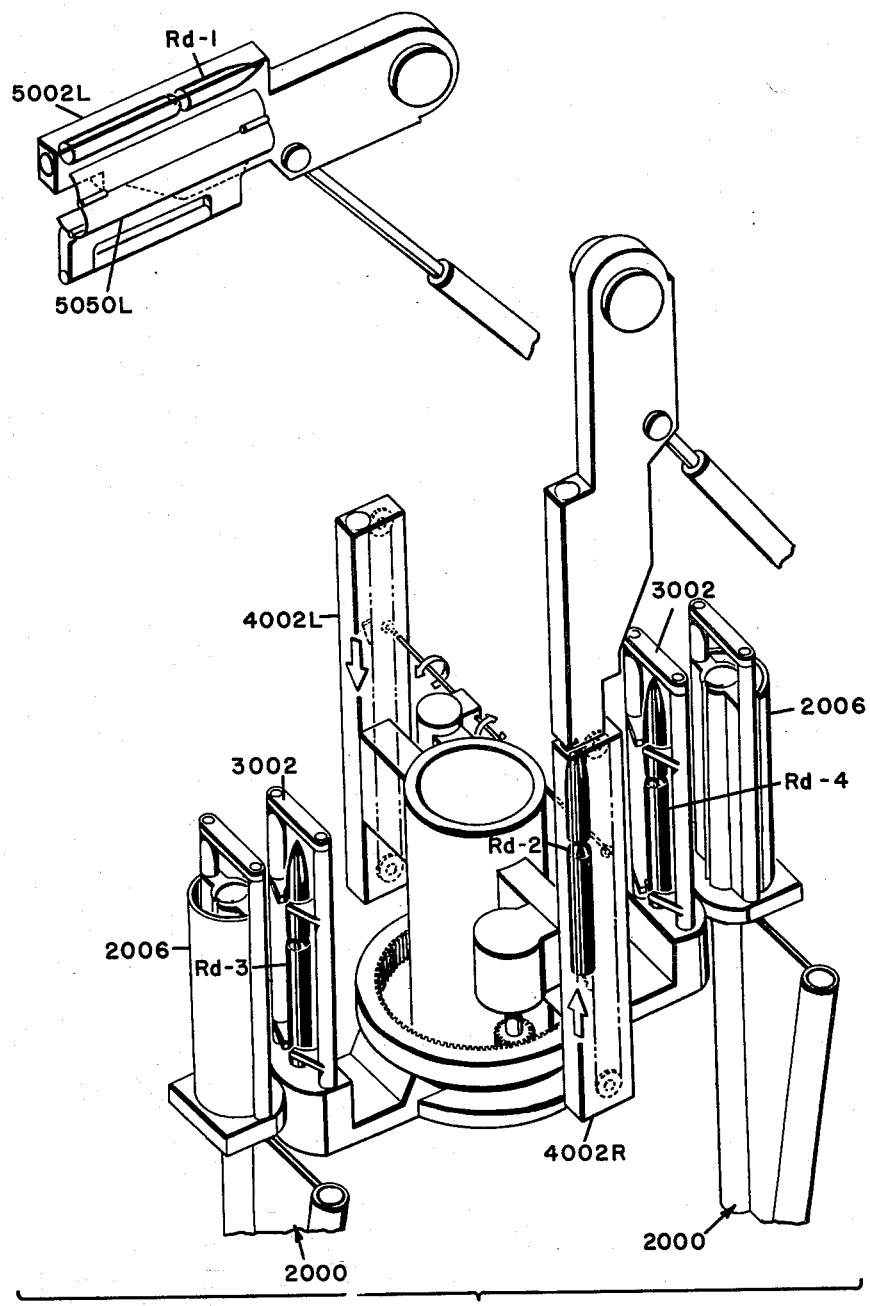
FIG. 68 is an operational sequence diagram for the system illustrating Step 13 in the handling of the rounds of ammunition thereof.

The left cradle 5002L now latches to the slide opposite the raised left transfer tray 5050L with the round of ammunition R$d$–1 as the lower hoist transfer tube ejectors retract, leaving rounds of ammunition R$d$–3 and R$d$–4 in the carrier tubes 3002, as shown in FIG. 68. In the right upper hoist tube 4002R, the upward movement of the round of ammunition R$d$–2 continues.

Figure 69:
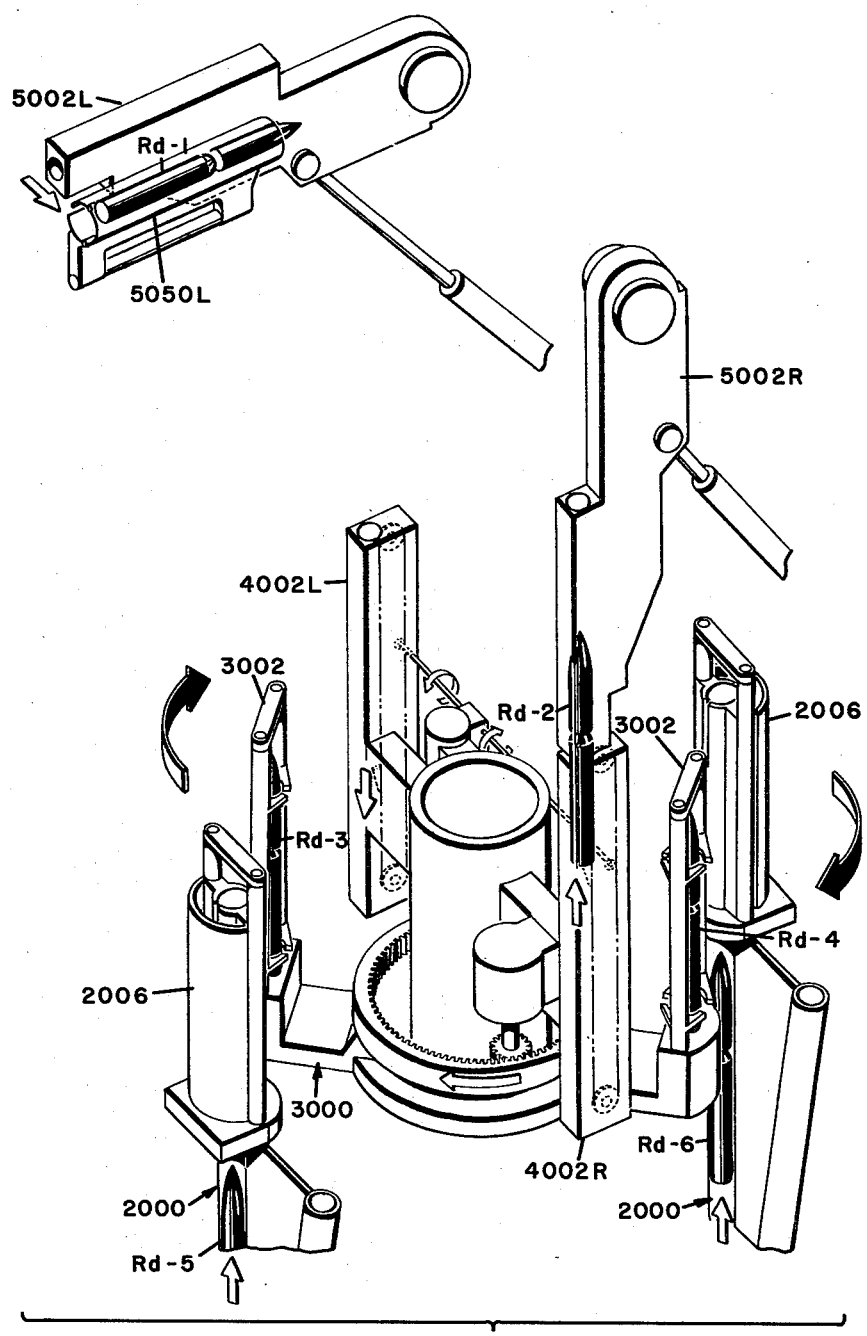
FIG. 69 is an operational sequence diagram for the system illustrating Step 14 in the handling of the rounds of ammunition thereof.

The ejector mechanism of the left cradle 5002L now extends and ejects the round of ammunition R$d$–1 into the left transfer tray 5050L where shutters and clamps close over the round of ammunition R$d$–1 and hold it securely in place for the fuze setting operation to follow, as best illustrated in FIG. 69.

At the same time, the ammunition carrier 3000 begins the rotational cycle from the lower hoists 2000 to the upper hoist tubes 4002 with rounds of ammunition R$d$–3 and R$d$–4, and the right upper hoist tube 4002R nears the end of the raise cycle of the round of ammunition R$d$–2 to the right cradle 5002R. The lower hoists 2000, in the meantime, begin raising rounds of ammunition R$d$–5 and R$d$–6 into the transfer stations 2006.

Figure 70:
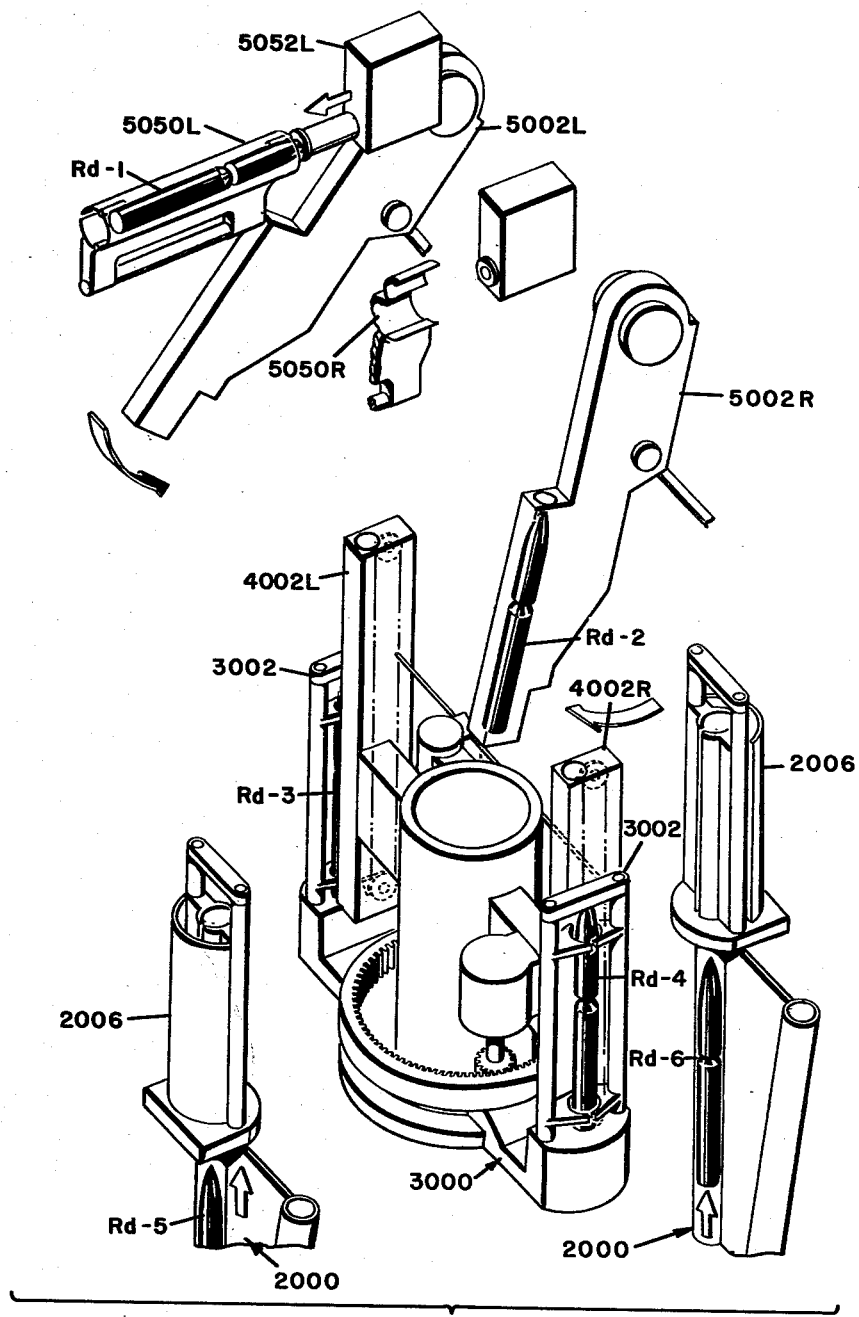
FIG. 70 is an operational sequence diagram for the system illustrating Step 15 in the handling of the rounds of ammunition thereof.

A left fuze setter 5052L, as shown in FIG. 70 now extends to set the fuze of round of ammunition R$d$–1 in the left transfer tray 5050L as the left cradle 5002L unlatches from the slide and returns to the left upper hoist tube 4002L for round of ammunition R$d$–3.

Simultaneously, the right cradle 5002R swings upwardly toward the slide latch position opposite the raised right transfer tray 5050R with the round of ammunition R$d$–2, while the ammunition carrier 3000 latches to the upper hoist tubes 4002R and 4002L. The upper hoist shutters now open to receive the rounds of ammunition R$d$–3 and R$d$4 when they are ejected laterally from the opposed carrier tubes 3002. Rounds of ammunition R$d$–5 and R$d$–6, in the meantime, enter transfer tubes 2006 from the lower hoists 2000.

Figure 71:
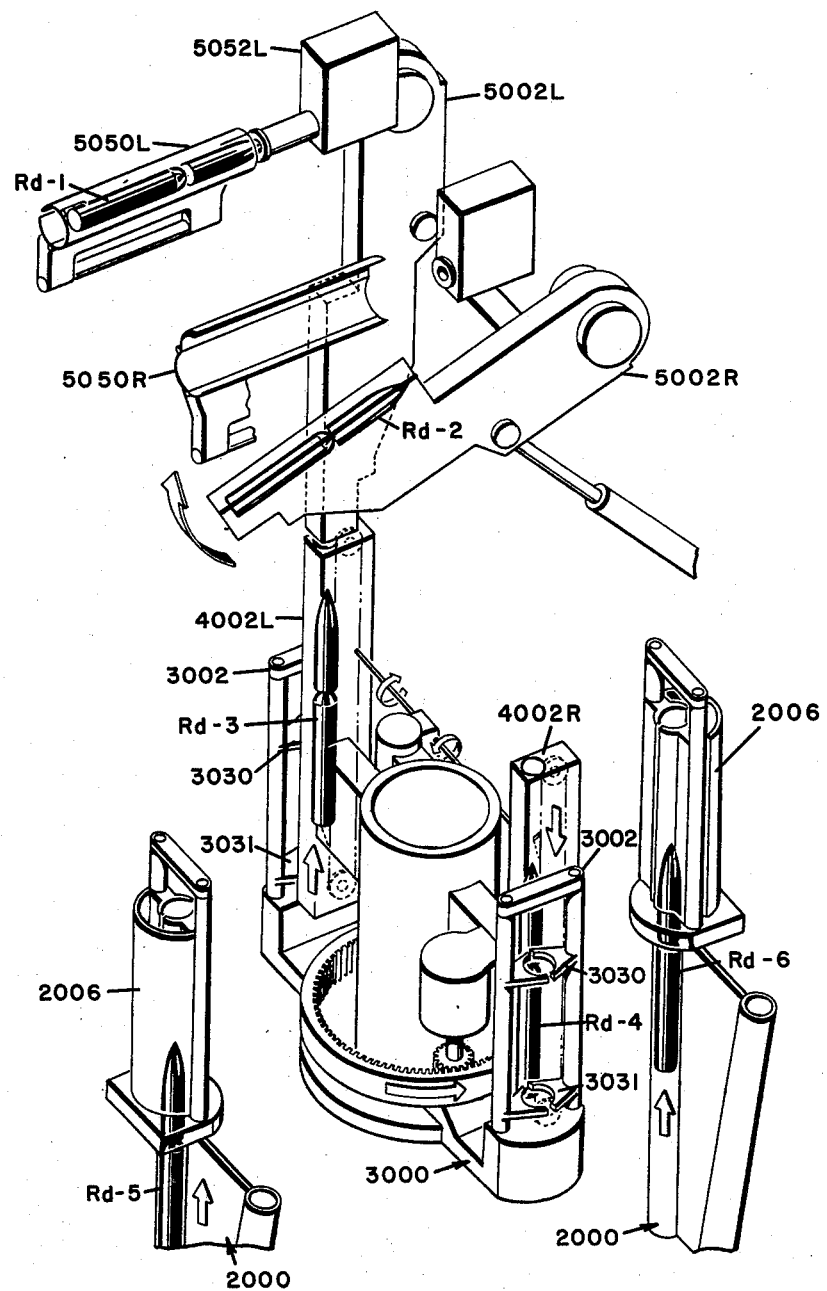
FIG. 71 is an operational sequence diagram for the system illustrating Step 16 in the handling of the rounds of ammunition thereof.

Referring now to FIG. 71, as the left fuze setter 5052L finishes setting the fuze of the round of ammunition R$d$–1 in the left transfer tray 5050L, the left cradle 5002L latches to the left upper hoist tube 4002L, and the right cradle 5002R approaches the slide latch opposite the right transfer tray 5050R with the round of ammunition R$d$–2.

The shutters of the upper hoist tubes 4002L and 4002R now close over the rounds of ammunition R$d$–3 and R$d$–4 as the carrier ejector plates 3030 and 3031 retract into the carrier tubes 3002. The left upper hoist tube 4002L then raises the round of ammunition R$d$–3 into the left cradle 5002L, while the pawl of the right upper hoist tube 4002R descends to start-of-hoist position below the round of ammunition R$d$–4.

The ammunition carrier 3000 then unlatches from the upper hoist tubes 4002R and 4002L to begin the rotational cycle back to the lower hoists 2000. Rounds of ammunition R$d$–5 and R$d$–6 continue upwardly into the transfer tubes 2006.

Figure 72:
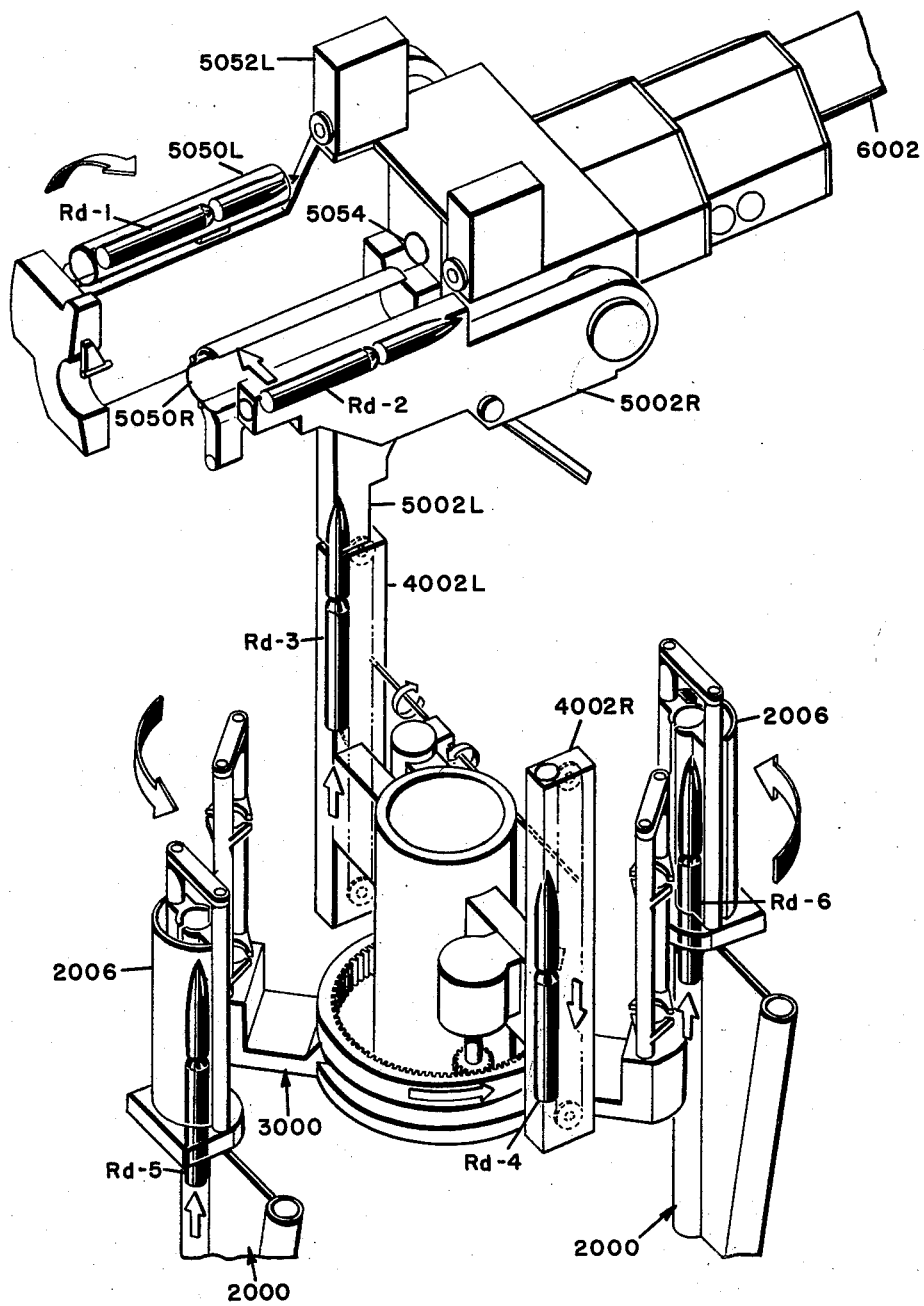
FIG. 72 is an operational sequence diagram for the system illustrating Step 17 in the handling of the rounds of ammunition thereof.

When the projectile fuze of the round of ammunition R$d$–1 is set, the pot of the left fuze setter 5052L then retracts into its housing, and the left transfer tray 5050L starts lowering the round of ammunition R$d$–1 into the ramming position behind an open breech 5054, as depicted in FIG. 72.

At the same time, the right cradle 5002R is latched to the slide and ejecting the round of ammunition R$d$–2 into the right transfer tray, while the round of ammunition R$d$–3 is being elevated into the left cradle 5002L by the ascending pawl of the left upper hoist tube 4002L.

The right pawl of the right upper hoist tube 4002R is, in the meantime, descending to engage the round of ammunition R*d*–4 for the next upper hoist cycle.

Meanwhile, the ammunition carrier 3000 continues its rotational cycle back to the lower hoists 2000 and transfer stations 2006 where it will receive rounds of ammunition R*d*–5 and R*d*–6, which are still being raised into the stations by the lower hoists 2000.

Figure 73:
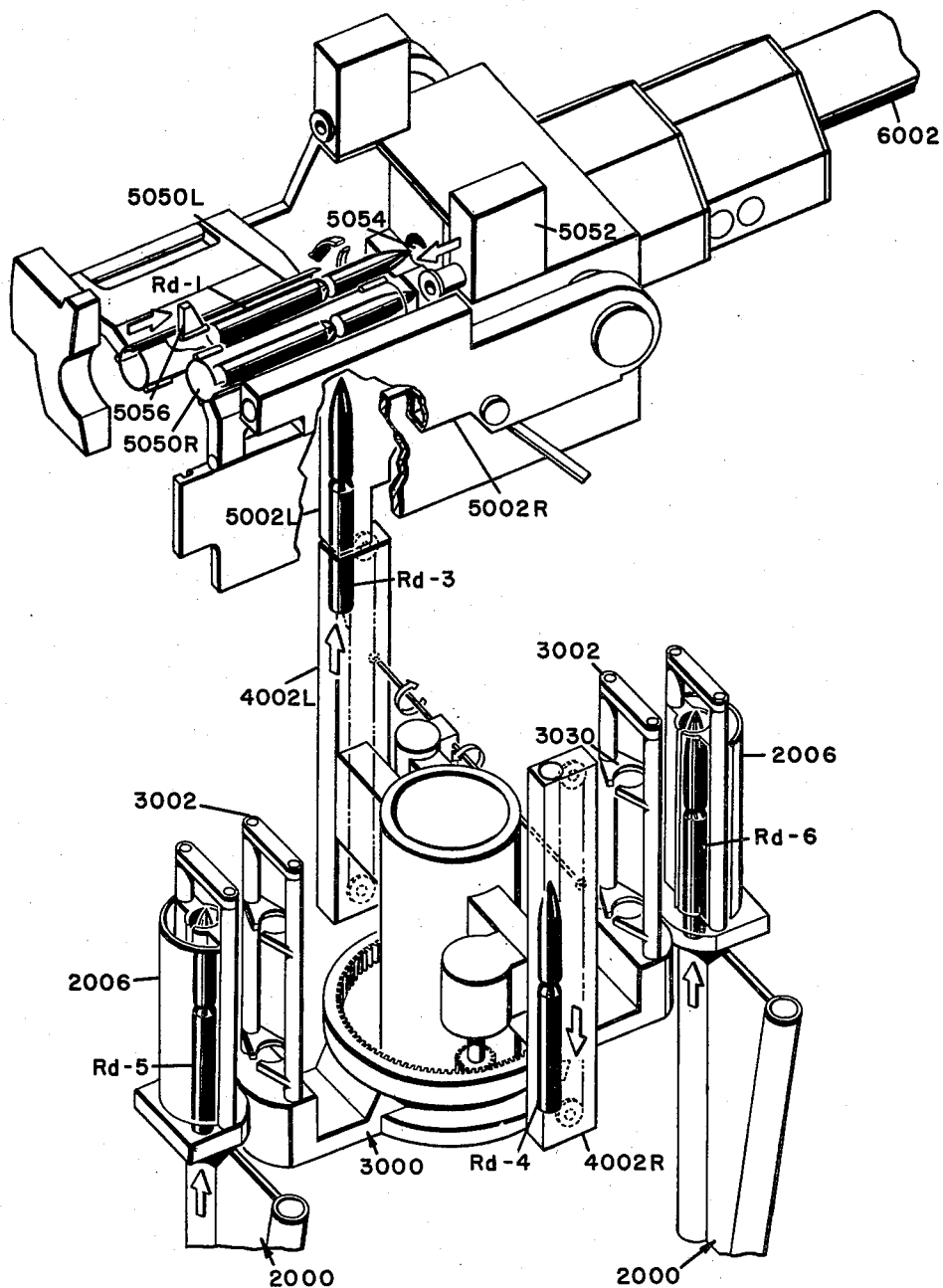
FIG. 73 is an operational sequence diagram for the system illustrating Step 18 in the handling of the rounds of ammunition thereof.

Just before the left transfer tray 5050L reaches the ramming position opposite the breech 5054 with the round of ammunition R*d*–1, its projectile clamps open to allow forward movement of the round of ammunition R*d*–1 out of the transfer tray 5050L into the breech 5054 of the gun, as shown in FIG. 73.

A rammer spade 5056 then contacts the base rim of the powder case PC and begins ramming the round of ammunition R*d*–1 out of the transfer tray 5050L into the breech 5054 of the gun 6002.

Concurrently, the clamps and shutters of the right transfer tray 5050R close and the pot of the right fuze setter 5052 extends to set the projectile fuze of the round of ammunition R*d*–2 in the raised right transfer tray 5050L.

As these events occur, the right cradle 5002R retracts its ejector mechanism and unlatches from the slide, and the round of ammunition R*d*–3 nears the end of its upward movement into the left cradle 5002L, while the pawl of the right upper hoist tube 4002R approaches the start-of-hoist position below round of ammunition R*d*–4, and rounds of ammunition R*d*–5 and R*d*–6 continue their upward movement into the transfer stations 2006 as the ammunition carrier 3000 approaches the stations on the return cycle from the upper hoist tubes 4002.

Figure 74:
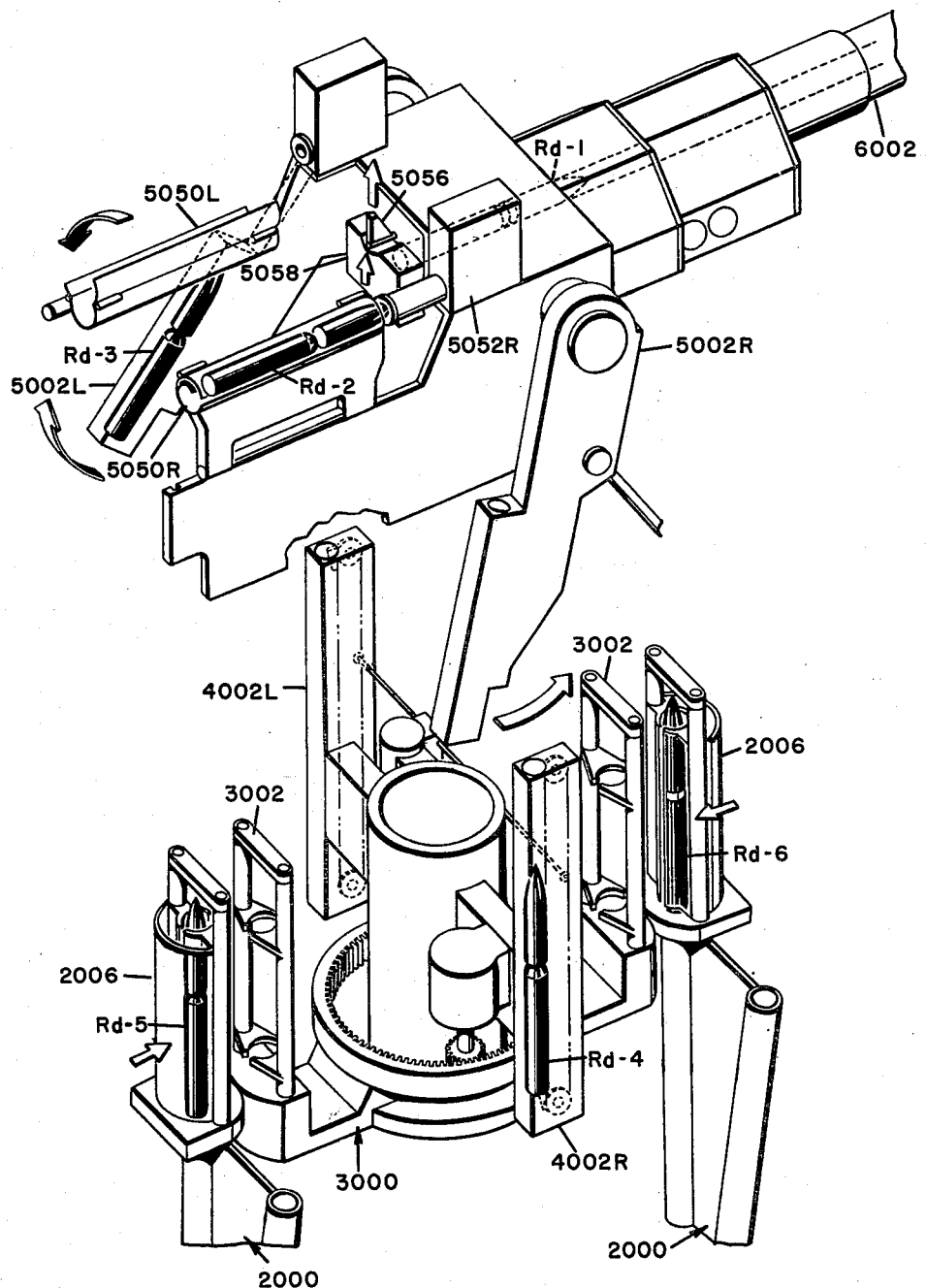
FIG. 74 is an operational sequence diagram for the system illustrating Step 19 in the handling of the rounds of ammunition thereof.

As soon as the rammer spade 5056 clears the forward end of the left transfer tray 5050L during the ram stroke as illustrated in FIG. 74, the left transfer tray 5050L and an empty case tray 5060 (not shown) begin upward movements to raised positions, and the shutters of the transfer tray 5050L open to receive round of ammunition R*d*–3, which is being raised to the slide latch position opposite the tray by the left cradle 5002L.

Figure 75:
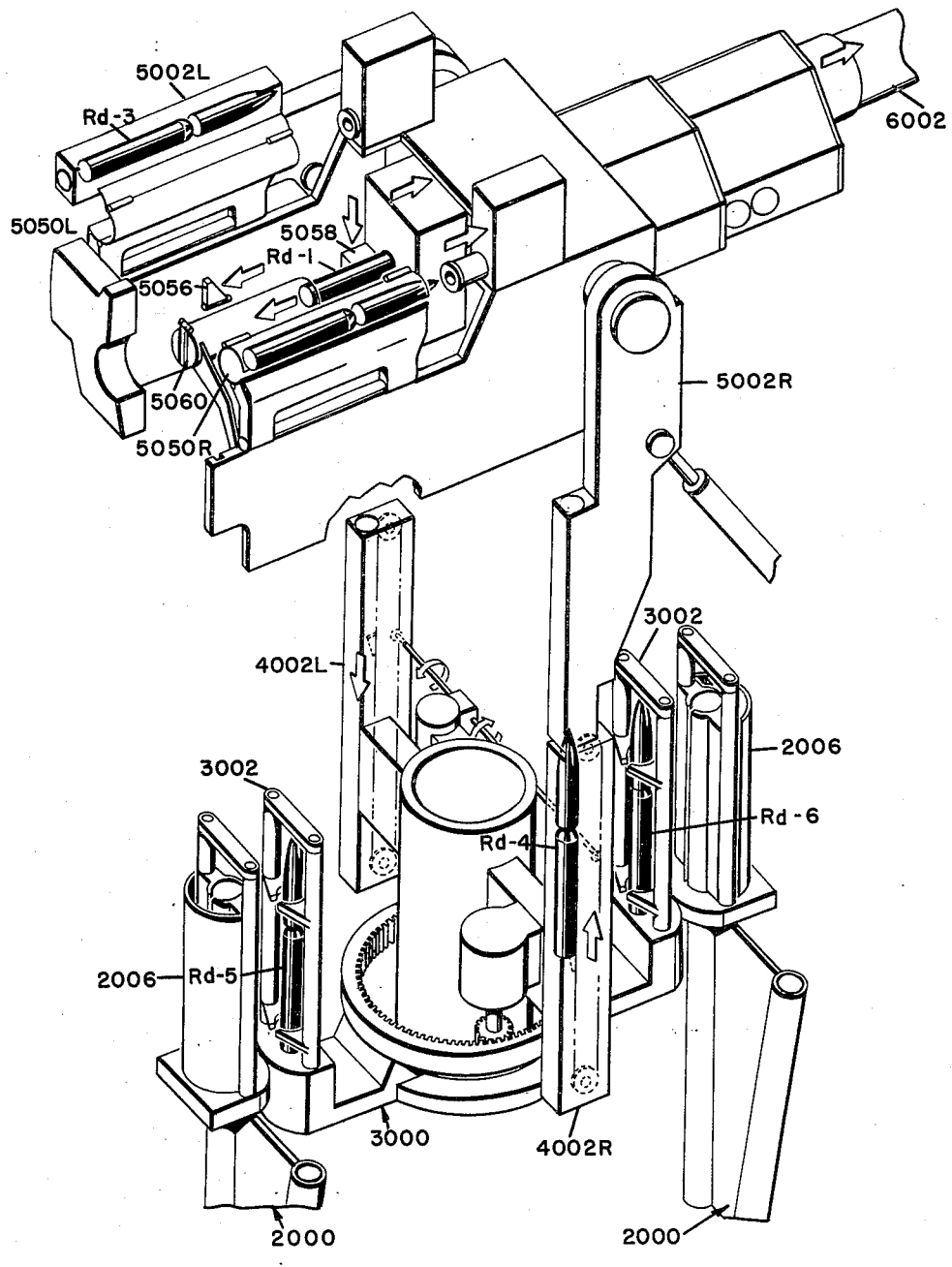
FIG. 75 is an operational sequence diagram for the system illustrating Step 20 in the handling of the rounds of ammunition thereof.

In FIG. 74, the round of ammunition R*d*–1 is shown loaded in the barrel of the gun 6002. As a breechblock 5058 moves up to close the breech of the gun 6002, it also raises the rammer spade 5056 to a latched position for a retract stroke. Spade 5056 must be held above the ramming path during its retract stroke in order to avoid hitting the empty case tray 5060, which is then positioned directly behind the breech of the gun 6002 to catch the expended powder case PC, as illustrated in FIG 75. When the left transfer tray 5050L reaches the upright or "firing" position, the firing circuit closes and gun 6002 fires.

The right fuze setter 5052R continues to set the fuze of round of ammunition R*d*–2 in the raised right transfer tray 5050R as the right cradle 5002R nears the end of its movement back to the right upper hoist tube 4002R where the pawl is positioned to raise the round of ammunition R*d*–4 into the cradle. Rounds of ammunition R*d*–5 and R*d*–6, in the meanwhile, are being ejected from the transfer stations 2006 laterally into the carrier tubes 3002.

As illustrated in FIG. 75, the gun 6002 has now fired round of ammunition R*d*–1 and is one-third of the way back to battery in counterrecoil. Breechblock 5058 is open, and the empty powder case tray 5060, which is hydraulically interlocked with both transfer trays 5050R and 5050L and positioned behind the breech 5054 whenever both trays are in raised (firing) position, is catching the expended powder case PC of round of ammunition R*d*–1.

When the counterrecoil movement begins, expended powder case PC of round of ammunition R*d*–1 is thrown back into the tray 5060 by empty case ejector 5062 (not shown) on the rear face of breechblock 5058.

As gun 6002 returns to battery, the rammer spade 5056 moves rearwardly to its start-of-ram position in preparation for the next ram stroke, while the pot of the right fuze setter 5052R, having set the projectile fuze of the round of ammunition R*d*–2, retracts into its housing.

The left cradle 5002L then latches to the slide and is about to eject the round of ammunition R*d*–3 into left transfer tray 5050L, when the right cradle 5002R receives the round of ammunition R*d*–4 from the right upper hoist tube 4002R, and transfer stations 2006 have ejected rounds of ammunition R*d*–5 and R*d*–6 laterally into carrier tubes 3002.

Figure 76:
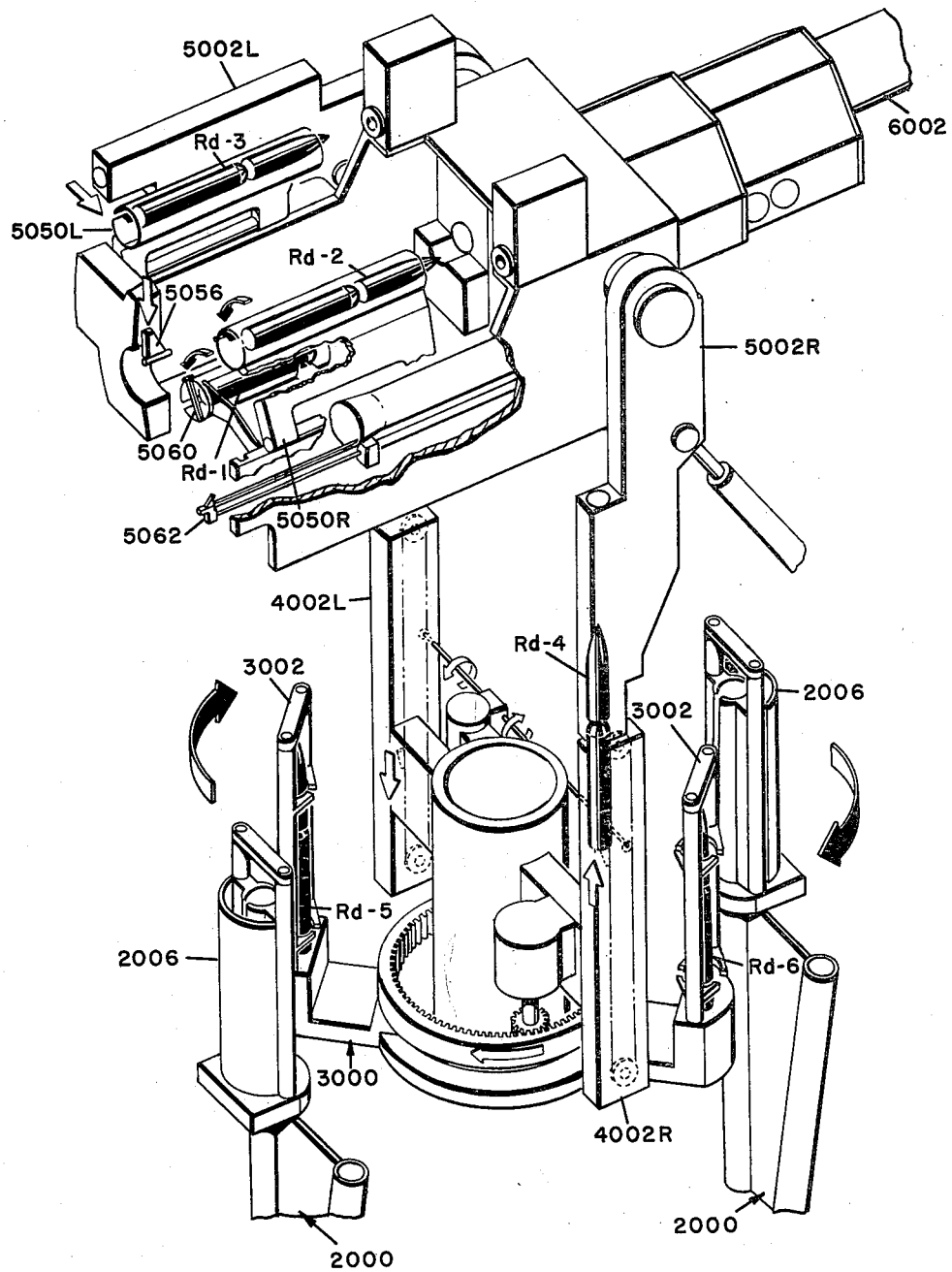
FIG. 76 is an operational sequence diagram for the system illustrating Step 21 in the handling of the rounds of ammunition thereof.

When the rammer spade 5056 reaches the end of its retract stroke, it unlatches from its housing and drops down into position for next ram stroke, as shown in FIG. 76. The gun 6002 is then within 3.8 inches of battery in counterrecoil, and the right transfer tray 5050R starts lowering the round of ammunition R*d*–2 into the ramming position. This action causes the empty case tray 5060 to move downwardly into the empty case ejector 5062 with the powder case PC from round of ammunition R*d*–1.

Meanwhile, the ejector of the left cradle 5002L moves the round of ammunition R*d*–3 into the raised left transfer tray 5050L, and its clamps close about the round of ammunition R*d*–3. The left upper hoist pawl then descends through its empty upper hoist tube 4002L to start-of-hoist position, while the chain of the right upper hoist tube 4002R continues to raise the round of ammunition R*d*–4 into the right cradle 5002R, and the ammunition carrier 3000 begins to rotate from the lower hoists 2000 and transfer stations 2006 to the upper hoist tubes 4002R and 4002L with rounds of ammunition R*d*–5 and R*d*–6.

Figure 77:
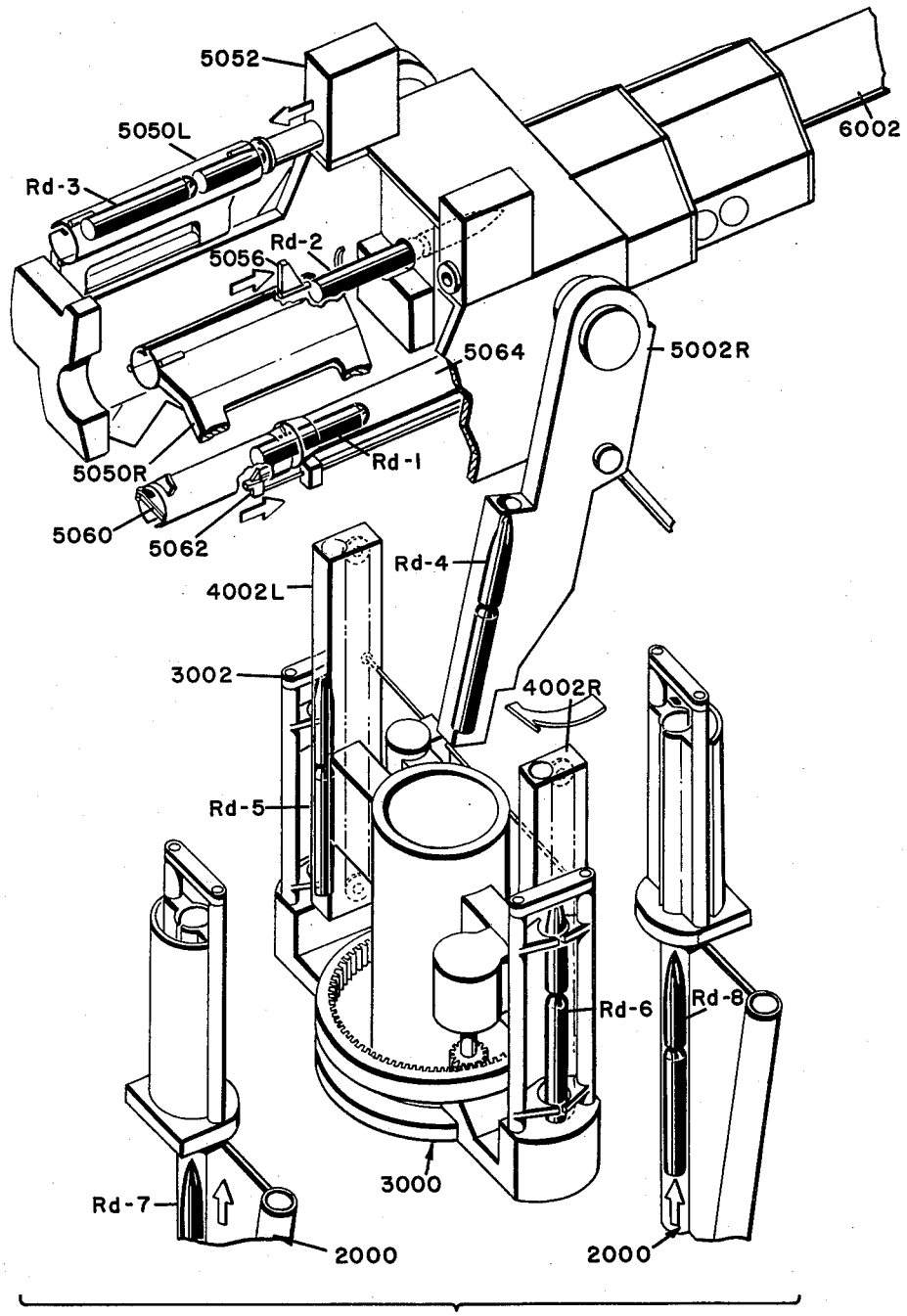
FIG. 77 is an operational sequence diagram for the system illustrating Step 22 in the handling of the rounds of ammunition thereof.

Approximately 0.7 second after the round of ammunition R*d*–1 is fired, with the gun 6002 still one-half inch out of battery in counterrecoil, the right transfer tray 5050R opens its projectile clamps and lays the round of ammunition R*d*–2 into ramming position behind the breech 5054, and the empty case tray 5060 lays the expended powder case PC of round of ammunition R*d*–1 in front of the ejector pawl of empty case ejector 5062, as illustrated in FIG. 77.

The rammer spade 5056 and the pawl of empty case ejector 5062 then move forward simultaneously, ramming the round of ammunition R*d*–2 into the gun 6002 and ejecting empty powder case PC of the round of ammunition R*d*–1 into an ejection chute 5064.

FIG. 77 shows the gun 6002 back in battery with the ramming and ejection strokes about two-thirds completed. The pot of left fuze setter 5052L is extended, setting the projectile fuze of round of ammunition R*d*–3 in the left transfer tray 5050L, and the left cradle 5002L is returning to the left upper hoist tube 4002L as the right cradle 5002R swings the round of ammunition R*d*–4 up to the slide from right upper hoist tube 4002R.

The upper hoist shutters (not shown) are opened, and the ammunition carrier 3000 is latched to the upper hoist tubes 4002R and 4002L with rounds of ammunition R*d*–5 and R*d*–6. The rounds of ammunition R*d*–7 and R*d*–8, in the meanwhile, are starting upwardly in the lower hoist tubes 2002.

Figure 78:
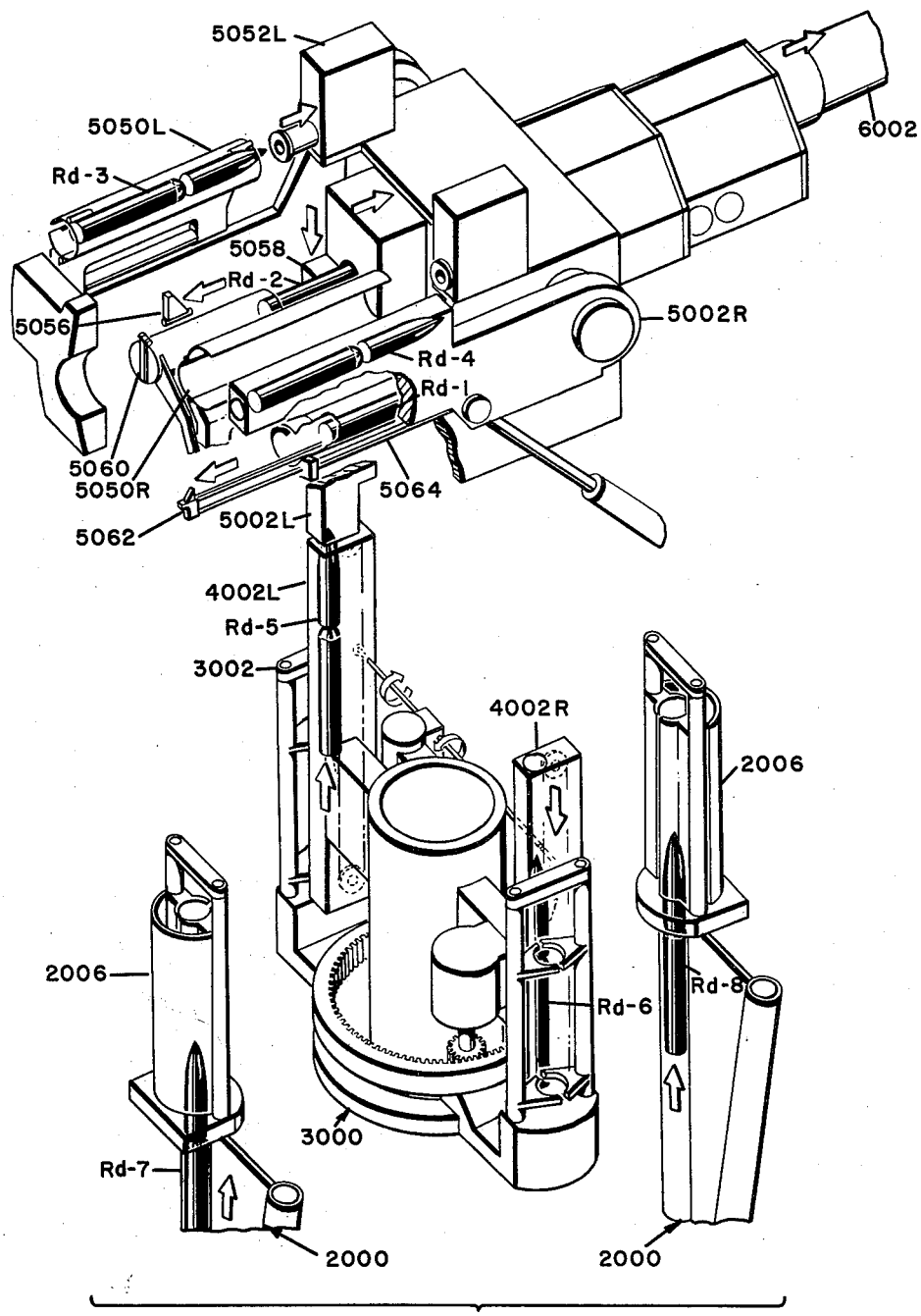
FIG. 78 is an operational sequence diagram for the system illustrating Step 23 in the handling of the rounds of ammunition thereof.

As illustrated in FIG. 78, the gun 6002 has now fired the round of ammunition R*d*–2 (1.45 seconds after firing round of ammunition R*d*–1) and is one-third of way back of battery in counterrecoil. A fixed spring-loaded pawl (not shown) in the aft end of the ejector chute 5064 prevents the empty powder case PC of round of ammunition R*d*–1 from sliding back out of the chute. The action of this pawl is required only at high gun elevations. At low gun elevations, the ejection stroke usually forces the expended powder case PC all the way through the chute and out a door at its front end.

Breechblock 5058 is now down and the empty case extractors of the empty case tray 5060 are pulling the expended powder case PC of the round of ammunition R*d*–2 back into the waiting empty case tray 5060, which returned to its up position when the right transfer tray 5050R returned to its firing position after ramming of the round of ammunition Rd–2.

The rammer spade 5056 and empty case ejector 5062 retract to start-of-ram and start-of-eject positions, respectively, when the pot of left fuze setter 5062 has set the projectile fuze of the round of ammunition Rd–3 in the raised left transfer tray 5050L and is retracted into its housing, and right cradle 5002R is latched to slide with the round of ammunition Rd–4.

In the meantime, the left upper hoist tube 4002L is raising the round of the ammunition Rd–5 into left cradle 5050L, the pawl of right upper hoist tube 4002R is descending to engage round of ammunition Rd–6, and the ammunition carrier 3000 is about to rotate back to the lower hoists 2000 and the transfer stations for rounds of ammunition Rd–7 and Rd–8, which are entering the transfer tubes 2006 from lower hoists 2000.

Figure 79:
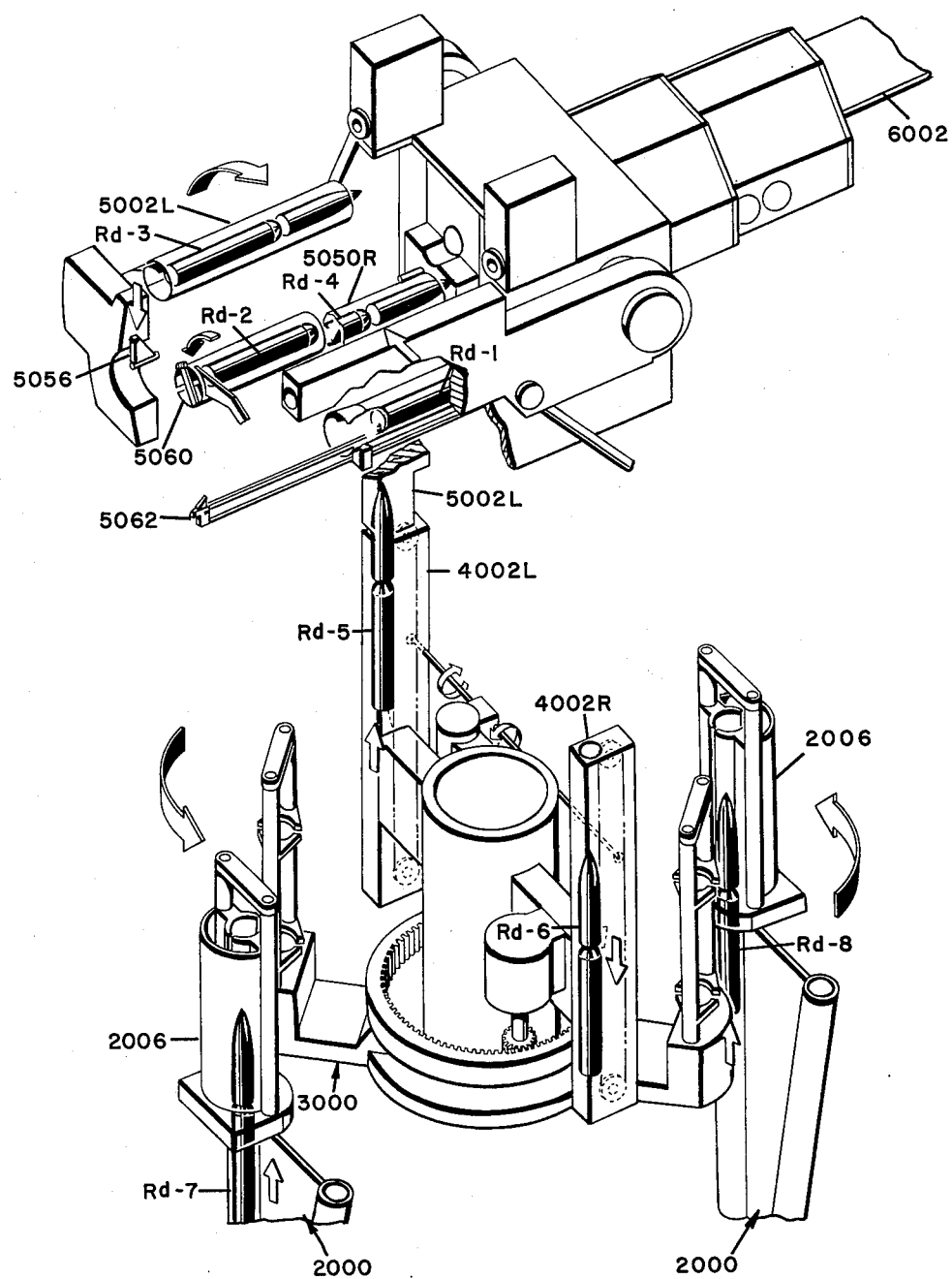
FIG. 79 is an operational sequence diagram for the system illustrating Step 24 in the handling of the rounds of ammunition.

Referring now to FIG. 79, the gun 6002 is now within 3.8 inches of battery in counterrecoil after firing the round of ammunition Rd–2. Also the rammer spade 5056 and the pawl of empty case ejector 5062 are fully retracted, and the left transfer tray 5050L is lowering the round of ammunition Rd–3 into the ramming position.

Empty case tray 5060 then lowers the expended powder case PC of the round of ammunition Rd–2 into the empty case ejector 5062. The right cradle ejector mechanism, in the meantime, has moved the round of ammunition Rd–4 into the right transfer tray 5050R.

Round of ammunition Rd–5 is then raised into the left cradle 5002L by the left upper hoist tube 4000L. The pawl of the upper hoist tube 4002R then descends to engage the round of ammunition Rd–6 and the ammunition carrier 3000 rotates to the lower hoists 2000 and transfer stations 2006 to pick up rounds of ammunition Rd–7 and Rd–8.

*Strikedown Procedure*

To strike down rounds of ammunition from the ammunition carrier 3000 through the lower hoist tubes, the lower ammunition hoist is placed in "Local" control by means of the hoist operation selector lever 2093, shown in FIGS. 46 and 47. The hoist control local hand crank 2114 is then released by lifting and turning its locking pin. The lower ammunition hoist 2000 may then be operated by turning the hand crank 2114. The procedure for operating both the lower hoists 2000C and 2000D in local control is identical and each hoist is provided with its own operating controls as related above.

The return chute cover 2028 is now opened, and strike down loading tray 2029 is raised from the position shown in FIG. 13 to that depicted in FIG. 53.

The next step in the strike down of a round of ammunition is to open the transfer station unloading doors, shown in FIG. 52, and release ejector flaps confining the projectile PJ. The projectile PJ, of the round of ammunition, is then removed, and is placed in the strikedown loading tray 2029 as illustrated in FIG. 54, with the nose of the projectile PJ toward the return chute 2005.

In order to release the interlock switches associated with the transfer tube, it is necessary to also remove the powder case PC, of the round of ammunition, and temporarily place it on deck. For the same reason, the transfer tube ejector flaps and unloading door must be closed, the hoist unloading station unloaded, and the hoist unloading door closed. If this is not done, local control of the system will be inoperative.

By means of the local control hand crank 2114, the hoist chain 2020 is then moved until one of the chain anti-chucker pawls 2026 is at a predetermined marked position within the return chute 2005.

As shown in FIG. 54, the eye of a looped cable 2019 is slipped over the nose of projectile PJ. Hand grip 2017 is provided for grasping the cable 2019 and lifting the projectile PJ thereby. As the base of the projectile PJ raises, the hand grip 2017 is slid baseward so that the nose of the projectile PJ points downwardly and is guided into the return chute 2005. When the projectile PJ rests inverted against the anti-chucker pawl 2026, the cable 2019 may be still further lowered and with a slight twist disengaged from the nose of the projectile PJ and removed.

The powder case PC is now stacked inverted upon the base of the projectile PJ, and the round of ammunition is cranked down the return tube chute 2005 until the control interlocks open to signify that a round of ammunition has arrived at the unloading station of the loader 1000 for removal to storage areas.

Obviously many other modifications and variations of the present invention are possible in the light of the above teachings. It is, therefore, to be understood that within the scope of the appended claims, the invention may be practiced otherwise than as specifically described.

What is claimed is:

1. An ammunition handling system for an ordnance weapon, comprising in combination, a gun mount supporting the weapon, means for supplying rounds of ammunition to said weapon including a first hoist having a stationary casing with a passage therein through which rounds of ammunition are transported by said hoist, a laterally rotatable carrier above said first hoist having a chamber for receiving a round of ammunition laterally from said first hoist, a second hoist adjacent said carrier having a passage for laterally receiving a round of ammunition, said second hoist being rotatable to different positions, means for selectively moving said carrier to bring said chamber into substantially radial alignment with either of said passages.

2. An ammunition handling system for a gun, comprising in combination, a loader for storing rounds of ammunition, means for supplying rounds of ammunition to said gun including a lower hoist having a stationary casing with a passage therein through which a round of ammunition is moved by said hoist from said loader, a laterally bi-directionally rotatable carrier above said hoist having a chamber therein for laterally receiving said round of ammunition from said first hoist, an upper hoist adjacent said carrier having a passage for laterally receiving a round of ammunition, said upper hoist being rotatable to different positions, and means for selectively moving said carrier to bring said chamber into radial alignment with either of said passages in the shortest period of time.

3. An ammunition handling system for an ordnance weapon, comprising, means for supplying rounds of ammunition to said weapon including a first hoist having a stationary casing with a passage therein through which a round of ammunition is moved, a laterally rotatable carrier above said first hoist having a chamber therein for laterally receiving said round of ammunition from said first hoist, a second hoist adjacent said carrier having a passage for laterally receiving a round of ammunition, said second hoist being rotatable to different positions, and means for selectively moving said carrier to bring said chamber in said carrier into radial alignment with either of said passages.

4. An article handling system for a device, comprising, a member having a stationary casing with a passage therein through which an article is transported, means in said passage for moving said article, a movable carrier adjacent said member having a chamber into which said article is moved laterally from said first mentioned means, rotatable ejector means in said chamber for laterally receiving and ejecting said article, a second member adjacent said carrier having a passage for receiving an article laterally from said chamber, said second member being movable in opposite directions to different positions, means for moving said carrier in different directions for bringing said chamber in said carrier into position to deliver an article laterally to said passage in said second member, and means for selecting the direction of movement of said carrier to bring said chamber in said carrier into radial alignment with said passage in said second member in the most expedient manner whether said second member is moving or stationary.

5. An article transporting and handling system for a device, comprising, a member having a stationary casing with a passage therein for receiving an article, hoist means in said passage for moving said article, a movable carrier adjacent said member having a chamber into which said article is moved laterally from said first mentioned means, a second member adjacent said carrier having a passage for receiving an article laterally from said chamber, said second member being revolvable about said carrier and rotatable in opposite directions to different positions, hoist means in said second member for moving said article in said second member, means for moving said carrier in different directions for bringing said chamber into position to deliver an article laterally to said passage, and means for selecting the direction of movement of said carrier to bring said chamber into radial alignment with said passage in the most expedient manner whether said second member is moving or stationary.

6. An ordnance article handling system, comprising, an article receiving member having a stationary casing and a passage therein through which an article is transportable, a movable carrier adjacent said member having a chamber with article engaging elements therein for providing lateral movement of said article, said casing terminating in a transfer station, rotatable members at said transfer station for receiving articles from said passage and laterally moving said articles into engagement with said article engaging elements, a second member adjacent said carrier for receiving an article laterally from said article engaging elements and for transporting said article further in said handling system, said second member being bi-directionally rotatable to different selected positions, means for differentially moving said carrier in preselected directions correlative to its relative disposition with respect to said passage in said casing for most expediently aligning said chamber with said passage, and means for predetermining the most desirable direction of movement of said carrier to bring said chamber in said carrier into radial alignment with said passage in said casing contemporaneously with the instantaneous state of said second member.

7. In combination with a gun mount for supporting a gun having means for loading a round of ammunition comprising of a projectile and a powder case into said gun, a loader with a casing, upper and lower coaxially disposed drums rotatable in said casing, said drums having openings for receiving respectively projectiles and powder cases; means for supplying rounds of ammunition to said gun mount including a first hoist having a stationary housing with a passage therein through which rounds of ammunition are moved from said drums, a laterally rotatable carrier above said first hoist with a chamber therein for laterally receiving said rounds of ammunition from said first hoist, a second hoist adjacent said carrier having a passage for laterally receiving a round of ammunition, said second hoist being rotatable to different positions, and means for selectively moving said carrier to bring said chamber in said carrier into radial alignment with either of said passages, whereby a round of ammunition can be subsequently transferred to said means for loading said round of ammunition into said gun.

8. In combination with a gun mount for supporting a gun, loading means for loading a round of ammunition comprising of a projectile and a powder case into said gun, a loader including a casing, upper and lower coaxially disposed drums rotatable in said casing, said drums each having a plurality of circumferentially spaced receiving chambers and a stationary member on which the projectiles and powder cases, respectively, are supported and on which they are moved by the respective drum, means for supplying rounds of ammunition to said gun including a first hoist having a housing with a passage therein through which rounds of ammunition are moved from said loader, a laterally rotatable carrier above said first hoist having a chamber therein for laterally receiving rounds of ammunition from said first hoist, a second hoist adjacent said carrier having a passage for laterally receiving the rounds of ammunition, said second hoist being rotatable to different positions, and means for selectively moving said carrier to bring said chamber in said carrier into radial alignment with either of said passages whereby rounds of ammunition may be transported from said loader to said loading means for loading the rounds of ammunition into said gun.

References Cited in the file of this patent
UNITED STATES PATENTS

| | | |
|---|---|---|
| 2,708,391 | Molins et al. | May 17, 1955 |
| 2,833,431 | Bole | May 6, 1958 |
| 2,855,828 | Girouard et al. | Oct. 14, 1958 |